INVENTOR.
WALTER P. WILLS

July 8, 1947.  W. P. WILLS  2,423,540
SELF-BALANCING POTENTIOMETER MECHANISM
Filed Dec. 1, 1941  12 Sheets—Sheet 2
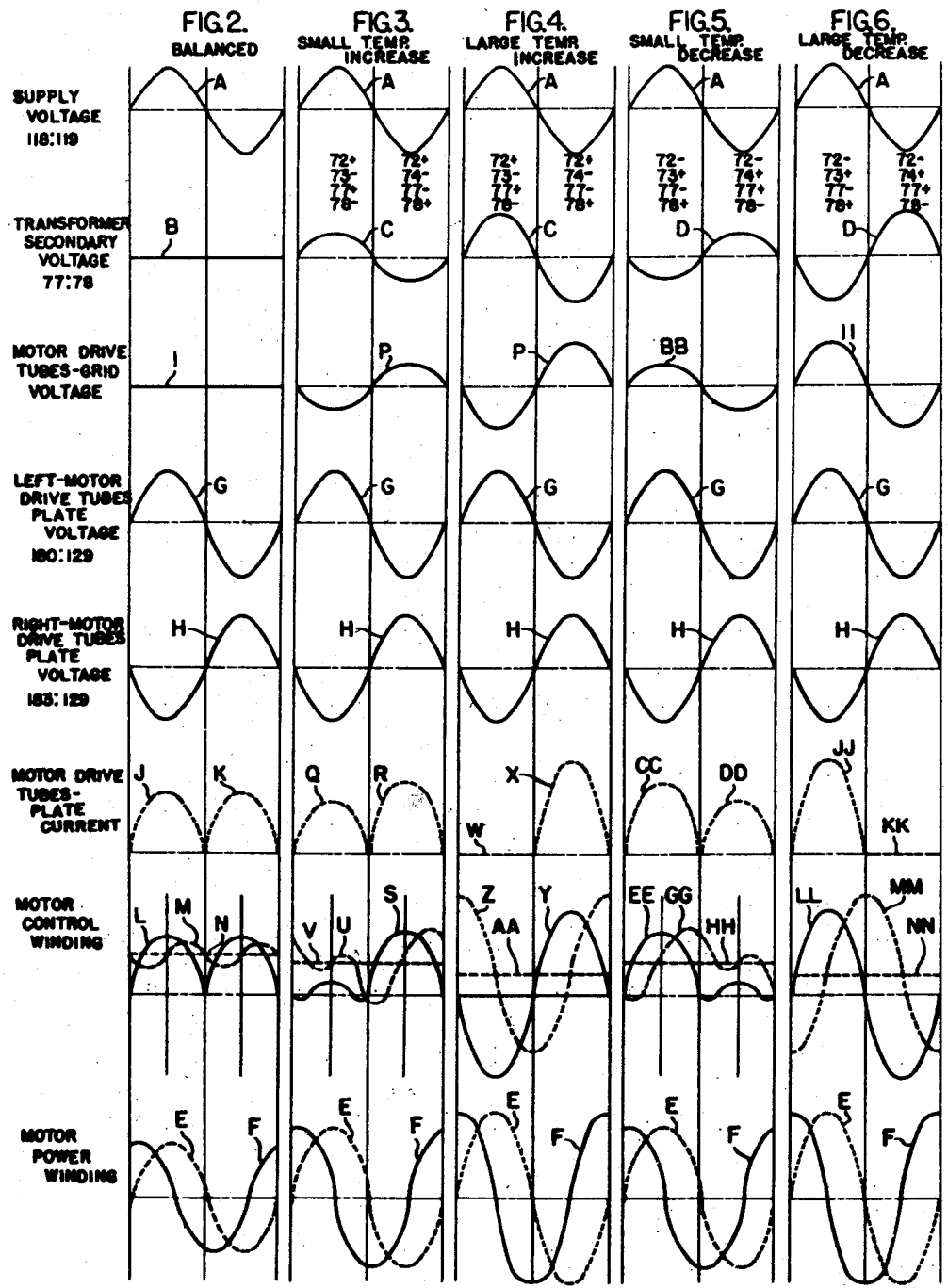
INVENTOR.
WALTER P. WILLS
BY C. B. Spangenberg
ATTORNEY July 8, 1947. W. P. WILLS 2,423,540
SELF-BALANCING POTENTIOMETER MECHANISM
Filed Dec. 1, 1941 12 Sheets-Sheet 3
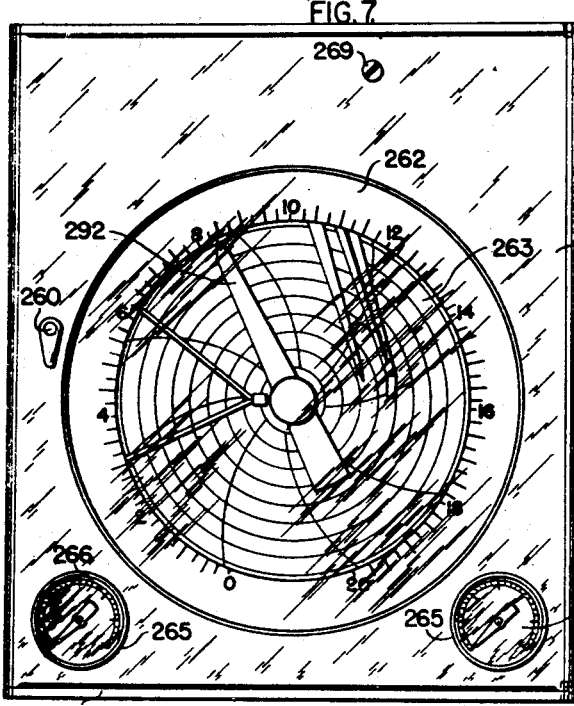
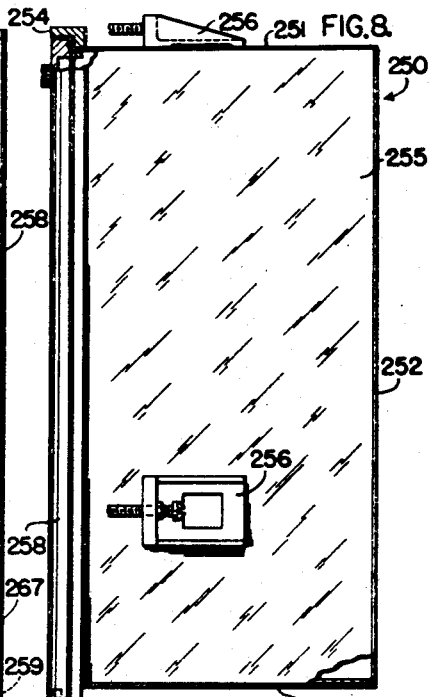
FIG.7 FIG.8 FIG.9
INVENTOR
WALTER P. WILLS
BY C. O. Spangenberg
ATTORNEY July 8, 1947.  W. P. WILLS  2,423,540
SELF-BALANCING POTENTIOMETER MECHANISM
Filed Dec. 1, 1941   12 Sheets-Sheet 5

INVENTOR.
WALTER P. WILLS
BY G.B. Spangenberg
ATTORNEY

July 8, 1947.  W. P. WILLS  2,423,540
SELF-BALANCING POTENTIOMETER MECHANISM
Filed Dec. 1, 1941  12 Sheets-Sheet 7

INVENTOR.
WALTER P. WILLS
BY C. O. Spangenberg
ATTORNEY

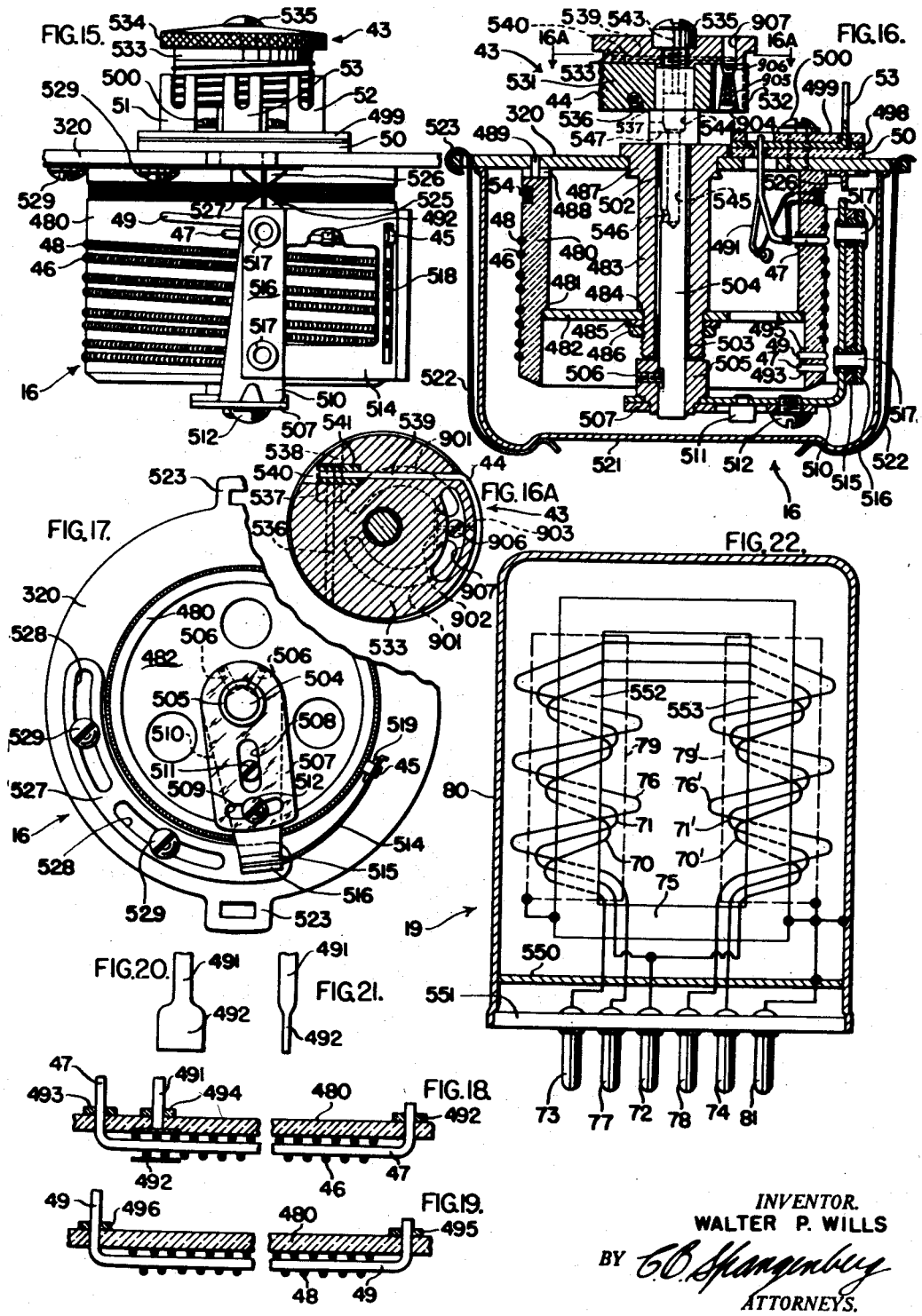

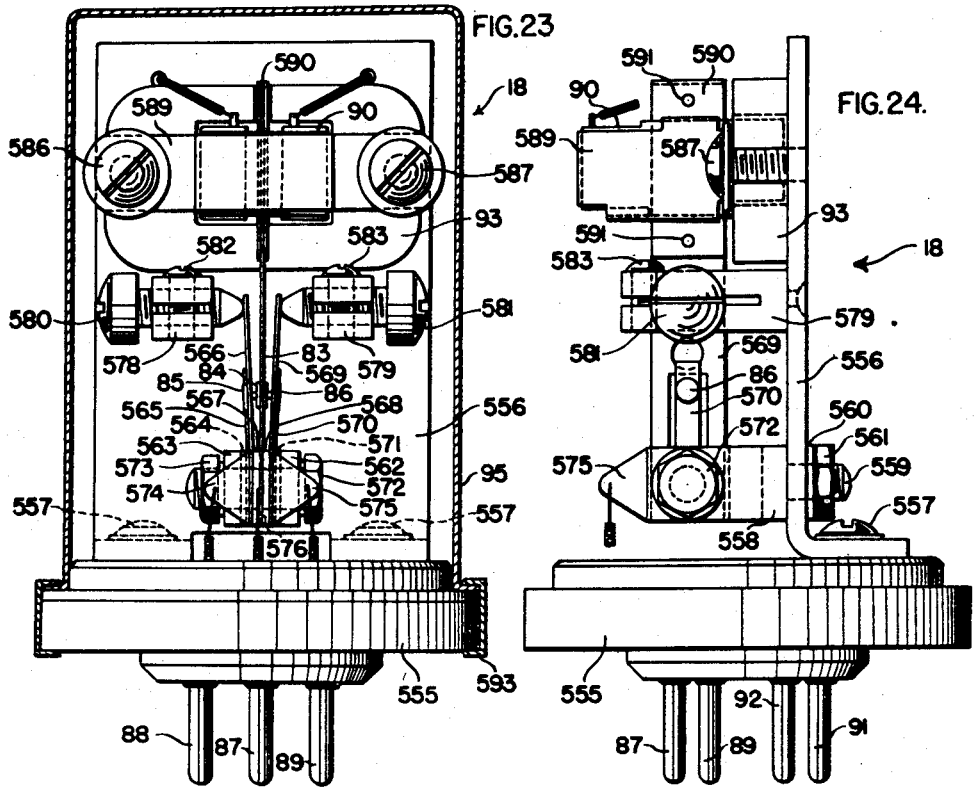
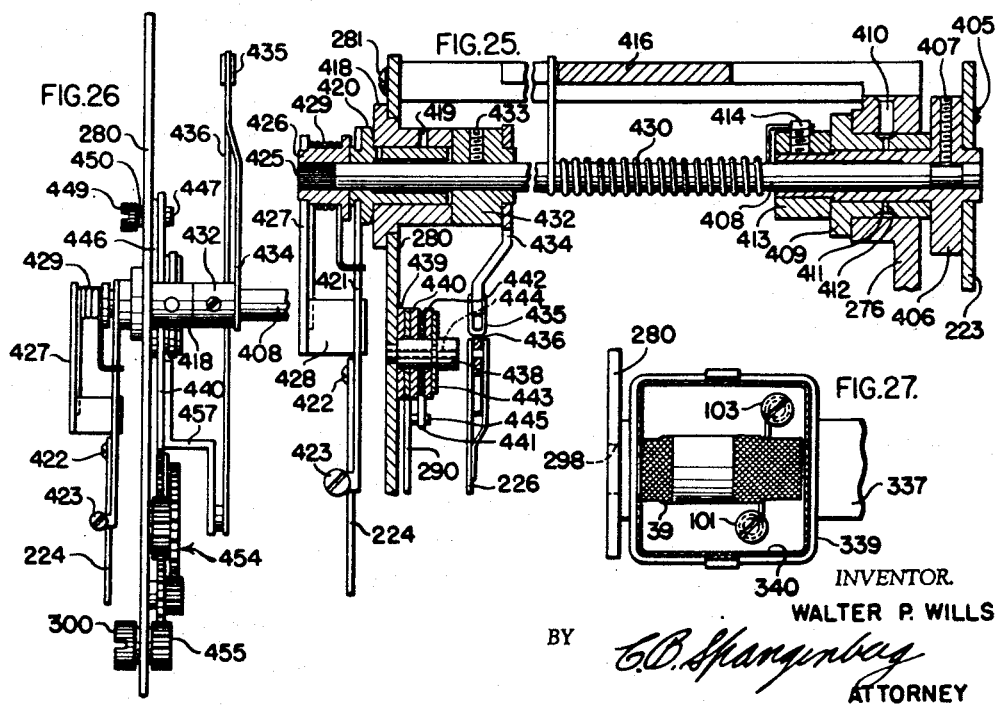

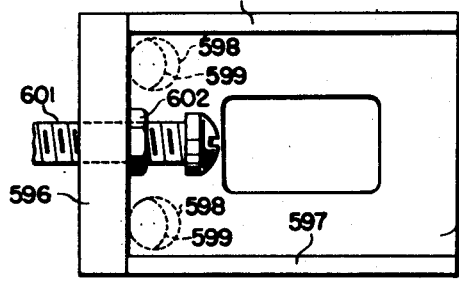
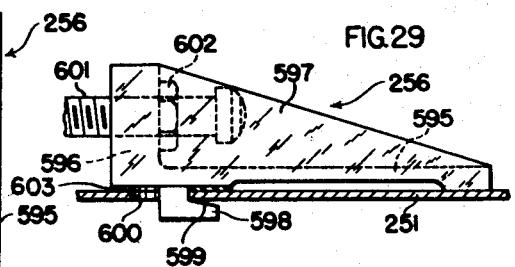
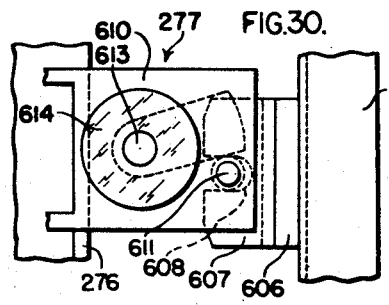
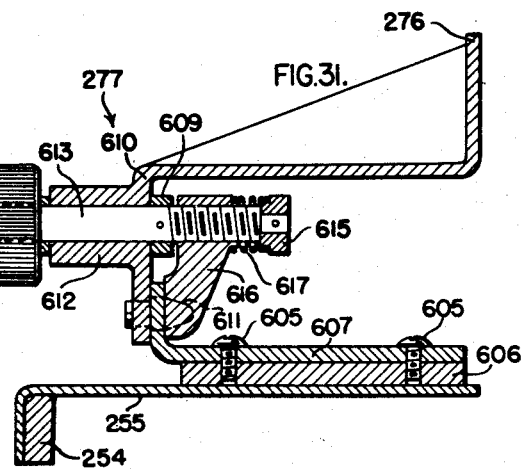
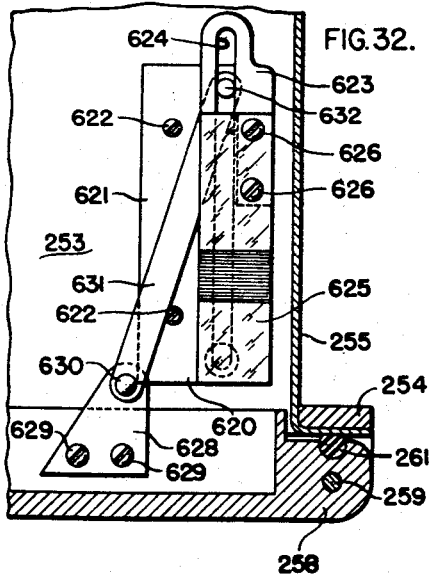
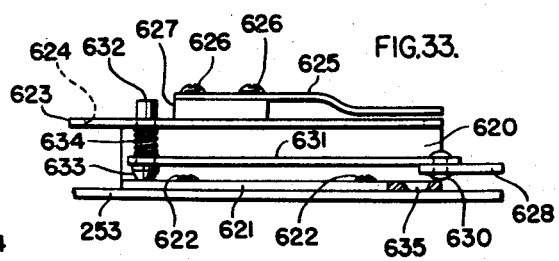

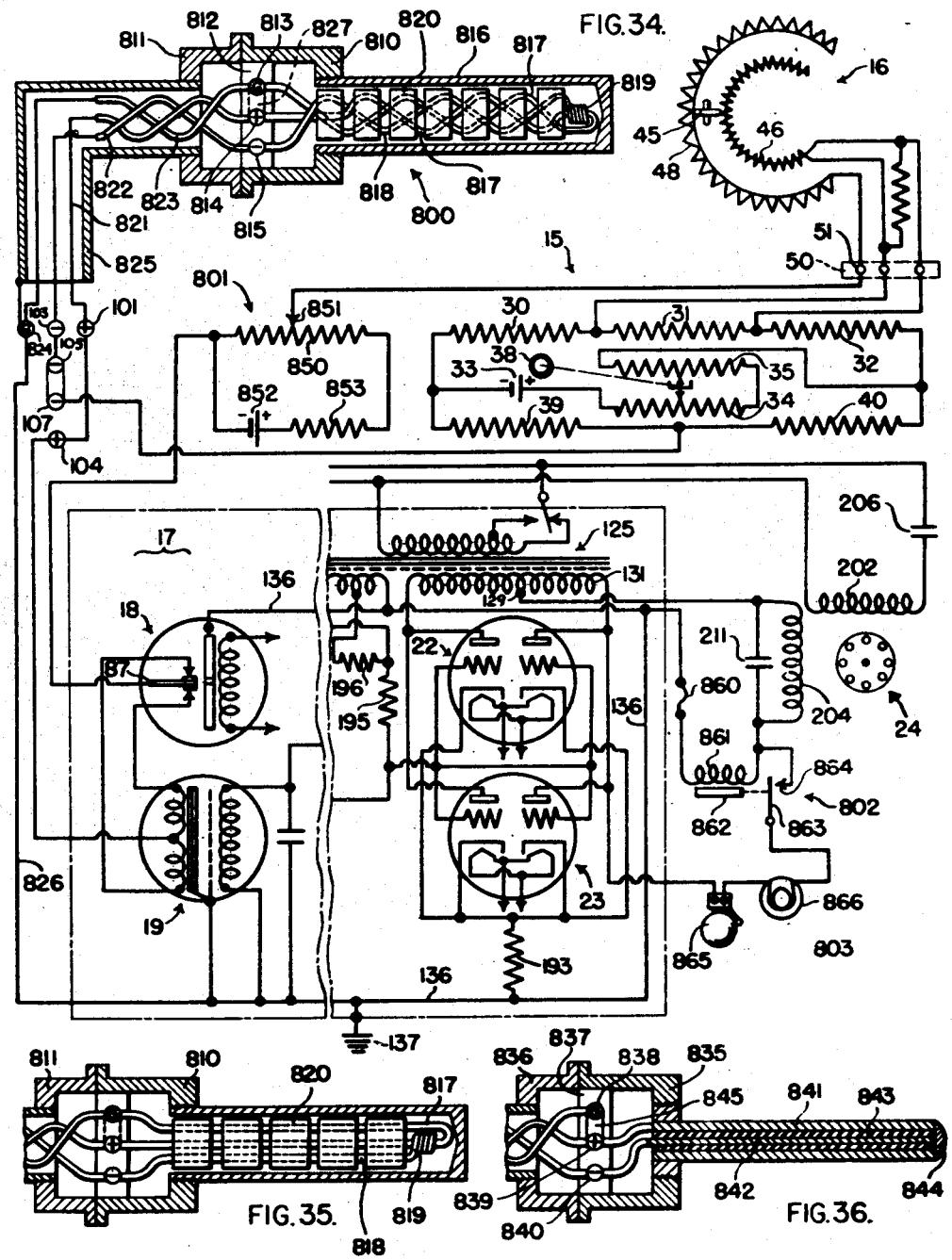

INVENTOR.
WALTER P. WILLS
BY _C. B. Spangenberg_
ATTORNEY

Patented July 8, 1947

2,423,540

UNITED STATES PATENT OFFICE 2,423,540

SELF-BALANCING POTENTIOMETER MECHANISM

Walter P. Wills, Philadelphia, Pa., assignor to The Brown Instrument Company, Philadelphia, Pa., a corporation of Pennsylvania Application December 1, 1941, Serial No. 421,173

52 Claims. (Cl. 171—95)

This invention relates to a measuring and/or control apparatus for measuring and/or controlling the value of a condition.

More specifically, this invention is directed to a self-balancing potentiometer measuring apparatus, wherein the unbalanced D. C. current of the potentiometer is transformed into a pulsating current of one phase or of opposite phase depending upon the sense of unbalance of the potentiometer circuit, wherein the pulsating current is amplified to operate a reversible electric motor in one direction or the other, wherein operation of the reversible electric motor rebalances the potentiometer circuit and wherein the electric motor operates indicating, recording and/or control mechanism. The potentiometer apparatus may measure a condition and operate control mechanism to regulate that condition or some other condition.

A prime object of this invention is to provide a new and novel measuring and/or control apparatus for accomplishing in an improved manner measuring, indicating, recording and control functions. By reason of this invention improved results in measuring, indicating, recording and control are obtained which cannot be obtained by present known measuring and/or control devices. These improved results are accomplished by the coaction of new and novel features which provide more accurate and faster measuring, indicating, recording and controlling operations together with long life of the apparatus. These new and novel features and the coaction thereof also form objects of this invention.

More particularly, an object of this invention is to provide a new and improved potentiometer circuit network and associated parts to obtain more accurate measurements.

Another object of this invention is to provide a new and novel means for transforming the D. C. current of the potentiometer circuit network into a pulsating current of one phase or of opposite phase depending upon the sense of unbalance of the potentiometer circuit network.

A further object of this invention is to provide new and novel means for amplifying the pulsating current and reversibly driving a reversible rotatable electric motor for performing indicating, recording and/or control functions.

Another object is to provide new and novel means for operating and preventing overtravel of a reversible electric motor.

Still another object of this invention is to properly construct and correlate the various parts of the measuring and/or control apparatus and to associate therewith new and novel means for reducing to a minimum the effects of extraneous circulating or stray currents which would tend to hamper the satisfactory operation of the apparatus.

A further object of this invention is to provide a new and novel means for checking, calibrating and adjusting the sensitivity, zero position, operating range and other characteristics of the measuring and/or control apparatus.

In the case of a control apparatus, another object of this invention is to provide new and novel means to drive the control mechanism thereof to a safe position in case of failure of the measuring apparatus whereby safe control is provided.

Other objects and advantages will become apparent to those skilled in the art upon reference to the accompanying specification, claims and drawing in which:

Figs. 2, 3, 4, 5 and 6 are curves showing voltages and currents present in different parts of the measuring and control apparatus under various operating conditions;

Fig. 7 is a front elevational view of the instrument with the door closed;

Fig. 8 is a side elevational view of the instrument with parts of the instrument case shown in section;

Fig. 9 is a front elevational view of the instrument with the door swung open;

Fig. 15 is an elevational view of the slide-wire assembly with the cover thereof removed;

Fig. 16 is a vertical sectional view of the slide-wire assembly;

Fig. 16A is a detail sectional view of the cable drum of the slide-wire assembly taken substantially along the line 16A—16A of Fig. 16;

Fig. 17 is a bottom view of the slide-wire assembly with the cover thereof removed;

Figs. 18, 19, 20 and 21 are diagrammatic views showing the manner in which the slide-wire and collector are secured to the slide-wire assembly;

Fig. 22 is a schematic view of the input transformer;

Figs. 23 and 24 are elevational views of the vibrator;

Fig. 25 is a sectional view taken substantially on the line 25—25 of Figs. 11 and 12;

Fig. 26 is a horizontal plan view looking down on Figs. 11, 12 and 25;

Fig. 27 is a detail sectional view of the cold junction housing;

Figs. 28 and 29 are elevational views of the clamping means for securing the instrument to a panel;

Fig. 30 is a front view of the latch for the swinging frame;

Fig. 31 is a horizontal sectional view of the latch for the swinging frame;

Figs. 32 and 33 are elevational views of the stop for the door;

Fig. 34 is a schematic illustration of a measuring and control apparatus similar to that of Fig. 1 but including additional features;

Figure 37:
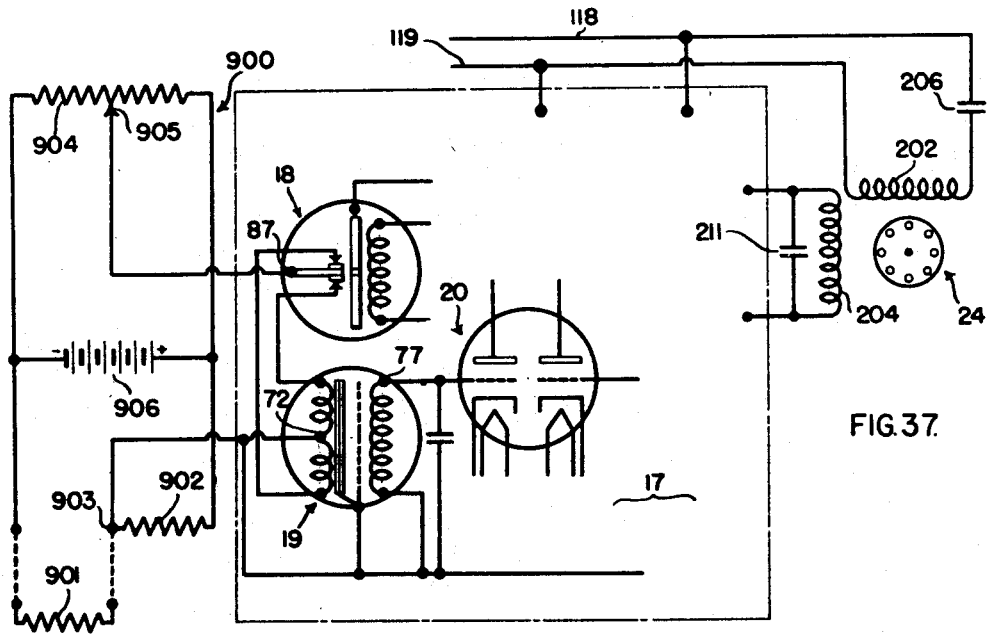
Figure 38:
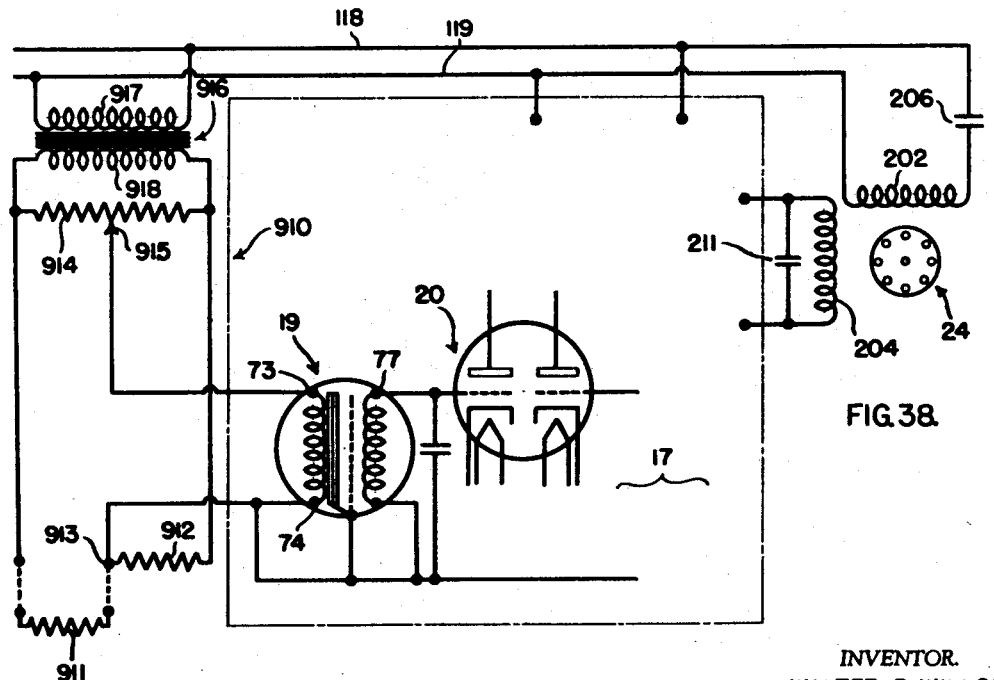

Figs. 35 and 36 are schematic illustrations of alternative forms of thermocouples which can be used with measuring and control apparatus of Fig. 34; and Figs. 37 and 38 are schematic illustrations of the measuring and control apparatus applied to D. C. and A. C. bridge systems.

Figure 1:
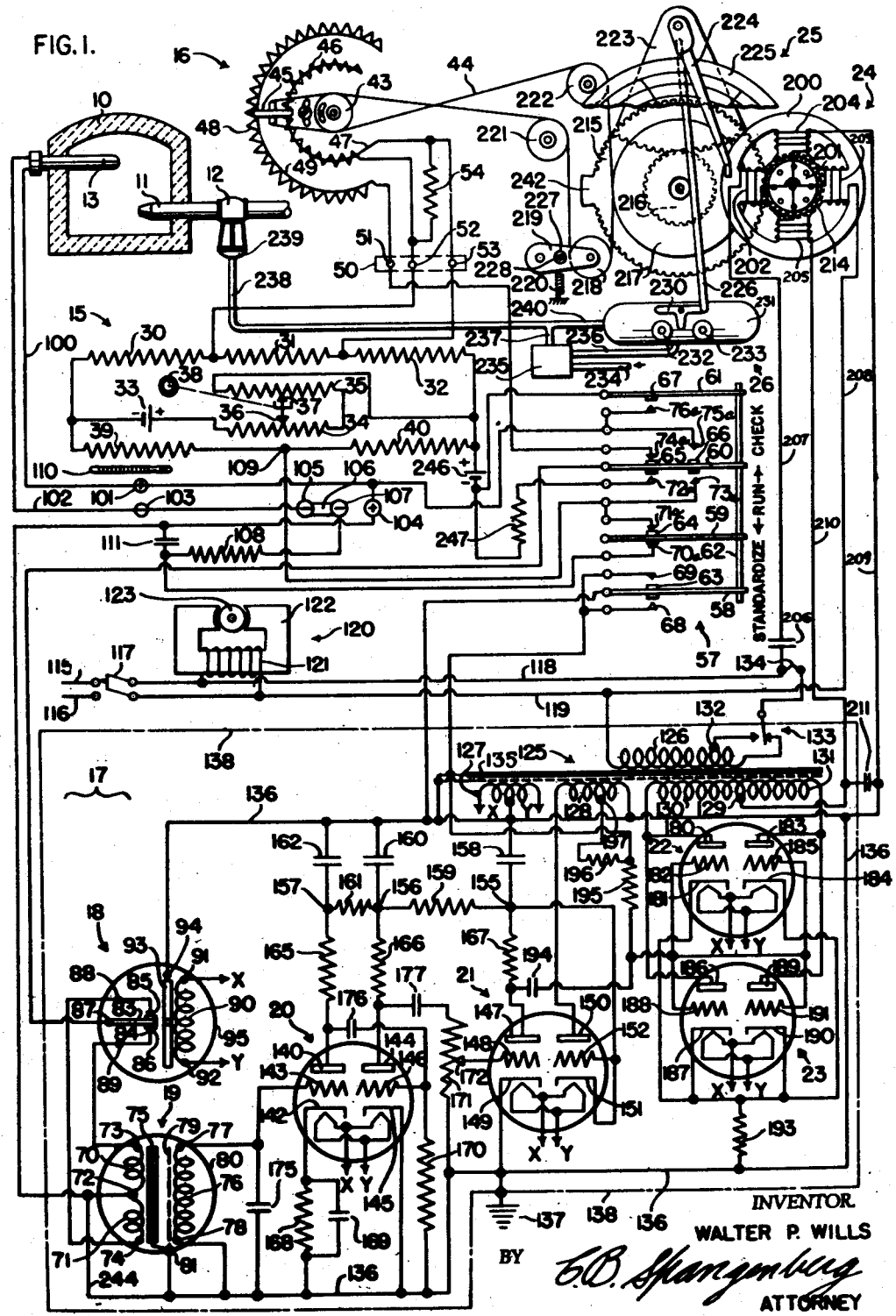
Fig. 1 is a schematic illustration of the measuring and control apparatus.

Referring now to Fig. 1 there is schematically illustrated the measuring and control apparatus in the form of a self-balancing potentiometer controller for measuring, indicating, recording and controlling the value of a condition, for example, the temperature value in a furnace 10. The furnace 10 may be heated by a burner 11 controlled by a pneumatic valve 12.

A thermocouple 13 responsive to the temperature within the furnace 10 operates in conjunction with a potentiometer network generally designated at 15 and a slide-wire assembly generally designated at 16 to form a self-balancing potentiometer system. Upon a change in temperature within the furnace 10 an unbalanced D. C. current in one direction or the opposite direction is produced depending upon the sense of unbalance of the potentiometer system. This D. C. current of one direction or of opposite direction is supplied to an amplifier unit 17 having a vibrator or equivalent device generally designated at 18, a transformer generally designated at 19, amplifying vacuum tubes generally designated at 20 and 21, and motor drive vacuum tubes generally designated at 22 and 23.

The direct current supplied to the amplifier 17 is converted by the vibrator 18 into a pulsating current of one phase or of opposite phase depending upon the sense of unbalance of the potentiometer system. This pulsating current is detected and amplified by the transformer 19 and is further amplified by the amplifying vacuum tubes 20 and 21. The output from the amplifying vacuum tubes 20 and 21 is supplied to the motor drive vacuum tubes 22 and 23 for operating in one direction or another a reversible electric motor generally designated at 24. The reversible motor 24 operates a drive mechanism generally designated at 25. The drive mechanism operates the slide-wire assembly 16 to rebalance the potentiometer system and also operates indicating and recording means for indicating and recording the temperature conditions existing within the furnace 10. The drive mechanism 25 also operates a controller generally designated at 26 which may take the form of a pneumatic controller such as illustrated in the C. B. Moore Patent 2,125,081, granted July 26, 1938. This controller 26 operates to control the valve 12 to maintain the temperature within the furnace 10 at the desired normal value.

The potentiometer network 15 may comprise three resistances 30, 31, and 32 connected in series. These resistances are preferably formed of manganin wire having substantially no temperature resistance coefficient and are used for calibration purposes. Connected in parallel with the resistances 30, 31 and 32 are a battery 33 which may be in the form of a dry cell and a dual vernier rheostat comprising resistances 34 and 35 and electrically connected sliding contacts 36 and 37 associated respectively with the resistances 34 and 35. The dual vernier rheostat may be operated by a knob 38, there being a direct mechanical connection between the knob and the contact 36 and a lost motion connection between the knob and the contact 37. Upon initial movement of the knob the contact 36 is first moved and then the contact 37 is moved thereby providing vernier adjustment. The battery 33 and the dual vernier rheostat are connected in series with respect to each other. The resistances 34 and 35 of the vernier rheostat may be made of copper or other material having a positive temperature resistance coefficient for compensating for temperature changes in the battery 33. Also connected in parallel with the resistances 30, 31 and 32 are two resistances 39 and 40 which in turn are connected in series with respect to each other. The resistance 39 is preferably made of copper or other material having a positive temperature resistance coefficient and the resistance 40 may be formed of manganin having substantially no temperature resistance coefficient. The resistance 39 operates to compensate for temperature changes at the cold junction of the thermocouple, it being so connected into the network that the voltage drop across it is added to the thermocouple E. M. F. The resistance 40 is utilized primarily for standardizing purposes and has a resistance value such that the voltage drop across it is equal to the voltage produced by the standard cell.

Slide-wire assembly 16 may include a cable drum 43 suitably rotated by the drive mechanism 25 through a cable 44. The term "cable" is used in a generic sense to cover similar arrangements such as wire, violin string, rope, cable, etc. The cable drum 43 is provided with an adjustment for adjusting the diameter or circumference thereof. The cable drum 43 operates through an adjustable connection to move a contactor 45. The contactor 45 engages a slide-wire in the form of a resistance wire 46 which is space wound around an insulated core 47. Preferably the slide-wire 46 and the core 47 are formed of the same material such as manganin wire having substantially no temperature resistance coefficient. The contactor 45 also engages a collector bar in the form of a resistance wire 48 space wound around a core 49 and completely electrically conductive with respect thereto throughout their lengths. Preferably, the resistance wire 48 and the core 49 are formed of the same material, such as manganin wire, as the resistance wire 46 and core 47. The slide-wire assembly is provided with a terminal block 50 having terminals 51, 52 and 53. The collector bar 48 is connected to the terminal 51. One end of the resistance wire 46 is connected to the terminal 52 and one end of the core 47 is connected to the terminal 53, the other ends of the resistance wire 46 and the core 47 being connected together. Connected across the slide-wire 46 and core 47, that is in shunt with the slide-wire 46, is a resistance 54 also formed of manganin wire. The terminals 52 and 53 are connected to the ends of the resistance element 31 of the potentiometer network 15 and thereby the slide-wire resistance 46, the resistance 54 and the resistance 31 are all connected in parallel.

A three-position switch generally designated at 57 is utilized for performing three functions, namely, for connecting the potentiometer circuit network for normal operation (run), for checking the system for errors (check), and for standardizing the potentiometer system (standardize). Schematically, this switch 57 may comprise switch arms 58, 59, 60 and 61 electrically insulated from each other and all operated by a common operating member 62. The switch arms 58 and 59 carry contacts 63 and 64, respectively. The switch arm 60 carries contacts 65 and 66 and the switch arm 61 carries contact 67. Contact 63 engages a contact 68 when the switch 57 is moved to the standardize position and engages a contact 69 when the switch is moved to the check position. When the switch 57 is in the run position the contact 63 does not engage either contact 68 or 69. When the switch 57 is in run position the contact 64 engages both contacts 70a and 71a. When the switch is moved to the standardize position contact 64 disengages contact 71a and when the switch 57 is moved to check position the contact 64 disengages contact 70a. Contact 65 engages contact 74a when the switch 57 is in run position. When the switch 57 is moved to standardize position contact 65 disengages contact 74a and contacts 65 and 66 engage contacts 72a and 73a, respectively. When the switch 57 is moved to check position contact 65 remains in engagement with contact 74a and contact 66 engages contact 75a. When the switch 57 is in either the run position or the check position contact 67 does not engage contact 76a. Contact 67 engages contact 76a only when the switch 57 is moved to standardize position.

Schematically the transformer 19 comprises a primary winding formed by two windings 70 and 71. The adjacent ends of the windings 70 and 71 are connected together and to a terminal 72 and the other ends of the primary windings 70 and 71 are connected to terminals 73 and 74, respectively. The primary windings 70 and 71 are wound around a core structure 75 and also wound around the core structure is a secondary winding 76 connected between terminals 77 and 78. A shield 79 is provided between the primary windings 70 and 71 and the secondary winding 76. The windings and core structure of the transformer are housed in a casing 80. The core structure 75, the shield 79 and the casing 80 are connected to a terminal 81 which is in turn connected to ground.

Schematically, the vibrator 18 may comprise a vibrating reed 83 for operating a contact 84 with respect to contacts 85 and 86. The contact 84 is connected to a terminal 87 and the contacts 85 and 86 are connected to terminals 88 and 89, respectively. The vibrating reed 83 is vibrated under the influence of a winding 90 connected between two terminals 91 and 92 and supplied with alternating current. A permanent magnet 93 associated with the vibrating reed is utilized for polarizing and synchronizing purposes. The mounting structure for the vibrating reed, contacts, operating winding and permanent magnet is connected to a terminal 94 which in turn is connected to ground. A suitable housing 95 encloses the mechanism of the vibrator 18.

For purposes of illustration it is assumed that the thermocouple 13 is an iron-constantan thermocouple. The lead 100 extending from the iron element of the thermocouple to the positive cold junction terminal 101 is an iron lead. The lead 102 leading from the constantan element of the thermocouple to the negative cold junction terminal 103 is made of constantan. The hot junction of the thermocouple is, therefore, in the furnace 10 and the cold junction is at the cold junction terminals 101 and 103. The positive cold junction terminal 101 is connected to the contacts 76a and 75a of the switch 57 and is also connected to a positive checking terminal 104. The negative cold junction terminal 103 is connected to a negative checking terminal 105 which in turn is connected by a jumper 106 to a negative checking terminal 107. The positive checking terminal 104 is connected to the terminal 72 at the junction of the two primary windings 70 and 71 of the transformer 19 and the opposite ends of these primary windings 70 and 71 are connected, respectively, through terminals 73 and 74 and terminals 89 and 88 to the contacts 86 and 85 of the vibrator 18. The vibrator contact 84 is connected through terminal 87 and the switch arm 60 to contacts 65 and 66. The contact 74a which normally engages the contact 65 is connected to the terminal 51 and hence to the collector bar 48 of the slide-wire assembly 16. Accordingly the positive lead of the thermocouple is connected through the transformer and the vibrator to the collector bar 48 of the slide-wire assembly 16 when the switch 57 is in the run position. The negative checking terminal 107 is connected through a resistance 108 to the contact 70a of the switch 57 and when the switch 57 is in the run position contact 70a is connected through contacts 64 and 71a to a point 109 located between the compensating resistance element 39 and the resistance element 40 of the potentiometer network 15.

The battery 33 operates to produce an E. M. F. between the contactor 45 of the slide-wire assembly 16 and the point 109 in the potentiometer network 15 which opposes the E. M. F. produced by the thermocouple 13 and the value of the battery E. M. F. produced between these points is regulated by the position of the contactor 45 along the slide-wire resistance 46. As the contactor 45 of the slide-wire assembly is moved in a clockwise direction the battery E. M. F. between the contactor 45 and the point 109 is increased and as the contactor 45 is moved in a counter-clockwise direction the battery E. M. F. is decreased. When the potentiometer system is balanced the E. M. F. produced by the battery between the contactor 45 and the point 109 is equal and opposite to the E. M. F. produced by the thermocouple 13 and, therefore, no current flows in the thermocouple circuit.

Upon an increase in temperature within the furnace 10 the E. M. F. produced by thermocouple 13 becomes greater than the E. M. F. produced by the battery 33 between the contactor 45 and the point 109 which causes a D. C. current flow from the positive cold junction terminal 101 through the checking terminal 104 to the terminal 72 of the transformer 19 and thence through the primary winding 70, terminals 73 and 89 and contacts 86 and 84 to the terminal 87 of the vibrator 18 or through the primary winding 71, terminals 74 and 88 and contacts 85 and 84 to the terminal 87. From the terminal 87 the D. C. current flows through contacts 65 and 74a of the switch 57, terminal 51 of the slide-wire assembly, collector bar 48, contactor 45, slide-wire resistance 46, potentiometer network 15 to 109, and then through contacts 71a, 64 and 70a of the switch 57, resistance 108, checking terminal 107, jumper 106, and checking terminal 105 to the negative cold junction terminal 103. This produces a D. C. current in one direction which is detected and amplified by the amplifier 17 to operate the reversible motor 24 which through the drive mechanism 25, cable 44 and cable drum 43 moves the contact 45 in a clockwise direction to increase the battery E. M. F. between the contactor 45 and the point 109 to oppose equally the E. M. F. developed in the thermocouple. When this occurs the flow of D. C. current is stopped and the potentiometer system becomes balanced.

Upon a decrease in temperature within the furnace 10 the E. M. F. produced by the thermocouple 13 becomes less than the E. M. F. produced between the contactor 45 and the point 109 by the battery 33. This causes a D. C. current to flow in the opposite direction from the contactor 45 through collector bar 48, terminal 51 of the slide-wire assembly 16, contacts 74a and 65 of the switch 57, terminal 87 of the vibrator 18 and then through contacts 84 and 86, terminals 89 and 73 and primary winding 70 to the terminal 72 of the transformer 19 or through contacts 84 and 85, terminals 88 and 74 and primary winding 71 to the terminal 72. This D. C. current then flows from the terminal 72 through positive checking terminal 104, positive cold junction terminal 101, thermocouple 13, negative cold junction terminal 103, negative checking terminal 105, jumper 106, negative checking terminal 107, resistance 108, contacts 70a, 64 and 71a of the switch 57 and point 109 through the potentiometer network 15 to the contactor 45 of the slide-wire assembly 16. This flow of D. C. current is detected and amplified by the amplifier 17 to operate the reversible motor 24 in the opposite direction which in turn operates through the drive mechanism 25, cable 44 and cable drum 43 to move the contactor 45 of the slide-wire assembly 16 in a counter-clockwise direction. This decreases the E. M. F produced by the battery 33 between the contactor 45 and the point 109 to a value which equally opposes the E. M. F. produced by the thermocouple 13 whereupon the potentiometer system again becomes balanced and no D. C. current flows.

Accordingly upon a change in temperature within the furnace 10 an unbalanced D. C. current is caused to flow in one direction or the other depending upon whether the furnace temperature increases or decreases. This unbalanced D. C. current flow is detected and amplified by the amplifier 17 to operate the reversible motor 24 which in turn operates through the drive mechanism 25 and the slide-wire assembly 16 to reduce the unbalanced D. C. current flow to zero. The positions of the contactor 45 of the slide-wire assembly 16 and of the indicating, recording and controlling parts mechanically coupled thereto represent the actual temperature value existing within the furnace 10.

Changes in temperature at the cold junction terminals 101 and 103 would normally tend to render the system inaccurate and in order to avoid this difficulty the cold junction compensation resistance 39 is included in the potentiometer network 15, this cold junction compensating resistance 39 being located in close proximity to the cold junction terminals 101 and 103, so as to be similarly affected by temperature conditions at this point. The cold junction compensation resistance element 39 is preferably made of copper having an accurate and uniform temperature resistance coefficient. This resistance element 39 is so connected into the potentiometer network that the voltage drop across it is added to the thermocouple E. M. F. whereby changes in temperature at the cold junction terminals 101 and 103 are entirely compensated for. A thermometer 110 may be utilized for measuring the actual temperature at the cold junction terminals 101 and 103 to aid in the calibration of the potentiometer system.

The slide-wire assembly 16 in addition to including the slide-wire 46 also includes the shunt resistance 54. During the manufacture of the slide-wire assembly the shunt resistance 54 is so chosen with respect to the slide-wire resistance 46 that the total resistance of the slide-wire assembly is a predetermined value within very close limits. This resistance value is the same for all slide-wire assemblies regardless of the rest of the potentiometer system. As a consequence the same slide-wire assembly 16 may be interchangeably utilized for different ranges and may also be interchangeably utilized in conjunction with various types of thermocouples, such as iron-constantan, copper-constantan and rare metal couples. All that is necessary to adapt the potentiometer system for use in various ranges and for use with various types of thermocouples is to change the calibrating resistances 30, 31 and 32.

In prior art potentiometer systems it has been necessary to closely calibrate the calibrating resistances 30, 31 and 32 and the cold junction resistance 39 to cause the instrument to operate accurately. Any small inaccuracy in the values of the resistance elements 30, 32 and 39 would cause the zero position of the instrument to vary. According to this invention an improved arrangement is provided. Here the resistances 30, 32 and 39 need only be constructed within reasonable limits instead of within the precise accurate limits which were previously required. To accurately align the zero position of the instrument, all that is necessary is to adjust the adjustable connection between the cable drum 43 and the contactor 45. This adjustable connection, therefore, provides an improved arrangement for obtaining zero adjustment. Any small inaccuracy in the value of the resistance element 31 would normally cause the range of the instrument to vary. According to this invention the resistance element 31 need only be constructed within reasonable limits instead of within precise limits and accurate adjustment of the range may be obtained by adjusting the diameter or circumference of the cable drum 43. This adjustment, therefore, provides an improved arrangement for obtaining range adjustment.

By having the resistances 31 and 54 connected in shunt with the slide-wire resistance 46, the effects of variations caused by variations in slidewire construction or wear of the slide-wire is greatly decreased. According to the usual practice in the potentiometer art the impedance of the galvanometer or in this case the impedance of the input transformer 19 would be made substantially equal to the resistance of the rest of the potentiometer circuit including the thermocouple 13 and extension leads, slide-wire assembly 16 and potentiometer network 15. In an unbalanced potentiometer circuit any change in resistance in the remainder of the potentiometer circuit would materially affect the sensitivity of the galvanometer or the secondary voltage produced by the input transformer. According to this invention the impedance of each half of the primary winding of the input transformer 19 at the frequency of conversion is made materially higher than the resistance of the remainder of the potentiometer circuit with the result that large changes in the resistance of the remainder of the potentiometer circuit have practically no effect on the secondary voltage produced by the input transformer 19. In a practical and satisfactory embodiment, it is found that the system is substantially unaffected by changes in resistance when the impedance of each half of the primary of the transformer at the frequency of conversion is from 5 to 10 times the resistance of the rest of the potentiometer circuit. By reason of this selection of the input transformer impedance, changes in thermocouple lead wire lengths, changes in contact resistance of the slide-wire assembly and the vibrator contacts, different selections of thermocouple materials and extension leads and the introduction into the potentiometer circuit of additional resistance has practically no effect on the over-all sensitivity or operation of the complete system.

The resistance 108 connected to the negative checking terminal 107 and the condenser 111 connected across the thermocouple, are utilized for damping or anti-hunting operation and also for stray reduction purposes as will be pointed out more fully hereafter.

Power is supplied to the amplifier 17, the reversible motor 24 and a chart drive motor 120 by means of line wires 115 and 116 leading from some source of alternating potential, not shown. For purposes of illustration it is assumed that the alternating voltage supplied by the line wires 115 and 116 is 60 cycle. A double pole single throw switch 117 connects conductors 118 and 119 to the power lines 115 and 116. The chart drive motor 120 may be a synchronous motor including a winding 121 connected across the conductors 118 and 119, the winding 121 cooperating with a core structure 122 for rotating an armature 123 in a synchronous fashion. As will be pointed out more fully hereafter the armature 123 operates the chart drive mechanism.

The amplifier 17 is provided with a transformer generally designated at 125 having a primary winding 126 and secondary windings 127, 128, 130 and 131. A shield 135 for stray elimination purposes is located between the primary and secondary windings and this shield along with the core and cover of the transformer are connected to ground. The secondary windings 130 and 131 may be a single winding provided with a mid-tap 129. The primary winding 126 is provided with a tap 132 near one end thereof. The opposite end of the primary winding 126 is connected to the conductor 119 and either the other end of the primary winding or the tap 132 is connected to the conductor 118 through a single pole double throw switch 133 and a fuse 134. The purpose of the switch 133 is to adapt the transformer 125 for operation with either 110 voltage supply or 125 voltage supply. If the voltage supply is 125 volts the single pole double throw switch 133 is in the position shown but if 110 volts are supplied the switch is thrown to the opposite position. The purpose of the switch 133 and the tap 132 is to maintain the number of volts per turn in the primary winding substantially constant regardless of whether 110 volts or 125 volts is supplied to the transformer.

The secondary winding 127 is utilized for supplying alternating current to the operating winding 90 of the vibrator 18 and to the filaments or heaters of the vacuum tubes 20, 21, 22 and 23. The connections are designated X and Y. The secondary winding 127 is preferably grounded at mid voltage to maintain the filaments or heaters at ground potential.

The vibrator 18 is essentially a polarized switching mechanism, the operating winding 90 and the permanent magnet 93 cooperating to vibrate the vibrating reed 83 at 60 cycles per second in synchronism with the 60 cycle alternating voltage supply. For purpose of illustration it is assumed that the contact 86 is engaged by the contact 84 during the first half cycle of the alternating voltage supply when the voltage is positive and that the contact 85 is engaged by the contact 84 during the second half cycle when the voltage of the alternating voltage supply is negative. Accordingly the contacts 84 and 86 engage when the voltage of the alternating voltage supply is positive and the contacts 85 and 84 engage when the voltage of the alternating voltage supply is negative. When the vibrating reed 83 is stationary in the mid position both contacts 85 and 86 are engaged by the contact 84 so that when the vibrating reed is operated the circuit through the primaries 70 and 71 of the transformer 19 is never entirely interrupted.

When the potentiometer system is balanced no current flows in the potentiometer system and, therefore, operation of the vibrator 18 has no effect. When the temperature of the furnace 10 increases the unbalanced D. C. current in the potentiometer system flows in a direction from the transformer 19 to the vibrator 18 and vice versa, when the temperature within the furnace 10 decreases the unbalanced D. C. current in the potentiometer system flows from the vibrator 18 to the transformer 19.

Referring to Figs. 2 to 6 curve A represents the phase of the supply voltage and it remains substantially the same at all times. Curve B of Fig. 2 represents the potential of the terminal 77 when the potentiometer is balanced, it being substantially constant. Upon a temperature increase the potential of the terminal 77 increases and decreases in phase with the supply voltage as illustrated by curves C of Figs. 3 and 4. It will be noted that the amplitude of curve C varies in accordance with the amount of potentiometer unbalance, it being greater for a large unbalance. Curves D of Figs. 5 and 6 represent the potential of the terminal 77 when the temperature decreases and here it is seen that the potential increases and decreases 180 degrees out of phase with the supply voltage. Here again the amplitude of curve D varies with the amount of potentiometer unbalance. While the various wave forms are not necessarily true sine waves, they are so shown in Figs. 2 to 6 to more clearly illustrate the principles of this invention.

Assume now that the temperature in the furnace 10 increases. During the first half cycle of the alternating voltage supplied by the supply lines 115 and 116 the unbalanced D. C. current flows from the terminal 72 through primary winding 70, terminal 73, terminal 89 and contacts 86 and 84 to the terminal 87 producing a current flow in the coil 70 to cause the terminal 72 to become more positive than the terminal 73. This current flow acts through the core structure 75 of the transformer 19 to induce a voltage in the secondary winding 76 causing the terminal 77 to be positive with respect to the terminal 78 during the first half cycle. During the second half cycle of the alternating voltage supplied by the lines 115 and 116 current flows from the terminal 72 through the primary winding 71, terminals 74 and 88 and contacts 85 and 84 to the terminal 87 of the vibrator 18. This causes a current flow in the winding 71 to make the terminal 72 more positive than the terminal 74. This current flow in the primary winding 71 acts through the core structure 75 to induce a voltage in the secondary winding 76 to cause the terminal 77 to become negative with respect to the terminal 78. Accordingly, under these conditions an alternating voltage is produced across the terminals 77 and 78 which is in phase with the alternating voltage of the supply lines 115 and 116 as illustrated in Figs. 3 and 4 by curves C.

Assume now that the temperature in the furnace 10 decreases. This causes an unbalanced D. C. current to flow in the opposite direction from the vibrator 18 to the transformer 19. During the first half cycle of voltage of the supply lines 115 and 116 current flows from the terminal 87 of the vibrator 18 through contacts 84 and 86, terminals 89 and 73 and primary winding 70 to the terminal 72. This causes a current to flow through the primary winding 70 which makes the potential of the terminal 73 positive with respect to the terminal 72. This current flow in the primary winding 70 operates in conjunction with the core structure 75 to induce a voltage in the secondary winding 76 to cause the potential of the terminal 77 to be negative with respect to the terminal 78 during the first half cycle. During the second half cycle of the alternating voltage supplied by the supply lines 115 and 116 current flows from the terminal 87 of the vibrator 18 through contacts 84 and 85, terminals 88 and 74 and primary winding 71 to terminal 72. This causes a current flow in the primary winding 71 to cause the potential of the terminal 74 to be positive with respect to the terminal 72. This current flow through the primary winding 71 operates through the core structure 75 to induce a voltage in the secondary winding 76 to cause the potential of the terminal 77 to be positive with respect to the terminal 78 during the second half cycle. Accordingly when the temperature of the furnace 10 decreases the unbalanced D. C. current flow in the potentiometer system produces an alternating E. M. F. across the output terminals 77 and 78 of transformer 19 which is 180° out of phase with the alternating voltage of the supply lines 115 and 116 as illustrated by curves D of Figs. 5 and 6.

Summing up when the potentiometer system is balanced there is no current flow through the primary windings 70 and 71 of the transformer 19 and hence the potential of the terminal 77 of the transformer 19 remains substantially constant. Upon an increase in furnace temperature the unbalanced D. C. current operates to cause the potential of the terminal 77 to increase and decrease in phase with the supply voltage. Conversely upon a decrease in furnace temperature the unbalanced D. C. current flow in the potentiometer circuit causes the potential of the terminal 77 to increase and decrease 180° out of phase with the voltage of the supply lines 115 and 116.

The amplifier 17 includes a continuous conductor 136 which is grounded at 137. The permanent magnet 93 and mounting structure of the vibrator 18 and the core structure 75, shield 79 and casing 80 of the transformer 19 are connected through this conductor 136 to ground. Likewise the secondary winding 127 of the transformer 125 is connected through the continuous conductor 136 to ground. The casing 138 of the amplifier 17 as well as the complete instrument casing is also connected to ground.

The vacuum tube 20 is a double triode tube of the indirect heated type and operates as two stages of amplification. The plate 140, cathode 142 and grid 143 are included in the first stage of amplification and the plate 144, the cathode 145 and the grid 146 are included in the second stage of amplification. The vacuum tube 21 is also a double triode tube, the plate 147, cathode 149 and grid 148 thereof acting as a third stage of amplification. The plate 150, cathode 151 and the grid 152 of the vacuum tube 21 act as a rectifier for supplying D. C. current to the plate circuits of the three stages of amplification. In this connection the grid 152 is tied to the cathode 151.

One end of the secondary winding 128 of the transformer 125 is connected to ground through the continuous conductor 136 and the other end is connected to the plate 150 of the rectifier. The plate 150, grid 152 and cathode 151 operate to produce a positive potential with respect to ground at the points 155, 156 and 157. The condenser 158 connected between the point 155 and the continuous conductor 136 to ground and the internal resistance of the tube 21 between the plate 150 and cathode 151 are utilized for filtering purposes to smooth out the ripple at the point 155. Likewise the resistance 159 and condenser 160 and the resistance 161 and condenser 162 operate to smooth out the ripples at the points 156 and 157. The points 155, 156 and 157 are, therefore, provided with one, two and three stages of filtering, respectively. Load resistances 165, 166 and 167 are connected into the plate circuits including the plates 140, 144 and 147, respectively.

The parallel arranged resistance 168 and condenser 169 located between the cathode 142 and the continuous conductor 136 to ground, are utilized for biasing the grid 143 negative with respect to the cathode 142. The resistance 170 permits a flow of grid current between the grid 146 and the cathode 145 for limiting the extent to which the grid 146 may go positive with respect to the cathode 145. The resistance 171 and contactor 172 connected to the grid 148 perform a dual function, namely, limit the extent to which the grid 148 may go positive with respect to the cathode 149 and to vary the amount of signal impressed upon the grid 148 from the plate circuit of the second stage of amplification. The condenser 175 connected across the terminals 77 and 78 of the transformer 19 is provided for loading the secondary winding 76 of the transformer 19 to its ideal impedance at the line voltage frequency. The condenser 176 connected between the plate 140 of the first stage of amplification and the grid 146 of the second stage of amplification is provided for eliminating the D. C. component of the plate circuit voltage on the grid 146 and for impressing the alternating component of the voltage produced across resistor 165 to the grid 146. Likewise the condenser 177 connected between the plate 144 of the second stage of amplification and the grid 148 of the third stage of amplification is utilized for eliminating the D. C. component of the plate circuit voltage on the grid 148 and for impressing the alternating component of the voltage produced across resistor 166 to the grid 148.

The motor drive vacuum tubes 22 and 23 may also be double triode tubes. The vacuum tube 22 includes a plate 180, cathode 181 and grid 182 and also a plate 183, cathode 184 and grid 185. The vacuum tube 23 includes a plate 186, a cathode 187 and grid 188 and also a plate 189, cathode 190 and grid 191. The plates 180 and 186 of the vacuum tubes 22 and 23 are connected to the left end of the transformer secondary winding 130 and the plates 183 and 189 are connected to the right end of the transformer secondary winding 131. The cathodes 181, 184, 187 and 190 are connected together and through a biasing resistance 193 and the continuous conductor 136 to ground. The grids 182, 185, 188 and 191 are connected together and are also connected through a condenser 194 to the plate 147 of the third stage of amplification. The condenser 194 is provided for eliminating the D. C. component of the plate circuit voltage on the grids 182, 185, 188 and 191, and also for impressing the alternating component of the voltage produced across the resistance 167 to these grids. The resistances 195 and 196 and the portion of the transformer secondary winding 128 to the right of point 197 permit a flow of current between the grids 182, 185, 188 and 191 and the cathodes 181, 184, 187 and 190, respectively, through the resistance 193 for limiting the extent to which the grids may go positive with respect to their associated cathodes. The transformer secondary winding 128 and the resistance 196 also provide a source of alternating voltage to be applied to the grids 182, 185, 188 and 191 for a purpose to be pointed out more fully hereafter. The signal from the third stage of amplification is impressed simultaneously and equally on all of the control grids of the two vacuum tubes 22 and 23. From the above connections it will be noted that the vacuum tubes 22 and 23 are connected in parallel for similar and simultaneous operation.

As illustrated, the motor 24 is a rotating field motor including a stator 200 with four pole pieces physically spaced 90° apart and a squirrel cage rotor 201 having interconnected conductor bars. Two of the opposite pole pieces are provided with series connected power windings 202 and 203 and the other two opposite pole pieces are provided with series connected control windings 204 and 205. When the voltage and current through the motor control windings lag the voltage and current, respectively, in the power windings the rotor 201 rotates in a clockwise direction. When the voltage and current in the control windings lead the voltage and current, respectively, in the power windings the rotor 201 rotates in a counter-clockwise direction. The motor 24 is preferably so constructed that the control windings 204 and 205 have a high impedance to match the plate impedance of the motor drive vacuum tubes 22 and 23 when the motor is operating and also that the power windings 202 and 203 have a high impedance in order to provide for efficient operation. Preferably, the control and power windings of the motor have a high ratio of inductive reactance to resistance, for example, from 6 to 1 to 8 to 1 at 60 cycles. This provides for maximum power during running with the least amount of heating and also provides a low impedance path in the control windings for anti-hunting purposes. In addition, because of this high ratio of inductive reactance to resistance in the power windings of the motor, the latter heats less when stalled than when running.

Electrical energy is supplied to the power windings 202 and 203 of the motor 24 from the conductor 118 through condenser 206, conductor 207, power windings 202 and 203, and conductor 208 back to the conductor 119. The condenser 206 is so selected with respect to the power windings 202 and 203 as to provide a substantially series resonant circuit when the rotor 201 is rotating at approximately full speed. Due to this series resonant circuit the total impedance of the power winding circuit is substantially equal to the resistance of the power windings 202 and 203 and since this resistance is relatively low, a large current flow through the power windings is made possible. This results in the production of maximum power and torque by the motor. Due to the series resonant circuit the current flow through the power windings 202 and 203 is in phase with the supply voltage. However, the voltage across the power windings 202 and 203 leads the current by substantially 90°, this being caused by the inductance of the windings. In Figs. 4 and 6 curve E shows the current flow in the motor power windings 202 and 203 to be substantially in phase with the supply voltage, and curve F shows the voltage across the power windings leading the current by substantially 90° when the rotor 201 is operating at approximately maximum speed. When the rotor 201 is operating at substantially maximum speed, the inductance of the power windings 202 and 203 is a maximum giving the above referred to series resonant condition. As the speed of rotation of the rotor 201 falls off the inductance of the power windings 202 and 203 decreases thereby upsetting to some extent the resonant condition. This causes a slight phase shift in the current through the power windings and the voltage across the power windings, the voltage shifting slightly more than the current which reduces the power loss in the power windings. Further, the change from the resonant condition reduces the current flow through the power windings and due to the decrease in inductance the voltage across the power windings likewise decreases. This also reduces the power loss in the windings. As a net result there is a substantial reduction in heating of the power windings when the rotor 201 is at a standstill as compared to a condition when the rotor is operating at substantially maximum speed. Curves F and E of Fig. 2 show the voltage across and the current through the power windings when the rotor is at a standstill and curves F and E of Figs. 3 and 5 show the same conditions when the rotor is operating at an intermediate speed. The amplitudes of the currents and voltages and the phase shifts are set forth in Figs. 2 to 6.

Power is supplied to the control windings 204 and 205 from the transformer secondary windings 130 and 131 through the plate circuits of the motor drive vacuum tubes 22 and 23, resistance 193, continuous conductor 136, conductor 209, control windings 204 and 205 and conductor 210 to the center tap 129 of the transformer secondary windings 130 and 131. A condenser 211 is connected in parallel with the control windings 204 and 205 and this condenser is so selected as to provide a parallel resonant circuit during both the stalled and running conditions of the motor. This parallel resonant circuit presents a relatively high external impedance and a relatively low internal circuit impedance. The relatively high external impedance of this parallel resonant circuit matches the impedance of the plate circuits of the vacuum tubes 22 and 23 whereby the optimum conditions of operation are approached. The relatively low internal circuit impedance approximates the actual resistance of the control windings 204 and 205, and since this resistance is relatively low, the impedance of the internal circuit is relatively low.

During the first half cycle of the alternating supply voltage the plate 180 of the motor drive tube 22 is positive with respect to the center point 129 of the transformer 125, and during the second half cycle the plate 180 is negative with respect to the center point 129 as illustrated by the curves G in Figs. 2 to 6. During the first half cycle of the alternating voltage the plate 183 of the motor drive vacuum tube 22 becomes negative with respect to the center point 129 and during the second half cycle the plate 183 becomes positive with respect to the point 129, as illustrated by curves H of Figs. 2 to 6. The voltage of the plate 180 accordingly alternates in phase with the supply voltage and the voltage of the plate 183 alternates 180 degrees out of phase with the supply voltage. This relation always remains substantially the same.

On the assumption that the potentiometer system is balanced and, therefore, no unbalanced D. C. current flows in the potentiometer system, and on the further assumption that the point of connection of resistors 195 and 196 is connected directly to the continuous conductor 136, the potential of the terminal 77 of the transformer 19 remains substantially the same as the potential of the terminal 78 which is at ground potentials as illustrated by curve B of Fig. 2. The potential of the grids 143, 146 and 148 of the three stages of amplification remain substantially constant, and no signal is impressed upon the grids 182, 185, 188 and 191 of the motor drive vacuum tubes 22 and 23. Accordingly the potential of the grids of the motor drive vacuum tubes 22 and 23 remains substantially constant as illustrated by the curve I of Fig. 2.

Under these conditions current flows from the plate 180 to the cathode 181 when the plate is positive during the first half cycle, but current will not flow in this circuit during the second half cycle. During the first half cycle a pulse of current, therefore, passes from the plate 180 to the cathode 181 as illustrated by curve J in Fig. 2. During the first half cycle when the plate 183 is negative no current will flow from the plate 183 to the cathode 184, but during the second half cycle when the plate 183 is positive current will flow from the plate 183 to the cathode 184 as illustrated by the curve K of Fig. 2. Since the plate 186, cathode 187 and grid 188 of the vacuum tube 23 are connected in parallel with the plate 180, cathode 181 and grid 182 of tube 22, and since the plate 189, cathode 190 and grid 191 of the vacuum tube 23 are connected in parallel with the plate 183, cathode 184 and grid 185 of tube 22, the vacuum tube 23 is connected in parallel with the vacuum tube 22 and operates in exactly the same manner as the vacuum tube 22.

Since the grids 182, 185, 188 and 191 are all connected together and since the potentials of these grids remain constant when the potentiometer circuit is balanced and the point of connection of resistors 195 and 196 is connected to the conductor 136, the vacuum tubes 22 and 23 produce pulses of current of equal magnitude during each half cycle of the supply voltage as is illustrated by the curves J and K of Fig. 2. The plate circuit of the vacuum tubes 22 and 23 include the parallel resonant circuit formed by the motor control windings 204 and 205 and the condenser 211. The parallel resonant circuit offers a high external impedance which is substantially resistive in character, and accordingly a pulsating voltage drop in phase with the plate current is produced across the control windings 204 and 205 by the flow of the pulsating plate current through the parallel resonant circuit.

The pulsating voltage across the control windings 204 and 205 produces a current through these windings which includes a D. C. component and an alternating current having a fundamental frequency of 120 cycles. Due to the inductance in the motor control windings 204 and 205 the current flow through the motor control windings is caused to lag the voltage across the windings by 90 degrees of this 120 cycle voltage or by 45 degrees of the 60 cycle supply voltage. The pulsating voltage across the motor control windings 204 and 205 is illustrated by the curve L of Fig. 2 and the alternating current flowing through the motor control windings 204 and 205 is illustrated by the curve M of Fig. 2. The condenser 211 connected in parallel with the motor control windings operates to maintain the D. C. component of the current flow therethrough at a substantially steady value and also provides a low impedance path for the 120 cycle current flow in the motor control windings. Since the motor control windings have a low resistance the D. C. component of the current flowing through the motor control windings is relatively great while the amplitude of the alternating component of the current flowing through the motor control windings is relatively small because of the relatively high inductance of the motor control windings. The D. C. component of the current flowing through the motor control windings is illustrated by the curve N of Fig. 2. Due to the relatively high D. C. current flowing through the motor control windings 204 and 205 when the potentiometer system is balanced, the core structure tends to become saturated and the inductive reactance of the motor control windings is relative small. The condenser 211 is so selected with respect to this inductive reactance at 120 cycles that the condenser in parallel with the motor control windings forms a substantially parallel resonant circuit.

The relatively large D. C. current flowing through the motor control windings when the potentiometer system is balanced acts as a brake to prevent rotation of the rotor 201. Rotation of the rotor causes the conductor bars thereof to cut flux produced by the D. C. current flowing through the motor control windings 204 and 205 and this produces a relatively heavy current in the rotor conductor bars which in turn quickly expends the force of rotation of the rotor. In other words, the developing of a relatively heavy current in the rotor conductor bars by the rotation of the rotor acts to prevent rotation of the rotor, thereby providing an effective braking action. It is here noted that during the first half cycle of the supply voltage the A. C. component of the current flowing through the motor control windings 204 and 205 has a high peak and a low peak, the same being true for the second half cycle. The high peak and low peak of each half cycle cancel each other and, therefore, do not provide any turning effort to the rotor 201. This 120 cycle alternating current also acts the same as the D. C. current to provide braking. Rotation of the rotor also causes the conductor bars thereof to cut flux produced by the 120 cycle current flowing through the motor control windings 204 and 205 and this also produces a relatively heavy current in the rotor conductor bars which in turn quickly expends the force of rotation of the rotor.

The amount of braking action is determined by the amount of D. C. current flowing through the motor control windings 204 and 205. The braking action may be increased or decreased by varying the amount of D. C. current flow. This may be done in various ways as by utilizing more motor drive vacuum tubes connected in parallel for supplying an increased amount of D. C. current, by selecting different types of tubes to provide the desired amount of D. C. current supplied to the motor control windings, or by varying the resistance value of the biasing resistance 193. The amount of braking action caused by the 120 cycle current may be similarly varied. By making the value of the biasing resistance 193 small the amount of braking action is increased and, vice versa, by making the resistance value larger the amount of braking action is decreased. If, however, the resistance value of the biasing resistance 193 is materially decreased the plate current through the motor drive vacuum tubes 22 and 23 will be increased thereby reducing the life of these vacuum tubes. Preferably a compromise selection of the biasing resistance 193 is made to give the desired amount of braking with long life of the vacuum tubes and proper biasing of the grids of these vacuum tubes. By connecting the two tubes 22 and 23 in parallel the life of the tubes is further increased.

From the above it is seen that when the potentiometer system is balanced the motor 24 remains stationary and any tendency for the motor to turn is rapidly reduced by the above outlined braking action.

Assume now that the temperature in the furnace 10 increases a relatively small amount, the potential of the terminal 77 of the transformer 19 increases and decreases in phase with the line voltage as illustrated by curve C of Fig. 3. This alternation of the potential of the terminal 77 forms a signal which is impressed on the grid 143 of the vacuum tube 20 and after being amplified by the vacuum tubes 20 and 21 the signal is impressed on the grids 182, 185, 188 and 191 of the motor drive vacuum tubes 22 and 23. The signal impressed on these latter grids is 180 degrees out of phase with the supply voltage as illustrated by the curve P in Fig. 3.

With this signal placed on the grids 182, 185, 188 and 191 of the motor drive vacuum tubes 22 and 23 the pulsating D. C. plate current during the first half cycle will be decreased since the potentials of the grids are more negative during the first half cycle and the pulsating D. C. plate current during the second half cycle will be increased since during the second half cycle the potentials of the grids are more positive. The values of the pulsating D. C. plate current for the first and second half cycles are shown in Fig. 3 by curves Q and R, respectively. Accordingly, when the temperature of the furnace increases a small amount, the curve J of Fig. 2 decreases to curve Q of Fig. 3 and the curve K increases to curve R, the amount of decrease and increase varying in accordance with the amount of temperature increase in the furnace.

The decrease in magnitude of the pulsating plate current during the first half cycle decreases the magnitude of the pulsating voltage across the motor control windings during the first half cycle and the increase in the plate current during the second half cycle causes the voltage pulse across the motor control windings to increase during the second half cycle. Due to the cooperation of condenser 211 and motor control windings the voltage across the motor control windings decreases during the first half cycle at a faster rate than the voltage increases during the second half cycle. The curve S of Fig. 3 shows the voltage across the motor control windings during the first and second half cycles. From this curve it will be seen that the symmetrical pulsating voltage across the motor control winding is disappearing and that a 60 cycle component across the motor control windings is appearing. The high peak of the A. C. component of the voltage across the motor control windings appears during the second half cycle and leads the high peak of the voltage across the motor power windings by substantially 90 degrees.

The alternating current component of the current flowing through the motor control windings 204 and 205 is illustrated by the curve U of Fig. 3. Here it will be noted that the 120 cycle component is diminishing and that a 60 cycle component is appearing. The high peak of the alternating current component of the current flowing through the motor control windings leads the peak of the current flowing through the motor power windings by substantially 90 degrees. At the same time the D. C. component of the current flow through the motor control windings is decreasing whereby the braking action is decreasing. From the above it is seen that the current flow through and the voltage across the motor control windings 204 and 205 lead the current flow through and the voltage across the motor power windings 202 and 203. This causes rotation of the rotor 201 of the motor 24 in a counter-clockwise direction. The speed of rotation of the motor in the counter-clockwise direction depends upon the amplitude of the alternating voltage across and the alternating current flowing through the motor control windings and also depends upon the amount of D. C. current and 120 cycle current flowing through the motor control windings. When the temperature increase in the furnace is relatively small the motor will operate at a relatively slow speed.

Assume now that the temperature in the furnace increases a large amount the potential of the terminal 77 of the transformer 19 will vary in accordance with the curve C of Fig. 4. The potential of the terminal 77 increases and decreases in phase with the line voltage and the amplitude of alternation will be greater than that illustrated by the curve C of Fig. 3. The signal impressed upon the grids 182, 185, 188 and 191 of the motor drive tubes 22 and 23 is illustrated by the curve P of Fig. 4. Curve P of Fig. 4 is substantially the same as curve P of Fig. 3 except that the amplitude of the curve P of Fig. 4 is greater than that of the curve P of Fig. 3.

With this signal placed upon the grids 182, 185, 188 and 191 the pulsating D. C. plate current during the first half cycle will be decreased to zero since the potential of the grids is driven so far negative during the first half cycle that no current flows through the plate circuit during the first half cycle. The pulsating D. C. plate current during the second half cycle will be increased since during the second half cycle the potentials of the grids become still more positive. The values of the pulsating D. C. plate current for the first and second half cycles under these conditions are shown in Fig. 4 by the curves W and X, respectively. Accordingly, when the temperature of the furnace increases a large amount, no current flows in the plate circuit during the first half cycle and a maximum current flows through the plate circuit during the second half cycle.

With this pulsating D. C. current flowing in the plate circuit the potential across the motor control windings during the first half cycle decreases to a minimum and with a maximum pulsating plate current flowing during the second half cycle the potential across the motor control windings increases to a maximum during the second half cycle. Under these conditions the potential across the motor control windings becomes a 60 cycle alternating potential which is 180 degrees out of phase with the supply voltage due to the cooperation of the condenser 211 and the motor control windings. The potential across the motor control windings is illustrated by the curve Y of Fig. 4. The alternating potential across the motor control windings leads the alternating potential across the motor power windings by substantially 90 degrees.

The decrease in plate current to zero during the first half cycle and the increasing of the plate current to a maximum during the second half cycle cause the current flow through the motor control windings to have a frequency of 60 cycles, the current flow through the motor control windings lagging by 90 degrees the alternating potential across the motor control windings. The 60 cycle alternating component of the current flow through the motor control windings is illustrated by the curve Z of Fig. 4 and it will be noted that the alternating current flowing through the motor control windings leads the alternating current flowing through the motor power windings by 90 degrees. The D. C. component of the current flowing through motor control winding has decreased still further and is shown by the curve AA of Fig. 4. The 120 cycle component has substantially disappeared.

Accordingly, when the temperature of the furnace increases a large amount the amplitude of the 60 cycle alternating current flowing through the motor control winding is increased to a maximum and the D. C. current and 120 cycle current flowing through the motor control winding is decreased to a minimum. This causes faster operation of the motor since the turning effort of the motor control windings on the rotor 201 is increased and the braking action is decreased. The speed of rotation of the motor 24 in a counter-clockwise direction increases and the braking action decreases in accordance with the amount of potentiometer unbalance caused by a temperature increase.

Upon a decrease in temperature in the furnace the operation is substantially the same as that outlined above, except that the motor is operated in a clockwise direction instead of a counter-clockwise direction. Upon a small decrease in temperature the potential of the terminal 77 of the transformer 19 varies 180 degrees out of phase with the alternating supply voltage and the signal impressed upon the grids of the motor drive tubes 22 and 23 varies in phase with the supply voltage as illustrated by the curve BB of Fig. 5. This signal on the grids of the motor drive vacuum tubes causes the plate current to increase during the first half cycle and decrease during the second half cycle as illustrated by the curves CC and DD of Fig. 5. This produces a voltage across the motor control windings as illustrated by the curve EE of Fig. 5. Under these conditions a current is caused to flow through the motor control windings and the A. C. component of this current is illustrated by the curve GG of Fig. 5 and the D. C. component is illustrated by the curve HH of Fig. 5. The curves EE and GG of Fig. 5 are the same as the curves S and U of Fig. 3 with the exception that they are displaced by 180 degrees. This produces an A. C. current in the motor control windings which lags the A. C. current in the motor power windings by substantially 90 degrees and produces a voltage across the motor control windings which lags the voltage across the power windings by substantially 90 degrees. This causes rotation of the motor in a clockwise direction.

Upon a large temperature decrease the signal impressed upon the grids of the motor drive tubes is illustrated by the curve II of Fig. 6, and this produces a plate current illustrated by the curves JJ and KK of Fig. 6. This pulsating D. C. plate current produces a voltage across the motor control winding illustrated by the curve LL of Fig. 6 and produces a current flow through the motor control winding having an A. C. component illustrated by the curve MM of Fig. 6 and a D. C. component illustrated by the curve NN of Fig. 6. The current flow through and the voltage across the motor control winding lag the current flow through and the voltage across the motor power winding by 90 degrees which causes rotation of the motor 24 in a clockwise direction at maximum speed.

The motor 24 is, therefore, rotated in one direction or the other as the potentiometer circuit is unbalanced in one direction or the other and the speed of operation of the motor in either direction is dependent directly upon the amount of potentiometer unbalance. As the potentiometer circuit is restored to balance following an unbalance thereof, the braking action on the motor is increased so that rotation of the motor is rapidly stopped when the potentiometer is rebalanced without any "hunting."

When the motor is operated at maximum speed the inductance of the motor control winding is increased, for at this time the D. C. current flow through the motor control winding is at a minimum. Also, at this time the alternating current flowing through the motor control winding is completely a 60 cycle alternating current instead of the 120 cycle current flowing through the motor control winding when the potentiometer is balanced and the motor is stationary. Due to this decrease in frequency and due to the increase in inductance in the motor control winding when the motor is operating at a maximum speed, the condenser 211 connected in parallel with the motor control winding still provides a parallel resonant circuit so that the impedance offered by this parallel resonant circuit is substantially resistive to maintain the plate voltage in phase with the plate current. As pointed out above a resonant condition occurs when the motor is stationary with the potentiometer balanced so that under that condition the plate voltage and plate current are also in phase. Proceeding from the condition wherein the motor is stationary to a condition wherein the motor is operating at maximum speed the circuit formed by the condenser 211 being connected in parallel with the motor control winding remains substantially resonant so that the plate current and the plate voltage are substantially always in phase.

As the rotor 201 of the motor 24 rotates the flux produced by the power windings 202 and 203 is distorted by the rotor rotation to cause some of the flux produced by the power windings to link the control windings 204 and 205. This induces additional voltage in the control windings 204 and 205 which is of the same phase and frequency as the voltage normally produced therein to assist the voltage in the control windings 204 and 205. This induces current in the control windings through the low resistance local path of the parallel resonant circuit thereby giving a relatively large current flow even though only a few turns of the control windings are linked by the distorted flux. The greater portion of the current and hence the power for the control windings when the motor is operating at maximum speed is induced by this transformer action so that the tubes may only conduct a relatively small portion of the total current or power required to energize the control windings. The amount of current induced by transformer action is proportional to the speed of rotation of the rotor. This action tends to increase the life of tubes 22 and 23.

The motor rotor 201 operates a pinion 214 which drives a gear 215. The gear 215 carries a gear 216 and a cable drum 217. The cable 44 which drives the contactor 45 of the slide-wire assembly 16 is fastened to the cable drum 217 and passes over a tension pulley 218 carried by a lever 219 and urged downwardly by a spring 220. The cable 44 also passes over pulleys 221 and 222 and is fastened to cable drum 43. The spring 220 urging the pulley 218 downwardly maintains a predetermined tension in the cable 44 so that the relative positions of the cable drum 217 and the cable drum 43 will always remain fixed. The lever 219 is provided with an enlarged hole 227 through which extends a stationary pin 228, the pin cooperating with the hole to act as a stop for limiting the movement of the lever 219. The gear 216 operates a gear sector 223 which in turn operates a pen arm 224 for recording the temperature values on a chart 225 and in the case of a control instrument also operates an arm 226 for controlling the control device 26. The chart 225 is rotated at a constant speed by the chart drive motor 120.

The arm 226 operates a flapper mechanism 230 carried by the body portion 231 of the control device 26. The control device 26 is equipped with dials 232 and 233 for adjusting the throttling range and the rate of reset of the control device. Air under pressure is supplied through a pipe 234 to a pneumatic relay mechanism 235 and a pipe 236 controlled by the control device 26 regulates a pilot valve contained in the relay mechanism to produce a pressure in a pipe 237 in accordance with the temperature condition existing within the furnace 10. The pressure in the pipe 237 is conducted through a pipe 238 to a pneumatic motor 239 which operates the valve 12 and the pressure is also conducted through a pipe 240 to the control device 26 in order to provide the follow-up and reset action in the control device 26.

Upon an increase in temperature within the furnace 10 the motor 24 is operated in the counter-clockwise direction to drive the gear 215 in a clockwise direction. Rotation of the gear 215 in the clockwise direction causes the contactor 45 of the slide-wire assembly 16 to rotate in a clockwise direction to rebalance the potentiometer system. Clockwise rotation of the gear 215 also causes the gear sector 223 and the pen 224 to rotate in a counter-clockwise direction to record on the chart 225 the increase in temperature which has taken place within the furnace 10. Counter-clockwise rotation of the gear sector 223 operates through the arm 226 and flapper assembly 230 to actuate the control device 26 to position the relay mechanism 235 to decrease the pressure transmitted to the pneumatic motor 239 of the valve 12. This moves the valve 12 toward the closed position to decrease the supply of fuel to the furnace 10 for the purpose of reducing the temperature of the furnace to the desired normal value. The decrease in pressure transmitted to the diaphragm motor 239 is also transmitted to the control device 26 to provide a follow-up action for causing the valve 12 to be positioned in accordance with the temperature within the furnace. This decrease in pressure transmitted to the control device 26 also operates through the reset mechanism thereof to additionally position the valve 12 towards a closed position if the temperature change is caused by a change in temperature load in the furnace extending over a substantial period of time. Upon a decrease in temperature within the furnace 10 the opposite action takes place, the contactor 45 of the slide-wire assembly 16 being moved in a counter-clockwise direction, the pen arm 224 being moved in a clockwise direction to record on the chart 225 the decrease in temperature and the control device 26 being actuated to cause proportionate opening of the valve 12 to increase the supply of fuel to the furnace 10 for restoring the furnace temperature to the desired value.

The gear 215 is formed with an abutment 242 which engages the drive pinion 214 when the gear 215 is rotated to either extreme position. In engaging the drive pinion 214 the abutment 242 stalls the motor 24 and prevents overtravel of the contactor 45 of the slide-wire assembly 16 and over-travel of the pen arm 224. Due to the relatively high inductive reactance to resistance ratio of the motor 24 and due to the lack of transformer action when the motor is stalled, it is found that when the motor is thus stalled the current flow through the motor is less than when it is actually running so that the motor 24 does not heat up under these stalled conditions. By reason of this arrangement the use of limit switches or equivalent devices for stopping operation of the motor 24 is entirely eliminated.

In order to permit rapid operation of the motor 24 and still prevent "hunting" the response of the motor 24 must be correlated with the unbalancing and rebalancing actions of the potentiometer system, especially when the range of operation of the potentiometer system is changed. This is accomplished by adjusting the sensitivity adjustment between the second and third stages of amplification of the amplifier 17. By moving the contactor 172 upwardly the amplitude of swing of grid 148 is increased and by moving the contactor 172 downwardly the amplitude of swing is decreased. This accordingly adjusts the sensitivity of the amplifier 17 whereby the response of the motor 24 is exactly correlated with the action of the potentiometer system. The amplifier 17 may, therefore, be universally applied to potentiometer systems regardless of the operating range of the potentiometer.

When the potentiometer system of this invention is utilized for purpose of control, some provision must be made for closing the fuel valve 12 if the potentiometer system becomes inoperative. The system may become inoperative when it fails to impress a signal upon the grids 182, 185, 188 and 191 of the vacuum tubes 22 and 23. This may be caused by short-circuiting or opening of the thermocouple or potentiometer circuit, short-circuiting or opening of the transformer 19, failure of the vibrator 18 or failure of the tubes 20 and 21 and the connections thereto. If any of these contingencies occur the signal would not be placed upon the grids of the vacuum tubes 22 and 23 and it would, therefore, be impossible to operate the reversible motor 24. Under these conditions the furnace temperature may become excessive causing damage to the furnace or possibly serious explosions. In order to avoid this difficulty the right-hand portion of the secondary 128 of transformer 125 is connected to the grids of the motor drive vacuum tubes 22 and 23 through the resistances 196 and 195. The right-hand portion of the secondary 128 operates to place a small alternating potential upon the grids 182, 185, 188 and 191 which is 180 degrees out of phase with the supply voltage. This small alternating voltage supplied to the grids acts in the same manner as an increase in temperature in the furnace 10 to drive the motor 24 in a counter-clockwise direction which drives the pen arm 224 up scale and moves the valve 12 to a closed position. Accordingly, in case of failure of the potentiometer system the fuel valve 12 is moved to a closed position. Inasmuch as the vacuum tubes 22 and 23 are connected in parallel it is unlikely that there would be a failure of both of these tubes at the same time which would prevent operation of the reversible motor 24. This continual alternating bias supplied for safety purposes to the grids of the motor drive vacuum tubes 22 and 23 is compensated for in the potentiometer circuit by adjusting a small amount the contactor 45 of the slide-wire assembly 16 with respect to the cable drum 43 so that when the motor 24 is stationary a relatively small unbalance is present in the potentiometer circuit, this relatively small unbalance acting to counteract the small safety bias placed on the grids of the motor drive tubes 22 and 23. If a conductive failure should occur in the rectifier section of the vacuum tube 21, 60 cycle alternating voltage would be applied to the grids 182, 185, 188 and 191 of the motor drive tubes 22 and 23. The secondary winding 128 of the transformer 125 may be so wound that the 60 cycle alternating voltage applied to the grids upon conductive failure will be 180° out of phase with the line voltage to drive the reversible motor 24 in a direction to move the pen up-scale and to move the valve 12 to the closed position.

The two amplifying vacuum tubes 20 and 21 are selected primarily for purposes of amplification and, for example, these tubes may be type 7F7 tubes. The motor drive vacuum tubes 22 and 23 are selected primarily for power driving purposes and, for example, are type 7N7 tubes. If one of the motor drive vacuum tubes should burn out the other tube will operate the reversible motor 24 satisfactorily although possibly not quite as efficiently. If one of the amplifier vacuum tubes 20 or 21 should burn out then the system would be rendered inoperative. Under these conditions, the defective tube 20 or 21 may be replaced by one of the motor drive vacuum tubes 22 or 23 if an amplifying vacuum tube is not immediately available. In this respect the amplifying tubes and the motor drive tubes are interchangeable. The system will operate satisfactorily but may not be quite as accurate or efficient as before.

It is found that a potentiometer system of this type is affected to some extent by stray currents which may be induced into the potentiometer system. These stray currents tend to cause the potentiometer to give false indications of temperature existing within the furnace. In order to eliminate or reduce the effects of these stray currents various steps have been taken. The resistance 108 connected in series with the negative thermocouple lead and the condenser 111 connected across the thermocouple perform a twofold purpose. They act as a filter for reducing to a minimum alternating stray currents induced into the thermocouple leads and also act as a damping device to prevent "hunting" of the motor 24. Any 60 cycle stray current which is induced in the thermocouple leads and which is not entirely eliminated by the resistance 108 and condenser 111 is chopped up by the vibrator 18 into 120 cycle alternating current and this 120 cycle alternating current has no effect upon the motor 24 as was pointed out above in connection with the mode of operation of the motor 24. The positive thermocouple lead is connected to ground through the conductor 244 and continuous conductor 136. Any circulating current which might be set up in the thermocouple or the thermocouple leads is conducted directly to ground without significantly affecting the operation of the potentiometer system. While a direct connection has been shown the conductor 244 may include a condenser, an inductance or a resistance. The case 138 of the amplifier 17, the frame of the vibrator 18, the frame and shields of the transformer 19 and frame, shields and secondaries of the transformer 125 are all connected to ground through the continuous conductor 136 for stray elimination purposes. The thermocouple leads 100 and 102 may be transposed and/or shielded in conduit which is grounded for further reducing the effects of strays.

In order to standardize the potentiometer circuit, that is, adjust the dual vernier battery rheostat to maintain a predetermined potential across the slide-wire assembly, the three-way switch 57 is moved downwardly to the standardize position. Engagement of contact 67 with contact 76a connects the negative end of the standard cell 246 through checking terminal 104 to the terminal 72 of the transformer 19. Movement of the contact 65 out of engagement with the contact 74a breaks the connection from the slide-wire assembly to the terminal 87 of the vibrator and engagement of contact 65 with contact 72a connects the negative end of the standard cell 246 through resistance 247 to the terminal 87 of the vibrator 18. Movement of the contact 66 into engagement with the contact 73a connects the negative end of the standard cell 246 through resistance 247 to the point 109 of the potentiometer circuit. Movement of the contact 64 out of engagement with the contact 71a breaks the connection between the negative thermocouple lead and the point 109 of the potentiometer circuit. Movement of the contact 63 into engagement with the contact 68 completes a shunt circuit for the right-hand end of the secondary 128 of the transformer 125 and the resistance 196 thereby removing the safety bias from the grids of the motor drive vacuum tubes 22 and 23. In other words, when the three-position switch 57 is moved to the standardize position, the collector bar 48 of the slide-wire assembly 16 and the thermocouple 13 are disconnected from the circuit and the amplifier 17 including the vibrator 18 and the transformer 19 is connected across the resistance 247 which in turn is connected in series with the negative end of the standard cell 246 and the point 109 of the potentiometer circuit.

The voltage produced by the standard cell 246 opposes the voltage drop across resistance 40 produced by the battery 33 and any difference in the voltages causes a current flow through the resistance 247 in one direction or the other depending upon which voltage is greater. This current flow through the resistance 247 is detected and amplified by the amplifier 17 to cause the motor 24 to rotate in one direction or the other. This rotation of the motor 24 indicates that the current produced by the battery 33 is different than that produced by the standard cell 246. The dual vernier rheostat in series with the battery 33 is then adjusted until rotation of the motor 24 ceases. When this occurs the current produced by the battery 33 produces a voltage drop across the resistance 40 which is equal to the voltage produced by the standard cell 246 and the potentiometer circuit has been standardized. Following this standardization the switch 57 is then returned to the run position for normal operation. The safety bias applied to the grids of the motor drive tubes 22 and 23 is eliminated during the standardizing operation by the above referred-to shunt circuit so that accurate standardizing of the potentiometer system may be obtained.

In order to check the amplifier for faulty operation and in order to check for the presence of stray currents which may affect the operation of the potentiometer system the three position switch 57 is moved to check position. Movement of the contact 66 into engagement with the contact 75a connects the terminal 72 of the transformer 19 directly to the terminal 87 of the vibrator 18, thereby shunting out the amplifier from the potentiometer circuit. Movement of the contact 64 out of engagement with the contact 70a disconnects the negative thermocouple lead from the point 109. When the switch is moved to this position the motor 24 should not operate but if it does, such operation can be attributed to one of two things, faulty operation of the amplifier 17 or the introduction of leakage currents into amplifier 17 through the thermocouple leads. The system may then be checked more thoroughly to determine the exact cause of motor operation and then remedied. Here again, the safety bias normally applied to the grids of the motor drive vacuum tubes is eliminated during the checking operation by engagement of the contacts 63 and 69 in order to provide accurate checking.

Referring now to Figs. 7, 8, 9 and 10, the general assembly of the potentiometer instrument of this invention is illustrated. The potentiometer instrument is housed in a casing generally designated at 250 which is preferably formed of sheet material such as sheet steel. The casing is constructed of a bent piece of sheet metal forming a top portion 251, a back portion 252 and a bottom portion 253. The top portion 251 and the bottom portion 253 are bent outwardly and welded to a steel frame 254. Side plates 255 are provided with bent-over flanges which are welded to the steel frame 254 and are also welded to the top, back and bottom sections 251, 252 and 253, respectively, of the case. The case has a flanged edge formed by the steel frame 254. Suitable mounting lugs 256 may be secured to the case for clamping the flange formed by the steel frame 254 to a panel board for flush mounting purposes. The clamping means 256 are illustrated in more detail in Figs. 28 and 29.

A door 258 for the case 250 is hinged to the case by means of hinge pins 259 extending between the door 258 and upper and lower flanges of the steel frame 254 of the case. The door is provided with a combined latch and lock 260 engaging a catch 260' for holding the door closed. In order to seal the case when the door is closed, the door is provided with a gasket 261 which abuts against the turned down flanges of the case where they are welded to the steel frame 254. The door of the case is provided with a large circular opening in which is secured a scale 262 and a glass 263 by means of clamps 264 detachably secured to the door 258. The clamps 264 are made of resilient material to hold resiliently the glass and scale in place. This acts to prevent breaking of the glass if external pressure is applied thereto. When the potentiometer instrument is an air control instrument, the door is provided with additional openings 265 provided with glass so that gauges 266 and 267 indicating the air pressure on the valve and the air pressure of the supply line, respectively, may be seen from outside of the case when the door 258 is closed. If, however, the instrument is not an air control instrument the openings 265 are of course omitted.

A control point adjusting knob which may be in the form of a screw head 269 is located on the outside of the door for the purpose of adjusting the control point of the control instrument from the outside of the instrument. The control point adjusting knob 269 extends through the door and is provided at its inner end with a screwdriver head 270 which is adapted to engage an internal control point adjusting knob 300. A spring 271 urges the screwdriver head 270 of the control point adjusting knob of the door inwardly into engagement with the internal control point adjusting knob 300 when the door is closed. The screwdriver head 270 is tapered so that it fits snugly in the slot of the internal control point adjusting knob 300. This effectively prevents backlash between the internal and external control point adjusting knobs.

A relatively rugged metal strip 273 is welded to the left-hand side of the instrument case and this metal strip carries a pair of hinge pieces 274. Cooperating hinge pieces 275 are carried by a frame 276, the frame being hinged in the casing by hinge pins located in the hinge pieces 274 and 275. The frame 276 is, therefore, capable of being swung into and out of the case 250. When the frame 276 is swung into the case, it is held in position by a latch arrangement 277 shown more in detail in Figs. 30 and 31.

A plate 280 is secured to the frame 276 at its upper end by means of screws 281. Extending from the plate 280 are two studs 282 and secured to the frame 276 are resilient studs 283. A chart plate 284 having keyhole slots cooperating with studs 282 and 283 is detachably held in place in front of the frame by these studs. The chart 225 upon which the temperatures are recorded is frictionally mounted on a chart hub 286 (Fig. 10), the chart hub 286 being provided with an eccentrically located pin 287 which engages an eccentrically located hole in the chart 225. Rotation of the chart hub 286 is, therefore, transmitted to the chart 225. Some of the clips 264 which hold the scale 262 and the glass 263 in place in the door 258 are provided with extensions 288 which hold the chart 225 against the chart plate 284 when the door is closed. The pen arm 224 operated by the reversible motor 24 carries a pen 289 for recording on the chart 225 the temperature existing within the furnace. An indicator 290 cooperating with the chart 225 indicates the control point setting of the control instrument.

A pointer 292 cooperates with the scale 262 and is also driven by the reversible motor through a shaft 371 which is concentric with the chart hub 286. The pointer 292 is carried by a hub 293 which is detachably secured to this shaft and when the hub 293 is disengaged from the shaft it is rotatably supported by a bracket 294 which is pivotally mounted in the hinge pins for the frame 276. In order to replace the chart the pointer 292 and hub 293 are swung outwardly on the bracket 294 and the pen arm 224 is lifted upwardly and placed on a pen holder 295 carried by the chart plate 284. The pen holder 295 is provided with a receiving edge 296 for the pen arm 224. The lifting of the pen arm 224 away from the chart onto the pen holder 295 is permitted by a strain release connection which will be explained more fully hereafter. The chart is then taken off and replaced. When the chart is replaced the pen is restored to its normal position on the chart and the pointer and hub are swung back in place and secured to the concentrically located shaft. A pointer 297 carried by the pen holder 295 cooperates with the time markings on the chart 225 to properly time the chart.

Figure 10:
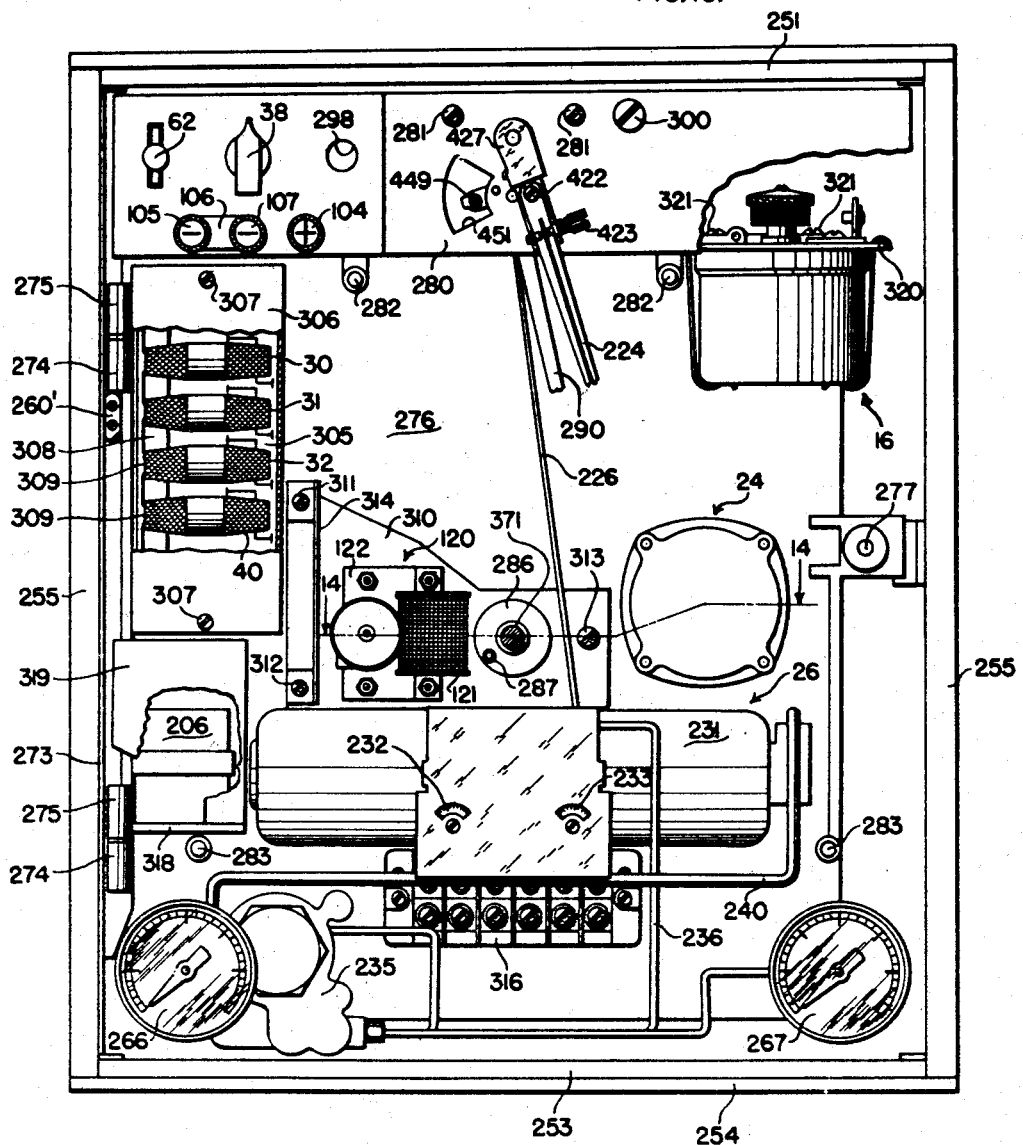
Fig. 10 is a front elevational view of the instrument with parts broken away and with the door, pointer and chart plate removed showing the front of the swinging frame.

The plate 280 carries the checking terminals 104, 105 and 107 so that checking of the instrument from the front of the case is made possible. The plate 280 also carries the dual vernier rheostat, the knob of which is shown at 38. In addition the three position switch 57 utilized for running, standardizing and checking purposes is carried by the plate 280 and the operating handle 62 thereof is shown in Figs. 9 and 10. The plate 280 is also provided with an opening 298 in which the thermometer 110 may be inserted for calibrating purposes, the cold junction terminals and the cold junction compensating resistance being located directly behind this opening 298. The plate 280 also carries the internal control point adjusting knob 300 which preferably has a screw head cooperating with the screwdriver head 270 of the external control point adjusting knob 269 when the door 258 is closed.

The double pole single throw switch 117 which controls the supply of power to the instrument extends through the chart plate 284 at the left-hand side of the chart 225 so that the power may be turned on and off the instrument from the front of the instrument.

Secured to the frame 276 and spaced forwardly of the frame is a panel 305 preferably made of insulating material. Upon this panel are mounted the resistances 30, 31, 32 and 40. These resistances may be of the cylindrical type shown and described in application Serial Number 391,319 filed by F. P. A. Wagner on May 1, 1941, and issued into Patent 2,357,241 on August 29, 1944. The panel 305 carries a bracket 308 provided with lugs 309 and the ends of the resistances are slipped over the lugs to hold the resistances in place. The resistances are provided with leads which are secured to suitable terminals on the panel 305 to facilitate the various electrical connections. The panel 305 and the resistances located thereon are enclosed by a cover 306 secured to the frame 276 by means of screws 307. The cover 306 acts as a shield to reduce the effects of stray electrical currents on the resistances.

The chart drive motor generally designated at 120 and having a field winding 121 and a core structure 122 is suitably mounted on a plate 310 which in turn is secured to the frame 276 by means of screws 311, 312 and 313. The chart drive motor 120 may be an inexpensive Warren Telechron motor of the synchronous type. In addition to securing the plate 310 to the frame 276 the screws 311 and 312 carry a shield 314 to reduce further the effect of any stray electrical currents emanating from the chart drive motor 120 on the resistances 30, 31, 32 and 40.

The reversible motor 24 is carried on the front of the frame 276 and the shaft carrying the drive pinion 214 extends through the frame 276 to the back of the frame. Also mounted on the frame 276 is the control device generally designated at 26, the body portion 231 thereof being secured to the front of the frame. The pneumatic relay 235 is also mounted on the front of the frame 276. The gauge 266 is carried by the pneumatic relay and the gauge 267 is carried by the frame. The piping connections 236 and 240 between the control device 26 and the pneumatic relay 235 and the piping connection between the pneumatic relay and the gauge 267 are shown in Fig. 10. A terminal block 316 is secured to the front of the frame 276 to facilitate wiring connections to the various electrical devices carried by the frame.

The condensers 206 and 211 for the reversible motor 24 are carried by a ledge 318 formed on the frame 276. These condensers are located in back of the switch 117. The condensers 206 and 211 are enclosed by a cover 319, which is broken away in part to show the condenser 206. The cover 319 acts as a shield to prevent stray currents emanating from the condensers from affecting the rest of the instrument and also acts as a support for the switch 117. The slide-wire assembly 16 is provided with a mounting plate 320 which is secured by screws 321 to a forward extending flange on the frame 276.

Figure 11:
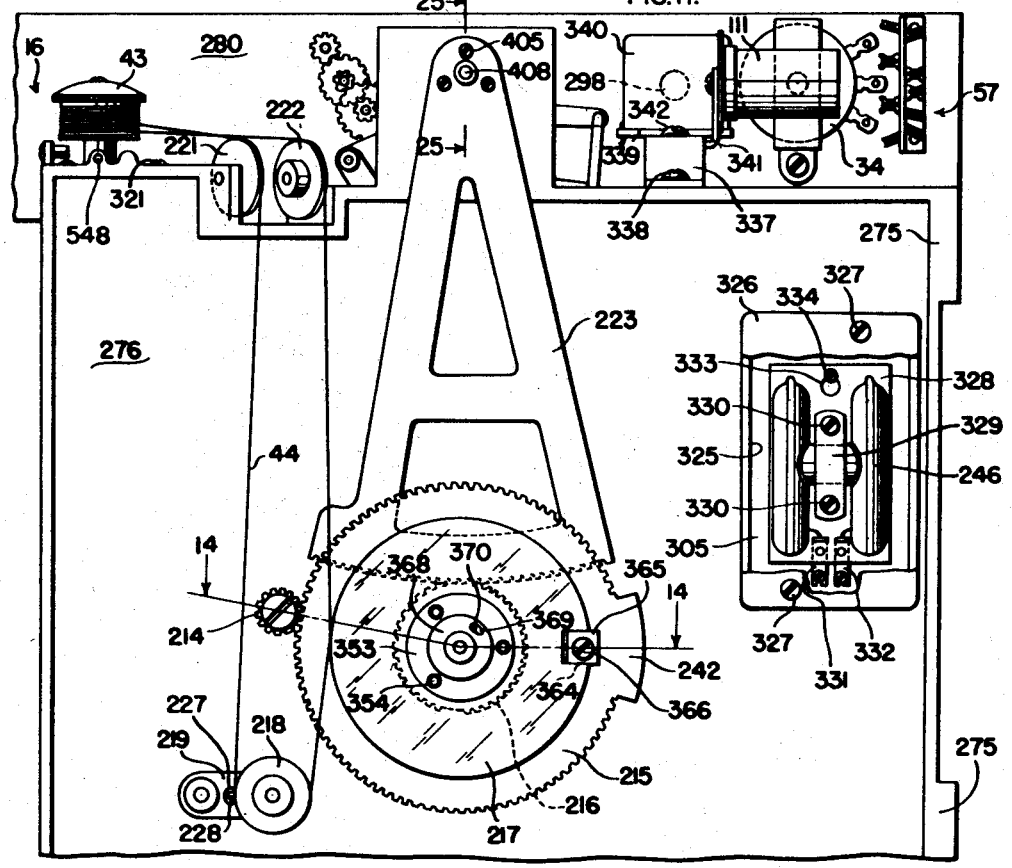
Fig. 11 is an elevational view of the back of the swinging frame with parts broken away.

Fig. 11 is a view of the back of the frame 276. The frame 276 is provided with a rectangular opening 325 which is normally closed by a cover 326 held in place by screws 327. The cover 326 is shown broken away in Fig. 11 to illustrate the standard cell 246. The standard cell 246 is mounted on a panel 328 by means of a bracket 329 and screws 330. Terminals 331 and 332 are riveted to the panel 328 and form electrical leads for the standard cell 246. The terminals 331 and 332 are secured to posts carried by the resistance carrying panel 305. The panel 328 is also provided with a keyhole slot 333 which is slid over a screw 334 carried by the panel 305. The screw 334 and the terminals 331 and 332, therefore, act as a means for removably securing the standard cell 246 and its panel 328 to the panel 305 carrying the resistances 30, 31, 32 and 40. A compact arrangement, locating the various resistances and the standard cell in one unit, is therefore provided. The plate 326 and the cover 306 act as a shield to prevent stray electrical currents from affecting the resistances.

At the top of Fig. 11 the three position switch 57 and the dual vernier rheostat 34 are shown mounted on the plate 280. A bracket 337 is secured to the plate 280 and is also secured by a screw 338 to the frame 276. This bracket 337 carries a base 339 preferably made of insulating material upon which are mounted the cold junction terminals 101 and 103 and the cold junction compensating resistance 39. The cold junction terminals and the cold junction compensating resistance are enclosed in a cover 340 carried by the base 339. The details of this arrangement are shown in Fig. 27. The cover 340 enclosing the cold junction compensating resistance 39 is located directly behind the opening 298 in the panel 280. When the thermometer 110 is inserted in the opening 298 in the panel 280 it lies inside of the cold junction compensating resistance 39 to measure the actual temperature of this resistance element. Since the cold junction terminals 101 and 103 are located in the same housing 340 as the cold junction compensating resistance 39, these elements are necessarily at the same temperature. This construction provides accurate automatic cold junction compensation.

Referring again to Fig. 11, a bracket 341 is secured by means of a screw 342 to the bracket 337 and the bracket 341 carries the condenser 111 which acts in conjunction with the resistance 108 to provide filtering of stray electric currents and damping of the reversible motor 24.

The pinion 214 operated by the reversible motor 24 engages the gear 215 provided with the lug 242. The gear 215 carries the cable drum 217 and the gear 216 which drives the sector 223. The cable drum 217 operates the cable 44 over the pulleys 218, 221 and 222 to operate the cable drum 43 of the slide-wire assembly 16.

Figure 14:
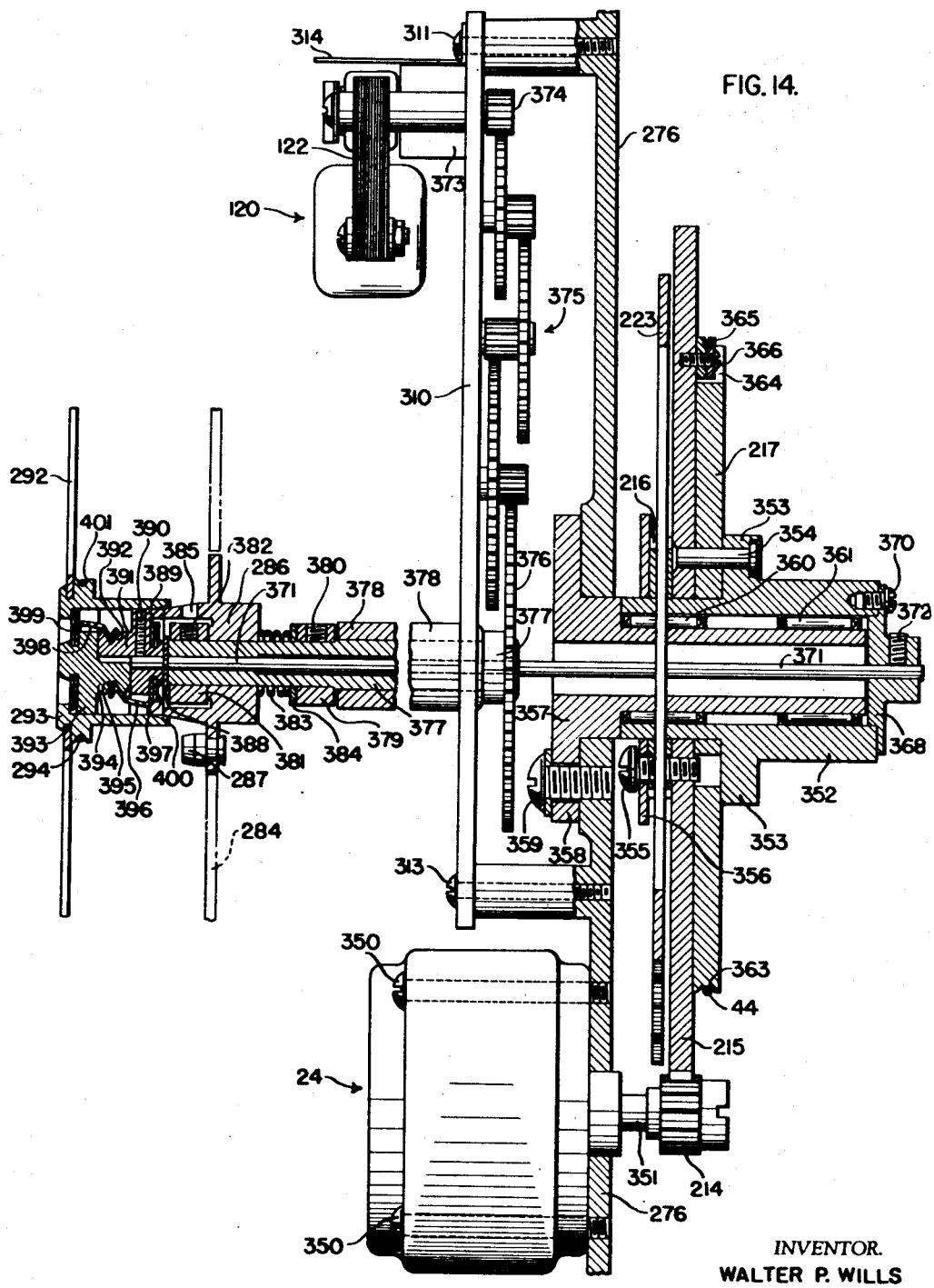
Fig. 14 is a horizontal sectional view through the swinging frame taken substantially on the line 14—14 of Figs. 10 and 11.

Fig. 14 is a sectional view taken substantially along the lines 14—14 of Figs. 10 and 11, illustrating the manner in which the reversible motor 24 drives the pointer 292 and the sector 223 and the manner in which the clock motor 120 drives the chart 225. The reversible motor 24 is carried by the frame 276 by means of screws 350. The reversible motor 24 includes a reduction gearing (not shown) for operating a shaft 351 which extends through the frame 276 and which carries the pinion 214. The pinion 214 meshes with the gear 215 which is mounted on a cylindrical hub 352. The cylindrical hub 352 is provided with a flange 353 and three rivets 354, one of which is shown in Fig. 14, rigidly secure the flange 353, the gear 215 and the cable drum 217 together. Three screws 355, one of which is shown in Fig. 14, secures a plate 356 and the gear 216 to the gear 215. Accordingly the gear 215, the gear 216, the cable drum 217 and the cylindrical hub 352 are all fastened together for simultaneous rotation. The gear 216 operates the gear sector 223.

A trunnion 357 having a flange 358 is secured to the frame 276 by means of three screws 359, one of which is shown in Fig. 14. The trunnion 357 is concentric with the cylindrical hub 352 and located between the trunnion 357 and the cylindrical hub 352 are two sets of needle bearings 360 and 361, respectively, whereby substantially frictionless rotation of the cylindrical hub 352, the cable drum 217 and the gears 215 and 216 on the trunnion 357 is provided.

The cable drum 217 is provided with a circumferential groove 363 in which is located the cable 44. The cable drum 217 is provided with a notch 364, in which is located a two piece clamping means 365. The cable 44 is secured between the two pieces of the clamping means 365 which in turn is secured to the gear 215 by means of a screw 366. By tightening down on the screw 366 the cable 44 is clamped with respect to the cable drum 217 so that slipping of the cable 44 with respect to the cable drum 217 is entirely prevented.

Located on the end of the cylindrical hub 352 is a flanged member 368. The flanged member 368 as illustrated in Fig. 11 is provided with a slot 369 and a screw 370 extends through the slot 369 for adjustably securing the flanged member 368 to the cylindrical hub 352. By loosening the screw 370 the flanged member 368 may be relatively positioned with respect to the cylindrical hub 352 and by tightening down on the screw 370 the flanged member 368 may be secured to the cylindrical hub 352 in a desired position. One end of a shaft 371 is secured to the flanged member 368 by means of a set screw 372 and the other end of the shaft extends forwardly for the purpose of operating the pointer 292. Thus it is seen that the pointer 292 is operated from the gear 215 and the relative position of the pointer 292 with respect to the gear 215 may be adjusted by the slot and screw connection 369, 370 for calibration purposes.

The clock motor 120 is secured to the plate 310 which in turn is secured by the screws 311, 312 and 313 to the frame 276. The rotor of the clock motor 120 operates through a reduction gearing contained in a case 373 for operating the pinion 374 located on the opposite side of the plate 310 from the clock motor 120. The pinion 374 operates through a reduction gearing 375 to rotate a gear 376. The gear 376 is utilized for rotating the chart hub 286 and hence the chart 225. For purposes of illustration it is assumed that the clock motor 120 causes the chart hub 286 to make one revolution in twenty-four hours, but it is obvious that by substituting a different gear train for the gear train 375 the chart hub 286 may be rotated at any desired speed.

The gear 376 is staked to a sleeve 377 which is rotatably mounted in a sleeve bearing 378 which in turn is staked to the plate 310. A collar 379 is secured to the sleeve 377 by a set screw 380 and operates in conjunction with the sleeve bearing 378 to prevent longitudinal movement of the sleeve 377. A collar 381 is also mounted on the sleeve 377 by means of a set screw 382 and located between the collar 379 and the collar 381 on the sleeve 377 are the chart hub 286, a spring 383 and a washer 384. The spring 383 urges the chart hub 286 into engagement with the collar 381 so that the chart hub 286 is frictionally driven by the sleeve 377. This permits manual repositioning of the chart hub 286 with respect to the sleeve 377 when desired for purposes of timing the chart. As pointed out above the chart hub 286 is provided with an eccentrically located pin 287 for receiving the chart 225. The pin 287 and the chart hub 286 are tapered slightly so that the chart is frictionally held in place on the chart hub 286. The flanged portion of the chart hub 286 is in line with the chart plate 284 to provide a smooth backing for the chart. The chart hub 286 is provided with an opening 385 to accommodate a suitable tool for tightening the set screw 382.

The outer portion of the shaft 371 is provided with an annular groove for receiving a cotter washer 388 for the purpose of holding the shaft 371 in the correct longitudinal position. Mounted on the end of the shaft 371 and abutting the cotter washer 388 is a cylindrical member 389. The cylindrical member 389 is secured to the end of the shaft 371 by means of a set screw 390. The cylindrical member 389 is provided with a rectangular extension 391 which in turn is provided with a groove 392. Abutting against the rectangular extension 391 is another cylindrical member 393 having a rectangular extension 394 which engages the rectangular extension 391. The rectangular extension 394 is also provided with a groove 395. A spring detent member 396 backed up by a washer 397 is staked to the cylindrical member 389 and likewise a spring detent member 398 backed up by a washer 399 is staked to the cylindrical member 393. The spring detent members 396 and 398 engage in the grooves 395 and 392, respectively, to hold detachably the two cylindrical members 389 and 393 together. The rectangular extensions 391 and 394 abutting each other maintain the angular positions of the cylindrical members 389 and 393 fixed with respect to each other. The pointer hub 293 is provided with a sleeve extension and the cylindrical member 393 is held in the sleeve extension of the pointer hub 293 by a forced fit. The sleeve extension of the pointer hub 293 slides over the cylindrical member 389 for the purpose of supporting the hub. In order to facilitate this sliding movement the cylindrical sleeve is provided with a taper at 400. The pointer 292 is staked to the hub 293 so that rotation of the hub also causes rotation of the pointer. The hub 293 is provided with an annular groove 401 for accommodating the bracket 294.

By reason of the above construction the pointer 292 is rotated upon rotation of the shaft 371 when the parts are in the position shown in Fig. 14. By pulling on the pointer hub 293, the hub 293 is separated from the cylindrical member 389 so that the chart may be removed from the chart hub 286. When the pointer hub 293 is separated from the cylindrical member 389, it is supported by the bracket 294. When the hub 293 is returned to the position shown in Fig. 14 it is held in place by the detent members 396 and 398 and because of the abutting of the two rectangular extensions 391 and 394 the pointer hub 293 is necessarily restored to the correct angular position. The cotter washer 388 also acts as a spacer for assisting in the assembly of the mechanism just described.

Figure 12:
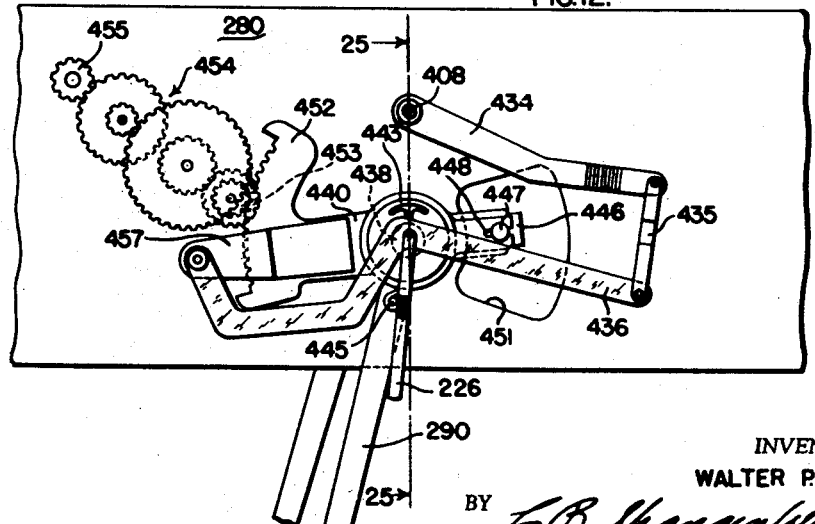
Fig. 12 is a view of the back of the upper panel of the instrument showing the control point adjusting means of the control mechanism.

Fig. 25 is a vertical sectional view taken substantially along the lines 25—25 of Figs. 11 and 12. The gear sector 223 is secured by three screws 405, one of which is shown in Fig. 25, to a flanged sleeve 406. The flanged sleeve 406 is fastened by a set screw 407 to a shaft 408. The flanged sleeve 406 is journaled in a bearing 409 securely fastened in the frame 276. The frame 276 is provided with an oil hole 410 for feeding oil to an annular groove 411 in the bearing 409. Holes 412 feed oil from the annular groove 411 to the bearing surface between the bearing 409 and the flanged sleeve 406. A collar 413 is mounted on the flanged sleeve 406 by means of a set screw 414 and the collar 413 abuts the bearing 409 to prevent longitudinal movement of the flanged sleeve 406.

The frame 276 is provided with an extension 416 to which the plate 280 is secured by means of the screws 281. Staked in the plate 280 is a bearing 418 provided with an oil hole 419. Rotatably mounted in the bearing 418 is a sleeve 420 to which is staked an arm 421. The pen arm 224 is mounted on the arm 421 by a pivot pin 422 and the pen arm 224 may be adjusted with respect to the arm 421 about the pivot 422 by a micrometer adjustment 423. One end of the sleeve 420 acts as a bearing for the shaft 408. The forward end of the shaft 408 is provided with splines 425 which carries by means of a drive fit a collar 426. Staked to the collar 426 is an arm 427 having an extension 428. A spring 429 coiled around the collar 426 has one end engaging the extension 428 and the other end engaging the arm 421 for the purpose of maintaining the arm 421 in engagement with the extension 428. Normally the arm 421 follows the extension 428 and since the extension 428 is operated by the shaft 408, the arm 421 and hence the pen arm 224 are operated coextensively with the shaft 408. The spring 429 provides a strain release connection for the pen arm 224 whereby the pen arm may be moved from the chart and placed on the pen holder 295 as illustrated in Fig. 9. One end of a coil spring 430 mounted on the shaft 408 engages the extension 416 of the frame 276 and the other end engages the set screw 414. The spring 430 tends to urge the shaft 408 in one direction thereby taking up any blacklash in the gearing between the gear sector 223 and the gear 216.

Referring now to Figs. 12, 25 and 26, a collar 432 is fastened to the shaft 408 by a set screw 433 so that the collar 432 rotates with the shaft 408. Staked to the collar 432 is a lever arm 434. One end of a link 435 is pivoted to the lever arm 434 and the other end is pivoted to one end of a floating lever 436. Staked to the plate 280 is a pin 438 and mounted on this pin are a washer 439, the control point indicator 290, a lever 440, a spiral spring 441 and a backing washer 442. These members are all held on the pin 438 by means of a cotter washer 443. One end of the spring 441 engages in a slot 444 in the pin 438 and the other end of the spring engages a pin 445 carried by the control point indicator 290. The control point indicator 290 is provided with an extension 446 in which is mounted an eccentric 447 which cooperates with a slot 448 formed in the lever 440. A screw head 449 carried by the eccentric 447 and frictionally held in place by a spring 450 operates to rotate the eccentric 447 to provide a micrometer adjustment between the lever 440 and the control point indicator 290.

The lever 440 is provided with a gear sector 452 which meshes with the pinion 453. The pinion is operated through a gear train 454 carried by the plate 280 by a pinion 455 operated by the control point adjusting knob 300. Welded to the lever 440 is an arm 457 which pivotally carries the other end of the floating lever 436. The rod 226 which operates the control device 26 is connected to the middle of the floating lever 436.

As the temperature increases the lever 434, as viewed in Fig. 12, is rotated in a clockwise direction which causes pivotal movement of the floating lever 436 to move the rod 226 downwardly which in turn causes closing of the fuel supply valve 12. Conversely, upon a decrease in temperature the lever 434 is operated in a counter-clockwise direction to cause the rod 226 to move upwardly which in turn causes the valve 12 to move toward an open position. By adjusting the control point adjusting knob 300 the lever 440 is rotated to move the left end of the floating lever 436 upwardly or downwardly which causes the rod 226 to assume a different position with respect to the position of the lever 434. In this manner the control point of the control apparatus may be adjusted. The control point indicator 290 operated by the lever 440 indicates on the chart the control point setting. The micrometer adjustment afforded by the eccentric 447 provides a means for calibrating the control point adjustment. The plate 280 is provided with an opening 451 so that the eccentric 447 may be adjusted through the screw head 449 from the front of the instrument.

Figure 13:
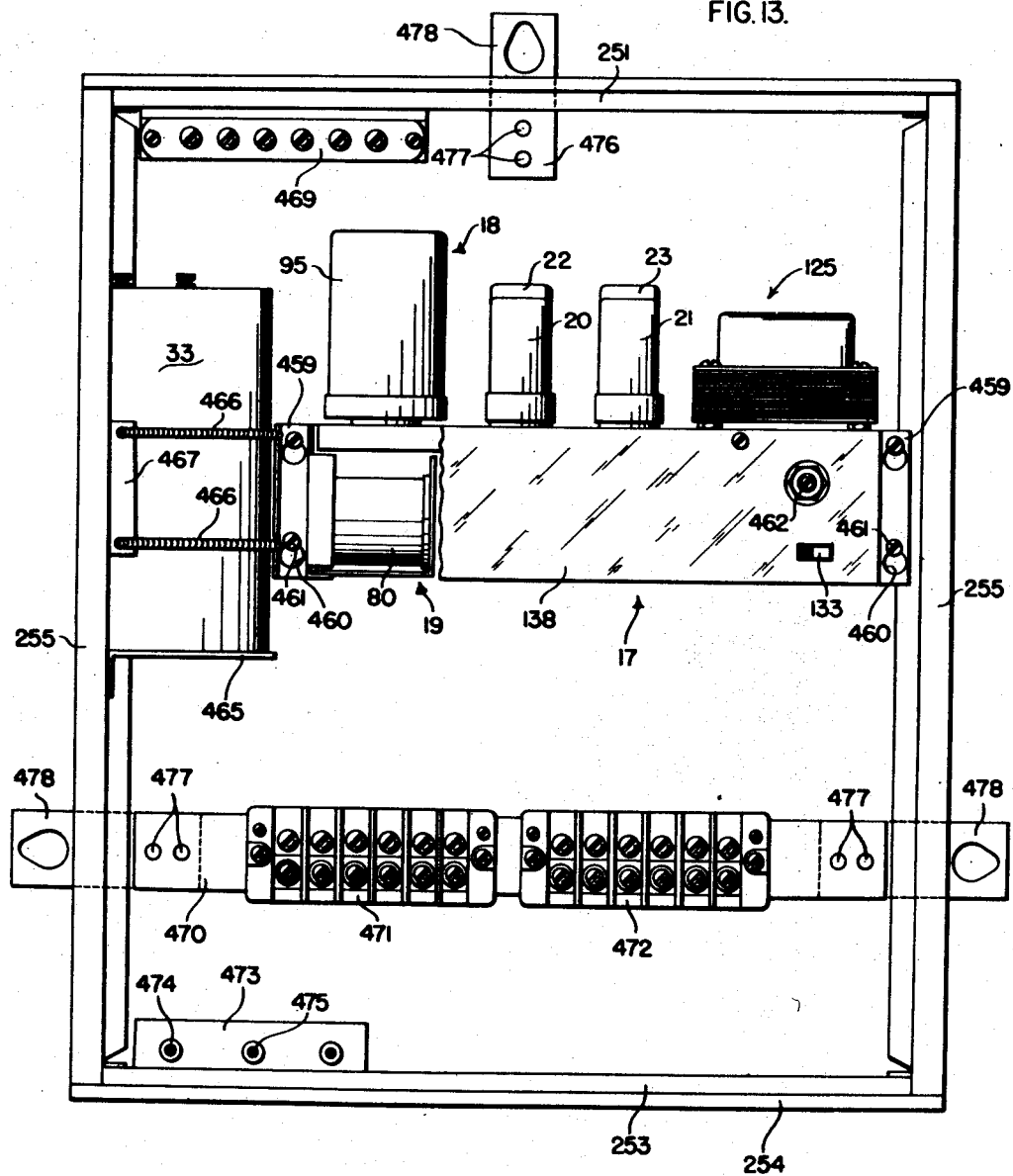
Fig. 13 is a front elevational view of the instrument with the door and swinging frame removed showing the interior of the instrument case.

The interior of the instrument case is shown in Fig. 13. The amplifier generally designated at 17 is secured to the back of the instrument case. In this connection the case 138 of the amplifier is provided with two brackets 459 which in turn are provided with keyhole slots 460, the keyhole slots cooperating with screws 461 carried by the back of the instrument case so that the amplifier 17 is detachably secured to the instrument case. As shown in Fig. 13 the transformer 19 is located within the amplifier case 138 while the vibrator 18, the vacuum tubes 20, 21, 22 and 23 and the power transformer 125 are located on top of the amplifier case 138. The switch 133 for adapting the amplifier for use with 110 or 125 volts extends through the front of the amplifier case 138. The amplifier case 138 also carries an adjusting screw 462 for operating the contactor 172 with respect to the resistance 171 for sensitivity adjustment.

A bracket 465 is secured to the instrument case and the battery 33 which may be in the form of a dry cell rests on this bracket. Springs 466 connected between the bracket 459 and a bracket 467 carried by the side wall of the instrument case hold the battery 33 in place.

At the upper portion of the instrument case a terminal block 469 is provided for facilitating the electrical connections. Near the bottom of the instrument case a reinforcing strip 470 is welded to the back of the instrument case and mounted on this reinforcement strip are terminal blocks 471 and 472 also to facilitate the wiring connections. Mounted on the bottom of the case is a block 473 having air connections 474 and 475. Connections by means of flexible air tubes (not shown) are made between the air connections 474 and 475 and the pneumatic relay 235 carried by the swinging frame 276, to supply air under pressure to the relay and to transmit air from the relay to the valve being controlled. Welded to the back of the case is a reinforcing strip 476, the reinforcing strips 470 and 476 being provided with tapped holes 477. Screws inserted in the tapped holes may hold brackets 478 in place for mounting the instrument on a wall or in front of a panel.

The details of construction of the slide-wire assembly 16 are shown in Figs. 15, 16, 16A and 17. A cylindrical core 480 upon which the slide-wire 46, the collector bar 48 and the resistance 54 are mounted is preferably made of ceramic, this material being a good insulating material and also having a temperature coefficient of expansion similar to that of the slide-wire resistance and collector bar. The inner surface of the cylindrical core 480 is provided with a shoulder 481 which is abutted by a plate 482. The plate 482 also abuts a shoulder 484 formed on a sleeve 483 and is held against the shoulder 484 by a lock washer 485 and a nut 486 secured on the sleeve 483. The sleeve 483 is provided with a shoulder 487 which abuts against the mounting plate 320 and the sleeve 483 is staked to the mounting plate 320. The cylindrical core member 480 is provided with a slot 488 which receives a pin 489 carried by the supporting plate 320 so that rotation of the cylindrical core member 480 with respect to the plate 320 is prevented. A rigid structure is therefore provided.

Figs. 18, 19, 20 and 21 show the manner in which the slide-wire 46 and the collector bar 48 are secured to the core member 480. The slide-wire 46, preferably made of manganin wire, is space wound on an insulated wire 47 such as Formex manganin wire. The right end of the slide-wire 46 as viewed in Fig. 18 is soldered to the wire 47 and of course the insulation is removed from the wire 47 at this point to provide an electrical connection between the slide-wire 46 and the wire 47 at that point. A lead wire 491 is flattened at one end as shown at 492 in Figs. 18, 20 and 21 and this flattened end is wrapped around the other end of the slide-wire 46 and is soldered thereto to form an electrical connection between the slide-wire 46 and the lead wire 491. The slide-wire 46 is wrapped around the core member 480 and is located on the core member 480 in a groove. The wire 47 extends through holes in the core member 480 and washers 492 and 493 soldered to the wire 47 hold the wire 47 and hence the slide-wire 46 on the core member 480. In a like manner the lead wire 491 is held in place by a washer 494 soldered to the lead wire 491.

The collector bar is formed by space winding the manganin wire 48 around a manganin wire 49. Here, the wire 49 is not provided with insulation so that the wires 48 and 49 are electrically conductive throughout their lengths. The collector bar is also wrapped around the core member 480 in a groove which is parallel with the groove containing the slide-wire 46. The wire 49 extends through openings in the core member 480 and washers 495 and 496 soldered to the wire 49 hold the wire 49 and hence the wire 48 in position on the core member 480. The core member 480 is also provided with a circumferential groove receiving the resistance 54.

The wire 49 of the collector bar and the wires 491 and 47 of the slide-wire extend upwardly through an opening in the mounting plate 320 to terminals 51, 52 and 53, respectively, carried by the terminal block 50. The terminals 51, 52 and 53 are held in spaced relation by a spacer member 498 made of insulating material and are clamped in place by means of screws 500 and a member 499, also made of insulating material.

By winding the slide-wire 46 on the wire 47 in the manner just described a loop is not formed and, therefore, there is no tendency for the slide-wire to pick up any stray electrical currents. Due to the fact that the leads between the slide-wire and collector bar and the terminals 51, 52 and 53 are extremely short there is no tendency for these leads to pick up stray electrical currents. The resistance 54 is connected across the wires 47 and 491 by soldering as illustrated in Fig. 16. The resistance 54 is so selected that the total resistance of the slide-wire assembly is a predetermined value, to provide a universal slide-wire assembly.

The upper and lower ends of the sleeve 483 are provided with bushings 502 and 503, respectively, and rotatably mounted in these bushings is a shaft 504 provided with a shoulder adjacent its upper end to limit downward movement thereof. A collar 505 is secured to the lower end of the shaft 504 by means of a pair of set screws 506 contacting flattened portions on the shaft 504. The collar 505 therefore rotates with the shaft 504. Staked to the collar 505 for rotation therewith is an arm 507 provided with a radial slot 508 and circumferential slot 509. Rotatably mounted on the collar 505 between the arm 507 and the collar 505 is another arm 510. The arm 510 carries an eccentric 511 operating in the radial slot 508 so that the arm 510 may be angularly adjusted with respect to the arm 507. A screw 512 carried by the arm 510 is utilized for clamping the arm 510 to the arm 507 after adjustment to the desired position. A spring arm 514 is carried between two pieces of insulating material 515 and 516 and the spring arm and the pieces of insulating material are secured to the arm 510 by means of rivets 517. The spring arm 514 is provided with a vertical slot 518 in which is mounted the contactor 45. The contactor 45 comprises a cylindrical portion located in the vertical slot 518 and a shaft 519 engaging the inner surface of the spring member 514. Preferably the contactor 45 is made of silver which is softer than the manganin wire forming the collector bar and slide-wire 48 and 46, respectively. Any wear that takes place will take place on the contactor 45 and not on the slide-wire and the collector bar. When the shaft 504 rotates to cause the contactor 45 to slide along the slide-wire and the collector bar, the contactor 45 moves upwardly and downwardly in the vertical slot 518 and this upward and downward movement causes rotation of the contactor 45 about its shaft 519. Accordingly, as the shaft 504 is rotated a new contact surface on the contactor 45 is continuously presented to the slide-wire and the collector bar. This assures a good wiping contact at all times.

The various parts of the slide-wire assembly 16 are enclosed in a case 521 which is held against the bottom surface of the mounting plate 320 by means of spring arms 522 carried by apertured ears 523. The case 521 not only protects the parts of the slide-wire assembly 16 from dirt and corrosive atmospheres but also acts as a shield to prevent stray electrical currents from affecting the operation of the slide-wire assembly. If desired the cover 521 may be provided with oil for immersing the slide-wire assembly in oil and this may be particularly desirable if the instrument is used in extremely corrosive atmospheres.

The upper end of the arm 510 is provided with a pointer 525 which cooperates with a relatively stationary pointer 526 carried by a bracket 527. The bracket 527 is provided with slots 528 and screws 529 extending through the slots 528 adjustably secure the bracket 527 to the underside on the mounting plate 320. When the instrument is calibrated at the factory for zero position, the marker on the pointer 526 is moved to line-up with the marker on the pointer 525 and then the bracket 527 is clamped in place by the screws 529. Accordingly, the position of the marker 526 indicates the zero position according to the factory calibration so that when the slide-wire assembly is disassembled for cleaning or repair purposes it can be readily restored to the original zero factory calibration.

The cable drum 43 which operates the slide-wire assembly 16 is formed of two parts. The first part 531 provided with cable grooves 532 is rigidly secured to the shaft 504 as by a drive fit so that the part 531 always rotates with the shaft 504. The second part 533 provided with a knurled edge 534 is adjustably connected to the shaft 504 and the first part 531 by a screw 535. As seen in Figs. 16 and 16A the undersurface of the first part 531 is provided with a groove 536 and a hole 537. A cylindrical bushing 538 is secured to one end of the cable 44 as by soldering and this bushing is inserted in the hole 537. The cable 44 extends along the slot 536 and then is wrapped around the first part 531 in the grooves 532. The cable then passes over the pulleys 221, 222 and 218 and the cable drum 217 and then returns to the first part 531 being wrapped around the remaining grooves 532 thereof. The second end of the cable 44 is also provided with a bushing 541 suitably secured thereto and this bushing 541 is inserted in a hole 540 formed in the second part 533. The cable 44 lies in a groove 539 also formed in the second part 533. By rotating the part 533 with respect to the first part 531 the effective length of the cable 44 is varied and, therefore, the tension of the cable 44 may be adjusted to the desired value. The screw 535 is then tightened to clamp the second part 533 in a fixed position with respect to the first part 531. Accordingly, the two part cable drum 43 in addition to anchoring the ends of the cable 44 and driving the slide-wire 16 also forms a means for adjusting the tension of the cable 44. In order to facilitate this adjustment the shoulder on the shaft 504 is provided with a hole 547 which lines up with a hole 548 in the frame 276 (see Fig. 11) when the slide-wire assembly is in the zero position. A pin may then be inserted through the hole 548 into the hole 547 for holding the lower member 531 of the cable drum 43 stationary in the zero position while the upper member 533 is being adjusted to secure the proper tension in the cable 44.

In assembling the instrument, the slide-wire assembly is moved to the zero position and held in that position by the pin extending through the holes 547 and 548. The gear 215 is moved to the zero position with the abutment 242 engaging the lower side of the pinion 214. The cable 44 is then wound in the grooves of the lower member 531 up to two grooves from the top, passed over the pulley 222, the drum 217 and the pulleys 218 and 221 and then wound in the top groove of the lower member 531 and then secured in the upper member 533. The upper member 533 is then rotated until the lower edge of the hole 227 engages the fixed pin 228 and then the upper member is backed off slightly. This fixes the proper tension in the cable 44. The cable 44 is then secured to the cable drum 217 by the two part clamping means 365. This method of assembly accurately positions the slide-wire assembly 16 with respect to the cable drum 217 and properly adjusts the cable tension. It will be noted that the bottoms of the grooves 532 are flat so that variations in the thickness of the cable 44 will not materially affect the effective length of the cable as would be the case if the grooves were V-grooves.

The lower member 531 is provided with a pair of arcuate eccentrically located holes 901, a cut 902 connecting the holes and a cut 903 connecting the cut 902 to the periphery of the lower member. These holes and cuts extend entirely through the lower member 531. The cut 903 is provided with a double taper hole 904 in which is located a conical wedge 905 and a screw 906. By tightening the screw 906 in the conical wedge 905, the conical wedge cooperates with the tapered hole 904, to spread the cut 903, this being permitted by the holes 901 and the cut 902. This increases the diameter or the circumference of the lower member 531. By properly adjusting the screw 906, the effective diameter or circumference of the cable drum 43 is adjusted whereby the correct amount of movement of the slide-wire contactor 45 with respect to a predetermined movement of the cable 44 may be obtained. The upper member 533 is provided with a radial hole 907 so that the screw 906 may be accessible for adjustment purposes.

The screw 535 is provided with a longitudinal hole 543 which opens into holes 544 and 545 formed in the shaft 504. The lower end of the hole 545 communicates through a radial opening 546 with the chamber in the sleeve 483 between the bushings 502 and 503. These holes and openings are provided for the purpose of supplying oil for lubricating purposes to the bushings 502 and 503.

The details of construction of the transformer 19 are schematically illustrated in Fig. 22. The core structure 75, the cover 80 and a plate shield 550 are all suitably carried by a base 551 preferably made of insulating material and carrying the terminals 72, 73, 74, 77, 78 and 81. The core structure 75 is rectangular in shape having legs 552 and 553. The primary winding 70 is preferably formed of two windings, the winding 70 being wound on the leg 552 and the winding 70' being wound on the leg 553. The windings 70 and 70' are so wound that when a current flows from the terminal 73 to terminal 72, it will cause a flux to flow in the core structure 75 in a clockwise direction and upon a reverse flow of current the flux will flow in the core structure in a counter-clockwise direction. The other primary winding 71 is also formed of two windings 71 and 71'. The winding 71 is wound on the winding 70 and the winding 71' is wound on the winding 70'. The windings 71 and 71' are connected between the terminal 72 and the terminal 74. The windings 71 and 71' are wound in the same direction as the windings 70 and 70' and, therefore, they produce fluxes in the core structure in the same manner as the windings 70 and 70'. Wrapped around the windings 71 and 71' are two shields 79 and 79', respectively. The shields 79 and 79' act to prevent the flow of primary current in the secondary windings 76 and 76'. The secondary winding 76 is wound around the shield 79 in the same direction as the primary windings 70 and 71 and the secondary winding 76' is wound around the shield 79' in the same direction as the windings 70' and 71'. The secondary windings 76 and 76' are connected between the terminals 77 and 78.

Due to the method of winding the primary and secondary windings a hum bucking construction is provided whereby any external electrical currents which tend to produce a current flow in the windings 70, 71 or 76, produce a substantially equal and opposite current flow in the windings 70', 71' and 76'. These equal and opposite currents buck each other so that the transformer is not affected by these stray electrical currents.

The cover 80, the core structure 75, the shielding plate 550 and the shields 79 and 79' are all connected to the terminal 81 which in turn is connected to ground whereby the transformer is maintained at ground potential. The cover 80 and the shielding plate 550 act as a shield to reduce still further the effects of stray electrical currents on the transformer.

The vibrator 18 may be of the type shown and described in application Serial Number 421,176, filed by Frederick W. Side on December 1, 1941. The details of construction of the vibrator 18 are shown in Figs. 23 and 24. The vibrator 18 is provided with a base 555 in which are mounted the terminals 87, 88, 89, 91, 92 and 94. A supporting plate 556 is secured to the base 550 by means of screws 557. A stud 558 provided with a screw threaded extension 559 is secured to the supporting plate 556 by means of a lock washer 560 and a nut 561. The end of the stud 558 is bifurcated having spaced apart ends 562 and 563. Located between the spaced apart ends 562 and 563 are an insulating pad 564, a spring contact arm 565 carrying the contact 85, a resilient stop 566, an insulating pad 567, the vibrating reed 83 carrying the contact 84, an insulating pad 568, a resilient stop 569, a spring contact arm 570 carrying contact 86 and an insulating pad 571. These elements are all clamped between the spaced apart ends 562 and 563, by a bolt 572 and a nut 573. The spring contact arms 565 and 570 are provided with ears 574 and 575, respectively, which are electrically connected to the terminals 88 and 89, respectively. The vibrating reed is provided with an ear 576 which is electrically connected to the terminal 87.

Riveted to the supporting plate 556 are studs 578 and 579 which carry adjustable stops in the form of screws 580 and 581 formed of insulating material. After the adjustable stops 580 and 581 are adjusted they are clamped in place by means of screws 582 and 583, respectively. The spring contact arm 570, carrying the contact 86, through its own resiliency engages the resilient stop 569 and the resilient stop 569 through its own resiliency engages the adjustable stop 581. In like manner the spring contact arm 565 engages the resilient stop 566 which in turn engages the adjustable stop 580. By adjusting the adjustable stops 580 and 581 the positions of the contacts 85 and 86 may be independently adjusted with respect to the contact 84 carried by the vibrating reed 83.

The permanent magnet 93 is secured to the supporting plate 556 by screws 586 and 587. The coil 90 is rectangular in shape and surrounds the vibrating reed 83 and also extends into the central aperture of the magnet 93. The coil 90 is held in place by a bracket 589 which in turn is secured in place by the screws 586 and 587. The end of the vibrating reed 83 is disposed within the coil 90 and is provided with an armature 590 which is riveted to the vibrating reed 83 by rivets 591.

The coil 90 acts on the armature 590 to vibrate the reed 83 at 60 cycles per second to cause the contact 84 to engage and disengage with the contacts 85 and 86. The permanent magnet 93 operates in conjunction with the coil 90 and the armature 590 in such a manner as to cause the armature 590 to vibrate in synchronism with the alternating supply voltage. By adjusting the adjustable stops 580 and 581 and hence the contacts 85 and 86 the wave form produced by the contacts 84, 85 and 86 may be adjusted to the desired value and shape. The contacts 85 and 86 are preferably so adjusted that when the contact 84 is stationary in the middle position it engages both contacts 85 and 86. This provides an overlapping action which compensates for wear of the contacts. Due to this overlapping action wear of the contacts does not materially alter the wave form produced by the contacts. By mounting the contacts 85 and 86 on the spring contact arms 565 and 570, respectively, good wiping contact is at all times provided between the contact 84 and the contacts 85 and 86. An electrical connection is provided between one of the screws 557 and the terminal 94 which in turn is connected to ground so that the various parts of the vibrator are connected to ground to maintain the vibrator at ground potential. The cover 95 enclosing the movable parts of the vibrator is held in place on the base 555 by means of a ring 593, clamping the cover 95 to the base 555. The cover 95 acts to prevent dirt and corrosive atmosphere from affecting the parts of the vibrator.

The mounting means 256 for flush mounting the instrument on an instrument panel is shown in detail in Figs. 28 and 29. The mounting means 256 comprises a bracket having a base portion 595 which lies along the instrument casing and an upstanding portion 596. Reinforcing flanges are provided at 597. Formed on the base portion 595 are lugs 598 which are circular in cross section. The lugs 598 are provided with a cut-away cam portion 599. The lugs 598 fit through holes 600 in the instrument casing, the holes 600 being slightly larger in diameter than the lugs 598. The upstanding portion 596 is tapped to receive a screw 601 which is held in place by a lock-nut 602.

Normally the holes 600 in the instrument casing are filled with a plug to prevent dirt from getting into the instrument case when the mounting means 256 are not used. When the mounting means 256 are used the plug is taken from the holes 600 and the lugs 598 are inserted in the holes 600. The screw 601 abuts the back of the panel and as the screw 601 is tightened up, the cam surfaces 599 draw the fastening means 256 tightly into engagement with the casing 251 to form a rigid structure. The screw 601 is then locked in place by the lock nut 602 and the instrument is securely fastened to a panel in a flush manner. A gasket 603 is located between the mounting means 256 and the instrument case to prevent dirt and/or corrosive gases from getting into the instrument case through the holes 600.

The latch 277 for latching the frame 276 in position in the instrument case is shown in detail in Figs. 30 and 31. Screws 605 secure an angle bracket 607 to a supporting plate 606 which in turn is welded to the side wall 255 of the instrument case. The angle bracket 607 is provided with a slot 608 adapted to receive a tapered pin 611. The frame 276 is provided with an extension 610 carrying the tapered pin 611. When the frame 276 is swung into the case the tapered pin 611 enters the slot 608 in the angle bracket 607 to give a three point support for the frame 276. The extension 610 of the frame 276 is provided with a boss 612 in which is rotatably mounted a shaft 613. Suitably secured to one end of the shaft 613 for rotation therewith is a knob 614. The shaft 613 is held against longitudinal movement by a collar 609 securely fastened thereto. The other end of the shaft 613 carries a collar 615 and the shaft 613 between the collars 609 and 615 is screw threaded and carries a latch 616. A spring 617 located between the latch 616 and the collar 615 urges the latch 616 to the left as viewed in Fig. 31 to increase the friction between the screw threads of the shaft and the latch 616 whereby rotation of the shaft 613 carries with it normally the latch 616.

Assume that the frame 276 is swung into the case and latched therein with the parts in the position shown in Figs. 30 and 31. In order to swing the frame 276 out of the case the knob 614 is rotated in a counter-clockwise direction as viewed in Fig. 30. At first the shaft 613 turns but the latch 616 remains in the position shown because it is held in this position by its frictional engagement with the angle bracket 607. However, as soon as this frictional engagement between the latch 616 and the angle bracket 607 diminishes to a value which is less than the value of the friction between the shaft 613 and the latch 616, the shaft 613 will then cause the latch 616 to move out from behind the angle bracket 607. The frame 276 may then be swung out of the instrument case. When the frame 276 is swung back into the instrument case clockwise rotation of the knob 614 first causes the latch 616 to move behind the angle bracket 607 against the tapered pin 611. Further clockwise rotation of the knob 614 merely acts to tightly clamp the latch 616 to the angle bracket 607.

Figs. 32 and 33 illustrate a latch arrangement for holding the door 258 in an open position when it is swung to the open position to prevent overswinging of the door as well as to prevent closing of the door by wind and so forth. A U-shaped bracket 620 has one leg 621 thereof secured to the bottom wall 253 of the instrument case by means of screws 622. The other leg 623 of the U shaped bracket 620 is provided with a slot 624. A spring member 625 is secured to the leg 623 of the U shaped bracket by means of screws 626 and is held spaced from the leg 623 by a block 627. A bracket 628 is secured to the door 258 by means of screws 629. A pivot pin 630 connects one end of a link 631 to the bracket 628. The other end of the link 631 carries a pin 632 provided with a tapered head 633. The pin 632 extends into the slot 624 and the tapered head 633 rides along the leg 621 of the U shaped bracket 620. A spring 634 urges the tapered head 633 downwardly into engagement with the leg 621 of the bracket 620.

Assume the parts in the position shown in Figs. 32 and 33 wherein the door 258 is closed. As the door 258 is opened the pin 632 rides forwardly in the slot 624 and when the door is moved to the open position the tapered head 633 rests in a tapered hole 635 formed in the leg 621 of the bracket 620. When in this position the door 258 is held in open position by the tapered head 633 engaging the hole 635. The spring arm 625 forcefully holds the tapered head 633 in the hole 635. In order to close the door 258, the door must be pushed sufficiently hard to remove the tapered pin 632 from the opening 635 and when this is accomplished the door 258 is easily moved to the closed position.

Fig. 34 is a diagrammatic illustration of a modified form of this invention. For all intents and purposes the arrangement of Fig. 34 is substantially the same as that of Fig. 1, using the same potentiometer circuit 15, slide-wire assembly 16, amplifier 17 and reversible motor 24. Three changes are made in Fig. 34 and they are the substitution of a three wire thermocouple generally designated at 800 for the two wire thermocouple of Fig. 1, an electrical suppression arrangement 801 inserted in the potentiometer circuit between the slide-wire assembly and the vibrator 18, and a safety device generally designated at 802 for running the reversible motor 24 up scale in case of failure of the motor drive vacuum tubes 22 and 23 and including signalling means generally designated at 803 for indicating the failure of the motor drive vacuum tubes 22 and 23.

If in Fig. 1 the thermocouple 13 should come in contact with some source of electrical energy to cause a circulating current to flow through the thermocouple lead wires this would affect the operation of the potentiometer circuit. In order to prevent this a three wire thermocouple is substituted for the two wire thermocouple of Fig. 1, the circulating current passing through the third wire and not affecting the operation of the potentiometer circuit.

In carrying out this feature of the invention the three wire thermocouple shown at 800 comprises a housing 810 having a cover 811 and a terminal block 812. Mounted on the terminal block 812 are a ground terminal 813, a positive terminal 814 and a negative terminal 815. Secured to the housing 810 is a protecting tube 816. The positive element of the thermocouple, for example, iron comprises a wire 817 extending from the positive terminal 814 into the protecting tube 816 and returning to the ground terminal 813. The negative element, for example, constantan comprises a wire 818 extending from the negative terminal 815 into the protecting tube 816 and being suitably welded to the positive element at 819. The elements of the thermocouple are maintained separated by insulating beads 820. As shown the elements of the thermocouple are transposed to prevent the elements from picking up external stray electrical currents. The positive terminal 814 is connected by an iron wire 821 to the positive terminal 101. The negative terminal 815 is connected by a constantan wire 822 to the negative terminal 103 and the ground terminal 813 is connected by a wire 823 to a ground terminal 824 located in the instrument. Here again the lead wires extending from the thermocouple to the instrument are transposed to prevent the picking up of stray electrical currents. To further shield the lead wires from stray electrical currents they are surrounded by a shield 825 which may be grounded to the ground terminal 824. The ground terminal 824 in turn is connected by a wire 826 to the continuous conductor 136 which as pointed out above is connected to ground at 137. If desired the conductor 136 may include a resistance, capacity or inductance element.

If a source of electrical energy should contact the thermocouple at the hot junction 819 any circulating current set up would be immediately by-passed through the ground portion of the wire 817, ground terminal 813, wire 823, ground terminal 824, wire 826 and continuous conductor 136 to ground at 137. The circulating currents thus produced will not pass through the thermocouple leads and will not affect operation of the potentiometer system. If the source of electrical energy should contact the thermocouple at a point remote from the hot junction, say adjacent the housing 810, then jumper 827 connected from the positive terminal 814 to the ground terminal 813 would be utilized to more directly by-pass the circulating current to ground without having the circulating current passing through the elements of the thermocouple.

Fig. 35 shows a thermocouple which is exactly the same as the thermocouple of Fig. 34 with the exception that the elements of the thermocouple are not transposed. The thermocouple of Fig. 35 will operate just as well as the thermocouple of Fig. 34 with the possible exception that the elements of the thermocouple of Fig. 35 may have induced in them stray alternating electrical currents. However, in certain instances this may not be too serious.

Fig. 36 shows a different type of three wire thermocouple which may be substituted for the thermocouple of Fig. 34. In Fig. 36 the thermocouple comprises a housing 835 having a cover 836 and a terminal block 837 equipped with a ground terminal 838, a positive terminal 839, and a negative terminal 840. Suitably secured to the housing 835 is the positive element in the form of an iron sleeve 841. Concentrically mounted in the iron sleeve is a constantan wire 842 suitably insulated from the iron sleeve 841 by an insulating sleeve 843. An electrical connection is established between the constantan wire 842 and the iron sleeve 841 by a weld 844 which serves as the hot junction. The iron sleeve 841 is suitably connected to the positive terminal 839 and the constantan wire 842 is suitably connected to the negative terminal 840. A jumper 845 connected across the positive terminal 839 and the ground terminal 838 acts to by-pass circulating electrical currents directly to ground.

The means for electrically shifting the range of operation of the potentiometer is designated at 801 and comprises a resistance 850 and a contactor 851. One end of the resistance 850 is connected to the terminal 87 of the vibrator 18 and the contactor 851 is connected to the terminal 51 of the slide-wire assembly. Connected across the resistance 850 is a standard cell 852 and a resistance 853. The standard cell 852 operates to produce a potential in opposition to the potential produced by the thermocouple. By moving the contactor 851 with respect to the resistance 850 this opposing potential produced by the standard cell 852 may be varied and hence the range of operation of the potentiometer may be shifted. This range shifting arrangement operates to give substantially the same results as adjusting the eccentric 511 of the slide-wire assembly 16. The local circuit of the standard cell 852 is a high resistance circuit and, therefore, the drain on the standard cell 852 is negligible and it is found that the life of the standard cell 852 is relatively long. Because of the high primary impedance of the input transformer 19, the introduction of the resistance 850 into the potentiometer circuit has substantially no effect on the sensitivity of the instrument.

In regard to the safety control 802 for driving the reversible motor 24 up scale upon failure of the motor drive vacuum tubes 22 and 23, the safety control comprises a fuse 860 and a relay coil 861 connected in the circuit to the control winding 204 of the reversible motor 24. The relay coil 861 operates an armature 862 which in turn operates a switch arm 863 with respect to a contact 864. The switch arm 863 is normally biased into engagement with the contact 864 by means of springs, gravity or other means, not shown. When the motor drive tubes 22 and 23 are functioning properly they pass sufficient current to the motor control winding 204 of the reversible motor 24 to maintain the relay coil 861 energized to hold the switch arm 863 out of engagement with the contact 864. If the motor drive vacuum tubes 22 and 23 should fail in such a manner as to materially reduce the flow of current to the motor control winding 204 then the relay coil 861 is deenergized and the switch 863 is moved into engagement with the contact 864. If the motor drive vacuum tubes 22 and 23 should fail so as to produce an excessive current flow to the motor control winding 204 then the fuse 860 would break, breaking the circuit through the relay coil 861. This also would cause the switch arm 863 to engage the contact 864. Movement of the switch arm 863 into engagement with the contact 864 completes a circuit from the right-hand end of the secondary 131 through an audible alarm 865, an indicating light 866. switch arm 863, contact 864 and motor control winding 204 to the center tap 129 of the transformer secondary. This circuit produces a current flow through the motor control winding 204 which leads the supply voltage by 90° to cause the motor to operate up scale. In other words the current flow through the motor control winding 204 through this auxiliary circuit is of the same phase as the current flow through the motor control winding 204 when the reversible motor 24 is operated up scale under normal conditions. When the reversible motor 24 is operated up scale by the safety control means 802, the alarm 865, and the light 866 indicate this fact.

Figure 37 schematically illustrates the measuring and control apparatus applied to a D. C. bridge generally designated at 900. Substantially the only difference between the measuring and control apparatus of Fig. 1 and that of Fig. 37 is the substitution in Fig. 37 of a D. C. bridge system for the potentiometer system of Fig. 1. In Fig. 37 the amplifier 17 having the vibrator 18. the transformer 19 and the amplifying vacuum tube 20 and the reversible motor 24 having power windings 202 and control windings 204 are the same as in Fig. 1.

The D. C. bridge 900 may include a resistance 901 having a positive temperature resistance coefficient located remotely at a point whose temperature it is desired to measure and/or control and a resistance 902, the resistances 901 and 902 being connected at point 903. The resistance bridge 900 also includes a resistance 904 and a slidable contact 905, the contact 905 dividing the resistance 904 into two resistances. A battery 906 is utilized for supplying a D. C. potential to the bridge 900 and the polarity of this battery is shown in Fig. 37. The point 903 between the resistances 901 and 902 is connected to the terminal 72 of the transformer 19 and the contact 905 is connected to the terminal 87 of the vibrator 18. The contact 905 is adjusted by the reversible rotatable motor 24 in exactly the same manner as is the contact 45 of Fig. 1. For purposes of clarity the resistance 904 and contact 905 have been schematically shown in Fig. 37 but the resistance 904 and contact 905 may be constructed the same as the corresponding parts in Figs. 1 and 15 to 21 for stray elimination purposes.

When the potentials of the point 903 and the contact 905 are substantially equal the D. C. bridge system is in balance. Assume that the temperature adjacent the resistance 901 increases thus causing the potential of point 903 to become greater than the potential of the contact 905. Due to the action of the vibrator 18 and the transformer 19 the terminal 77 of the transformer 19 becomes positive during the first half cycle and minus during the second half cycle. This produces an alternating potential at the terminal 77 which is in phase with the alternating supply voltage and which is applied to the grid of the amplifier vacuum tube 20 to drive the reversible motor 24 in a direction to move the contact 905 to the right as viewed in Fig. 37. When the contact 905 has moved sufficiently far to the right to cause the potential thereof to equal the potential of the point 903 then the bridge 900 is balanced and the operation of the reversible motor 24 is stopped.

Conversely upon a decrease in temperature the potential of the point 903 becomes less than the potential of the contact 905 and due to the action of the vibrator 18 and the transformer 19 the potential of the terminal 77 of the vibrator 19 becomes negative during the first half cycle and positive during the second half cycle. This alternating potential of the terminal 77 which is 180° out of phase with the supply voltage causes the reversible motor 24 to operate in the opposite direction to move the contact 905 to the left. When the contact 905 has moved sufficiently far to the left so that the potential thereof becomes equal to the potential of the point 903 then the bridge 900 is balanced and the reversible motor 24 is stopped. The reversible motor 24 in addition to operating the contact 905 and operating the indicating and recording means may also, as is contemplated in Fig. 1, control the temperature which is affecting the resistance 901.

Referring now to Fig. 38 the system schematically illustrated therein is substantially the same as the systems of Figs. 1 and 37 with the exception that an A. C. bridge is utilized in Fig. 38 in lieu of the potentiometer system of Fig. 1 and the D. C. bridge system of Fig. 37. In Fig. 38 the amplifier 17 having the transformer 19 and the amplifying vacuum tube 20 and the reversible motor 24 having power windings 202 and control windings 204 are precisely the same as in Figs. 1 and 37. In Fig. 38, however, the vibrator 18 is omitted, since the vibrator is not needed when the amplifier 17 is controlled by an A. C. bridge.

In Fig. 38, the A. C. bridge is generally designated at 910 and includes a resistance at 911 having a positive temperature resistance coefficient which may be remotely located and responsive to a temperature condition adjacent thereto. The A. C. bridge 910 also includes a resistance 912, the resistances 911 and 912 being connected together at point 913. The A. C. bridge 910 also includes a resistance 914 engaged by a slidable contact 915 which in turn is moved by the reversible motor 24. The contact 915 in effect divides the resistance 914 into two resistances. An A. C. potential is supplied to the A. C. bridge 910 by a transformer 916 having a primary 917 connected across the power lines 118 and 119 and a secondary 918 connected to the A. C. bridge 910. The contact 915 is connected to the terminal 73 of the transformer 19 and the point 913 is connected to the terminal 74 of the transformer 19. The transformer 916 is so arranged that during the first half cycle of the alternating voltage supply the right end of the transformer secondary 918 is positive and during the second half cycle the left end is positive.

Assume now that the temperature adjacent the resistance 911 increases. During the first half cycle the potential of the point 913 is greater than the potential of the contact 915 and a current is, therefore, caused to flow from terminal 74 to terminal 73 in the transformer 19. This causes the potential of the terminal 77 of the transformer 19 to become positive during the first half cycle. During the second half cycle the potential of the point 913 becomes less than the potential of the contact 915 to cause a current to flow from the terminal 73 to the terminal 74 of the transformer 19 which in turn causes the potential of the terminal 77 to become negative during the second half cycle. Accordingly, upon a temperature increase adjacent the resistance 911 the potential of the terminal 77 of the transformer 19 is caused to alternate in phase with the supply voltage which causes the motor 24 to operate in a direction to move the contact 915 to the right. When the contact 915 is moved sufficiently far to the right to cause the potential thereof to be the same as the potential of the point 913 then the A. C. bridge is balanced and the reversible motor 24 is stopped.

Assume now that the temperature adjacent the resistance 911 decreases. During the first half cycle the potential of the point 913 becomes less than the potential of the contact 915 and during the second half cycle the potential of the point 913 becomes greater than the potential of the contact 915. This causes the potential of the terminal 77 of the transformer 19 to alternate 180° out of phase with the supply voltage whereby the reversible motor 24 is operated in the opposite direction to move the contact 915 to the left. When the contact 915 moves sufficiently far to the left to cause the potential thereof to equal the potential of the point 913 then the A. C. bridge is balanced and the reversible motor 24 is stopped.

Here again as in Fig. 37 the resistance 914 and the contact 915 may be constructed in the same way as the corresponding parts are constructed in Figs. 1 and 15 to 21. The reversible motor 24 in addition to operating the contact 915 and the indicating and recording apparatus may also operate to control the temperature adjacent the resistance 911.

Generally speaking, the electrical features are claimed in this application while the mechanical features are claimed in application Serial Number 421,175, filed by J. A. Caldwell on December 1, 1941. The slidewire assembly 16 and the details of construction shown in Figs. 15 through 21, are disclosed and are being claimed in the divisional application filed April 26, 1947, and bearing Serial No. 744,213, while the input transformer 19 and the details of construction thereof shown in Fig. 22 are disclosed and being claimed in a separate divisional application filed April 26, 1947, bearing Serial No. 744,212.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described my invention, what I claim as new and desire to secure by Letters Patent, is:

1. In combination with a potentiometer circuit having means for producing an electromotive force, a battery for producing an electromotive force in opposition to the first mentioned electromotive force and means responsive to the difference between the opposed electromotive forces, an adjustable rheostat comprising an adjustable resistance subject to substantially the same ambient temperature conditions as the battery and located in series with the battery for standardizing the battery with respect to a known electromotive force, said adjustable resistance having a temperature resistance coefficient to compensate for changes in the electromotive force produced by the battery as a result of changes in the temperature of the battery.

2. In combination with a potentiometer circuit having means for producing an electromotive force, a battery for producing an electromotive force in opposition to the first mentioned electromotive force and means responsive to the difference between the opposed electromotive forces, and an adjustable rheostat in series with the battery for standardizing the battery with respect to a known electromotive force and comprising a plurality of adjustable resistances, a common operating member for the adjustable resistances, a direct connection between the operating member and one of the resistances and a lost motion connection between the operating member and another of the resistances, said adjustable rheostat being subject to substantially the same ambient temperature conditions as the battery, and said adjustable resistances having a temperature resistance coefficient to compensate for changes in the electromotive force produced by the battery as a result of changes in the temperature of the battery.

3. In combination with a potentiometer circuit having interchangeable means for producing a first electromotive force having a corresponding range of variation, a battery for producing a second electromotive force in opposition to the first electromotive force and means responsive to the difference between the opposed electromotive forces, a plurality of resistances associated with the second mentioned means and selected as required to adapt the potentiometer circuit to different ranges of operation and to different means for producing the first electromotive force, a slide-wire assembly including a slidewire resistance and a shunt resistance for variably opposing the second electromotive force to the first electromotive force, the total resistance of the slide-wire assembly being fixed at a value which permits the use of the same slide-wire assembly regardless of the ranges of operation of the potentiometer circuit and the means for producing the first electromotive force, and an adjustable rheostat in series with the battery for standardizing the battery with respect to a known electromotive force and comprising a plurality of adjustable resistances, a common operating member for the adjustable resistances, a direct connection between the operating member and one of the resistances and a lost motion connection between the operating member and another of the resistances, said adjustable rheostat being subject to substantially the same ambient temperature conditions as the battery, and said adjustable resistances having a temperature resistance coefficient to compensate for changes in the electromotive force produced by the battery as a result of changes in the temperature of the battery.

4. In combination with a potentiometer circuit having interchangeable means for producing an electromotive force having a corresponding range of variation to be measured, means for producing an electromotive force in opposition to the first mentioned electromotive force and means responsive to the difference between the opposed electromotive forces, a plurality of resistances associated with the second mentioned means and selected as required to adapt the potentiometer circuit to different ranges of operation and to different means for producing the electromotive force to be measured, and a slide-wire assembly for variably opposing the second electromotive force to the first electromotive force comprising a cylindrical support formed of insulating material, an insulated wire helically wound on the exterior surface of the cylindrical support, a bare wire space wound on said insulated wire, a bare wire helically wound on the exterior surface of the cylindrical support and spaced from but parallel to the insulated wire and of substantially the same gage as the insulated wire, a bare wire space wound on said second mentioned bare wire and electrically conductive throughout its length with the said bare wire and of substantially the same gage as the bare wire which is space wound on the insulated wire, a rotary shaft concentrically mounted with respect to said cylindrical support, an arm adjustably carried by the shaft and extending along the exterior surface of the cylindrical support, a slot in said arm parallel to the axis of the cylindrical support, a roller rolling in the slot and bridging the space wound bare wires, a terminal block having three terminals located on one end of the cylindrical support adjacent one end of the wires, a connection between one of the terminals and the near end of the insulated wire, a connection between another of the terminals and the near end of the bare wire which is space wound on the insulated wire, a connection between the opposite ends of the insulated wire and the bare wire space wound thereon, and a connection between the other terminal and the near end of the bare wire upon which is space wound the other bare wire, the total resistance of the slide-wire assembly being fixed at a value which permits the use of the same slide-wire assembly regardless of the ranges of operation of the potentiometer circuit and the means for producing the electromotive force to be measured, said terminals connecting the slide-wire assembly into the potentiometer circuit.

5. In combination, self-balancing circuit means including means responsive to a condition for unbalancing the circuit means to produce a unidirectional electromotive force of one polarity or of opposite polarity dependent upon the direction of unbalance and means for rebalancing the circuit means to reduce the unidirectional electromotive force, a hum bucking transformer comprising, a rectangular core having opposite legs, a first pair of series connected primary windings including a winding mounted on each leg so as to accumulatively induce a flow of flux in the core, a second pair of series connected primary windings including a winding mounted on each leg so as to accumulatively induce a flow of flux in the core, a pair of series connected secondary windings including a winding mounted on each leg so as to accumulatively respond to a flow of flux in the core, a periodically operated single pole double throw oscillatory switch for alternately applying the unidirectional electromotive force to one and then the other pair of series connected primary windings to produce an alternating electromotive force in the pair of series connected secondary windings of one phase or of opposite phase dependent upon the polarity of the unidirectional electromotive force, said oscillatory switch operating to apply continuously the unidirectional electromotive force to one or the other of the pair of series connected primary windings, and phase responsive means controlled by the pair of series connected secondary windings for operating the rebalancing means to rebalance the circuit means.

6. In a self-balancing potentiometer system, the combination of, interchangeable means for producing a first unidirectional electromotive force having a corresponding range of variation, means for producing a second unidirectional electromotive force in opposition to the first mentioned electromotive force whereby a differential unidirectional electromotive force is produced having a polarity dependent upon which unidirectional electromotive force is greater, a plurality of resistances associated with the second mentioned means and selected as required to adapt the potentiometer system to different ranges of operation and to different means for producing the first electromotive force, a slide-wire assembly including a slidewire resistance and a shunt resistance for variably opposing the second electromotive force to the first electromotive force for reducing the differential electromotive force to substantially zero, the total resistance of the slide-wire assembly being fixed at a value which permits the use of the same slide-wire assembly regardless of the range of operation of the potentiometer system and the means for producing the first electromotive force, a transformer having a secondary and a primary, the differential electromotive force being applied to the primary, means for alternately and oppositely increasing and decreasing the application of the differential electromotive force to the primary to produce an alternating electromotive force in the secondary which is of one phase or of opposite phase depending upon the polarity of the differential electromotive force, and phase responsive means controlled by the secondary for controlling the slide-wire assembly.

7. In a self-balancing potentiometer system, the combination of, means for producing a unidirectional electromotive force, means for producing a unidirectional electromotive force in opposition to the first mentioned electromotive force whereby a differential unidirectional electromotive force is produced having a polarity dependent upon which unidirectional electromotive force is greater, a slide-wire assembly for variably opposing the second electromotive force to the first electromotive force for reducing the differential electromotive force to substantially zero, and comprising a cylindrical support formed of insulating material, an insulated wire helically wound on the exterior surface of the cylindrical support, a bare wire space wound on said insulated wire, a bare wire helically wound on the exterior surface of the cylindrical support and spaced from but parallel to the insulated wire and of substantially the same gage as the insulated wire, a bare wire space wound on said second mentioned bare wire and electrically conductive throughout its length with the said bare wire and of substantially the same gage as the bare wire which is space wound on the insulated wire, a rotary shaft concentrically mounted with respect to said cylindrical support, an arm adjustably carried by the shaft and extending along the exterior surface of the cylindrical support, a slot in said arm parallel to the axis of the cylindrical support, a roller rolling in the slot and bridging the space wound bare wires, a terminal block having three terminals located on one end of the cylindrical support adjacent one end of the wires, a connection between one of the terminals and the near end of the insulated wire, a connection between another of the terminals and the near end of the bare wire which is space wound on the insulated wire, a connection between the opposite ends of the insulated wire and the bare wire space wound thereon, and a connection between the other terminal and the near end of the bare wire upon which is space wound the other bare wire, said terminals connecting the slide-wire assembly into the potentiometer circuit, a transformer having a secondary and a primary, the differential electromotive force being applied to the primary, means for alternately and oppositely increasing and decreasing the application of the differential electromotive force to the primary to produce an alternating electromotive force in the secondary which is of one phase or of opposite phase depending upon the polarity of the differential electromotive force, and phase responsive means controlled by the secondary for controlling the slide-wire assembly.

8. In combination, a rotary field motor comprising a rotor having conductors, a power winding and a control winding, means for passing a fluctuating current through the power winding, means for passing a fluctuating current through the control winding, control means for selectively causing the fluctuating current passing through the control winding to lead or lag the fluctuating current passing through the power winding to cause rotation of the rotor in one direction or the other, and means for passing a current of different character and of progressively increasing magnitude through the control winding upon gradual decrease in effectiveness of said control means to induce a current in the conductors of the rotating rotor to retard rotation of the rotor.

9. In combination, a rotating field motor comprising a rotor, a power winding and a control winding having a relatively high ratio of inductive reactance to resistance, means for passing a fluctuating current through the power winding, means for passing a fluctuating current through the control winding out of phase with the fluctuating current passing through the power winding to cause rotation of the rotor, and a low impedance circuit associated with the control winding to permit distorted flux from the power winding produced by rotation of the rotor to induce a relatively large fluctuating current in the control winding to assist the fluctuating current passing through the control winding to rotate the rotor.

10. In combination, a rotating field motor comprising a rotor, a power winding and a control winding having a relatively high ratio of inductive reactance to resistance, means for passing a fluctuating current through the power winding, means for passing a fluctuating current through the control winding, means for selectively causing the fluctuating current passing through the control winding to lead or lag the fluctuating current passing through the power winding to cause rotation of the rotor in one direction or the other, and a low impedance circuit associated with the control winding to permit distorted flux from the power winding produced by rotation of the rotor to induce a relatively large fluctuating current in the control winding to assist the fluctuating current passing through the control winding to rotate the rotor.

11. In combination, a rotating field motor comprising a rotor having conductors, a power winding and a control winding having a relatively high ratio of inductive reactance to resistance, means for passing a fluctuating current through the power winding, means for passing a fluctuating current through the control winding out of phase with the current passing through the power winding to cause rotation of the rotor, a low impedance circuit associated with the control winding to permit distorted flux from the power winding produced by rotation of the rotor to induce a relatively large fluctuating current in the control winding to assist the fluctuating current passing through the control winding to rotate the rotor, and means for passing a current of different character through the control winding to induce a current in the conductors of the rotating rotor to retard rotation of the rotor.

12. In combination, a rotating field motor comprising a rotor having conductors, a power winding and a control winding having a relatively high ratio of inductive reactance to resistance, means for passing a fluctuating current through the power winding, means for selectively causing the fluctuating current passing through the control winding to lead or lag the fluctuating current passing through the power winding to cause rotation of the rotor in one direction or the other, a low impedance circuit associated with the control winding to permit distorted flux from the power winding produced by rotation of the rotor to induce a relatively large fluctuating current in the control winding to assist the fluctuating current passing through the control winding to rotate the rotor, and means for passing a current of different character through the control winding to induce a current in the conductors of the rotating rotor to retard rotation of the rotor.

13. In combination, a rotating field motor comprising a rotor having conductors, a power winding and a control winding, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, and control means for applying a fluctuating potential of the same frequency as that of the source to the control electrodes to cause the fluctuating current to pass through the control winding to cause rotation of the motor rotor, said control means including means for maintaining a potential of different character on the control electrodes to cause a current of different character to pass through the control windings for inducing a current in the conductors to retard rotation of the rotor.

14. In combination, a rotating field motor comprising a rotor having conductors, a power winding and a control winding, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, and control means for applying a fluctuating potential of the same frequency as that of the source to the control electrodes to cause the fluctuating current to pass through the control winding to cause rotation of the motor rotor, said control means including means for shifting the phase of the fluctuating potential applied to the control electrodes to cause rotation of the motor rotor in one direction or in the opposite direction depending upon the phase of the fluctuating potential, and said control means including means for maintaining a potential of different character on the control electrodes to cause a current of different character to pass through the control windings for inducing a current in the conductors to retard rotation of the rotor.

15. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, and control means for applying a fluctuating potential of the same frequency as that of the source to the control electrodes to cause the fluctuating current to pass through the control winding to cause rotation of the motor rotor, and a low impedance circuit associated with the control winding to permit distorted flux from the power winding produced by rotation of the rotor to induce a relatively large fluctuating current in the control winding to assist the fluctuating current passing through the control winding to rotate the motor rotor.

16. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, control means for applying a fluctuating potential of the same frequency as that of the source to the control electrodes to cause the fluctuating current to pass through the control winding to cause rotation of the motor rotor, said control means including means for shifting the phase of the fluctuating potential applied to the control electrodes to cause rotation of the motor rotor in one direction or in the opposite direction depending upon the phase of the fluctuating potential, and a low impedance circuit associated with the control winding to permit distorted flux from the power winding produced by rotation of the rotor to induce a relatively large fluctuating current in the control winding to assist the fluctuating current passing through the control winding to rotate the motor rotor.

17. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, and control means for applying a fluctuating potential of the same frequency as that of the source to the control electrodes to cause the fluctuating current to pass through the control winding to cause rotation of the motor rotor, said control means including means for maintaining a potential of different character on the control electrodes to cause a current of different character to pass through the control winding for inducing a current in the conductors to retard rotation of the rotor, and a low impedance circuit associated with the control winding to permit distorted flux from the power winding produced by rotation of the rotor to induce a relatively large fluctuating current in the control winding to assist the fluctuating current passing through the control winding to rotate the motor rotor.

18. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, and control means for applying a fluctuating potential of the same frequency as that of the source to the control electrodes to cause the fluctuating current to pass through the control winding to cause rotation of the motor rotor, said control means including means for shifting the phase of the fluctuating potential applied to the control electrodes to cause rotation of the motor rotor in one direction or in the opposite direction depending upon the phase of the fluctuating potential, said control means including means for maintaining a potential of different character on the control electrodes to cause a current of different character to pass through the control winding for inducing a current in the conductors to retard rotation of the rotor, and a low impedance circuit associated with the control winding to permit distorted flux from the power winding produced by rotation of the rotor to induce a relatively large fluctuating current in the control winding to assist the fluctuating current passing through the control winding to rotate the motor rotor.

19. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, a condenser in parallel with the motor control winding to cause the first and second circuits to be substantially resonant at said predetermined frequency and to provide a local low impedance circuit for the control winding, and control means for applying a fluctuating potential of the same frequency as that of the source to the control electrodes to cause the fluctuating current to pass through the control winding to cause rotation of the motor rotor.

20. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, a condenser in parallel with the motor control winding to cause the first and second circuits to be substantially resonant at said predetermined frequency and to provide a local low impedance circuit for the control winding, and control means for applying a fluctuating potential of the same frequency as that of the source to the control electrodes to cause the fluctuating current to pass through the control winding to cause rotation of the motor rotor, said control means including means for shifting the phase of the fluctuating potential applied to the control electrodes to cause rotation of the motor rotor in one direction or in the opposite direction depending upon the phase of the fluctuating potential.

21. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding, a second circuit including the other secondary winding, the other electronic valve and the motor control winding, a condenser in parallel with the motor control winding to cause the first and second circuits to be substantially resonant at said predetermined frequency and to provide a local low impedance circuit for the control winding, and control means for applying a fluctuating potential of the same frequency as that of the source to the control electrodes to cause the fluctuating current to pass through the control winding to cause rotation of the motor rotor, said control means including means for maintaining a potential of different character on the control electrodes to cause a current of different character to pass through the control winding for inducing a current in the conductors to retard rotation of the rotor.

22. In combination, a rotating field motor comprising a rotor having conductors, a power winding and a control winding having a relatively high ratio of inductive reactance to resistance, a source of fluctuating potential and current of predetermined frequency, means for passing a fluctuating current from said source through the power winding, means for passing a fluctuating current from said source through the control winding which is displaced in phase from the fluctuating current passing through the power winding comprising a transformer having a primary winding connected to said source and a pair of secondary winding, a pair of electronic valves having control electrodes, a first circuit including one of the secondary windings, one of the electronic valves and the motor control winding, a second circuit including the other secondary winding, the other electronic valve and the motor control winding, a condenser in parallel with the motor control winding to cause the first and second circuits to be substantially resonant at said predetermined frequency and to provide a local low impedance circuit for the control winding, and control means for applying a fluctuating potential of the same frequency as that of the source to the control electrodes to cause the fluctuating current to pass through the control winding to cause rotation of the motor rotor, said control means including means for shifting the phase of the fluctuating potential applied to the control electrodes to cause rotation of the motor rotor in one direction or in the opposite direction depending upon the phase of the fluctuating potential, said control means including means for maintaining a potential of different character on the control electrodes to cause a current of different character to pass through the control winding for inducing a current in the conductors to retard rotation of the rotor.

23. In combination, means for producing a unidirectional electromotive force of one polarity or of opposite polarity, a transformer having a secondary and a primary, the unidirectional electromotive force being applied to the primary, a source of fluctuating potential and current of predetermined frequency, periodic means operating at the predetermined frequency of said source for alternately and oppositely increasing and decreasing the application of the unidirectional electromotive force to the primary to produce a fluctuating electromotive force of the same frequency in the secondary which is of one phase or of opposite phase depending upon the polarity of the unidirectional electromotive force, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, and means controlled by the fluctuating potential of the secondary of the first transformer for applying a fluctuating potential of the same frequency and of one phase or of opposite phase to the control electrodes to cause the fluctuating current to pass through the control winding to cause rotation of the motor rotor in one direction or the opposite direction.

24. In combination, self-balancing circuit means including means responsive to a condition for unbalancing the circuit means to produce a unidirectional electromotive force of one polarity or of opposite polarity dependent upon the direction of unbalance and means for rebalancing the circuit means to reduce the unidirectional electromotive force, a transformer having a secondary and a primary, the unidirectional electromotive force being applied to the primary, a source of fluctuating potential and current of predetermined frequency, periodic means operating at the predetermined frequency of said source for alternately and oppositely increasing and decreasing the application of the unidirectional electromotive force to the primary to produce a fluctuating electromotive force of the same frequency in the secondary which is of one phase or of opposite phase depending upon the polarity of the unidirectional electromotive force, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, means controlled by the fluctuating potential of the secondary of the first transformer for applying a fluctuating potential of the same frequency and of one phase or of opposite phase to the control electrodes to cause the fluctuating current to pass through the control winding to cause rotation of the motor rotor in one direction or the opposite direction, and means operated by said rotating field motor for operating said rebalancing means to rebalance the circuit means.

25. In a potentiometer system, the combination of, means for producing a unidirectional electromotive force, means for producing a unidirectional electromotive force in opposition to the first mentioned electromotive force whereby a differential unidirectional electromotive force is produced having a polarity dependent upon which unidirectional electromotive force is greater, a transformer having a secondary and a primary, the differential unidirectional electromotive force being applied to the primary, a source of fluctuating potential and current of predetermined frequency, periodic means operating at the predetermined frequency of said source for alternately and oppositely increasing and decreasing the application of the unidirectional electromotive force to the primary to produce a fluctuating electromotive force of the same frequency in the secondary which is of one phase or of opposite phase depending upon the polarity of the differential unidirectional electromotive force, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, and means controlled by the fluctuating potential of the secondary of the first transformer for applying a fluctuating potential of the same frequency and of one phase or of opposite phase to the control electrodes to cause the fluctuating current to pass through the control winding to cause rotation of the motor rotor in one direction or the opposite direction.

26. In a self-balancing potentiometer system, the combination of means for producing a unidirectional electromotive force, means for producing a unidirectional electromotive force in opposition to the first mentioned electromotive force whereby a differential unidirectional electromotive force is produced having a polarity dependent upon which unidirectional electromotive force is greater, balancing means associated with the second mentioned means for reducing the differential electromotive force, a transformer having a secondary and a primary, the differential unidirectional electromotive force being applied to the primary, a source of fluctuating potential and current of predetermined frequency, periodic means operating at the predetermined frequency of said source for alternately and oppositely increasing and decreasing the application of the unidirectional electromotive force to the primary to produce a fluctuating electromotive force of the same frequency in the secondary which is of one phase or of opposite phase depending upon the polarity of the differential unidirectional electromotive force, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, means controlled by the fluctuating potential of the secondary of the first transformer for applying a fluctuating potential of the same frequency and of one phase or of opposite phase to the control electrodes to cause the fluctuating current to pass through the control winding to cause rotation of the motor rotor in one direction or the opposite direction, and means operated by said rotating field motor for operating said balancing means.

27. In a potentiometer system, the combination of, a thermocouple having a pair of leads for producing an electromotive force, means for producing an electromotive force in opposition to that produced by the thermocouple including a slide-wire for variably opposing the electromotive force to the electromotive force produced by the thermocouple, detecting means for detecting the difference between the electromotive forces including a transformer and a periodically operated current varying device, means for connecting one thermocouple lead to the slide-wire, means for connecting the slide-wire to the current varying device, means for connecting the current varying device to the transformer, and means for connecting the other thermocouple lead directly to the transformer.

28. In a potentiometer system, the combination of, a thermocouple having a pair of leads for producing an electromotive force, means for producing an electromotive force in opposition to that produced by the thermocouple including a slide-wire for variably opposing the electromotive force to the electromotive force produced by the thermocouple, detecting means for detecting the difference between the electromotive forces including a transformer and a periodically operated current varying device, means for connecting one thermocouple lead to the slide-wire, means for connecting the slide-wire to the current varying device, means for connecting the current varying device to the transformer, means for connecting the other thermocouple lead directly to the transformer, and means for connecting the last mentioned thermocouple lead to ground.

29. In a potentiometer system, the combination of, a thermocouple having a pair of leads for producing an electromotive force, means for producing an electromotive force in opposition to that produced by the thermocouple including a slide-wire for variably opposing the electromotive force to the electromotive force produced by the thermocouple, detecting means for detecting the difference between the electromotive forces including a transformer and a periodically operated current varying device, means for connecting one thermocouple lead to the slide-wire, means for connecting the slide-wire to the current varying device, means for connecting the current varying device to the transformer, means for connecting the other thermocouple lead directly to the transformer, and a condenser connected across the thermocouple leads.

30. In a self-balancing potentiometer system, the combination of, a thermocouple having a pair of leads for producing an electromotive force, means for producing an electromotive force including a slide-wire for variably opposing the electromotive force to the electromotive force produced by the thermocouple, detecting means for detecting the difference between the electromotive forces including a transformer and a periodically operated current varying device, interconnecting means including means for connecting one thermocouple lead to the slide-wire, means for connecting the slide-wire to the current varying device, means for connecting the current varying device to the primary of the transformer and means for connecting the other thermocouple lead to the primary of the transformer whereby a fluctuating electromotive force is produced in the secondary having a phase dependent upon the sense of unbalance of the potentiometer system, a reversible electric motor for operating the slide-wire to rebalance the potentiometer system, and an electronic amplifier controlled by the electromotive force of the secondary of the transformer for controlling the reversible electric motor.

31. In a self-balancing potentiometer system, the combination of, a thermocouple having a pair of leads for producing an electromotive force, means for producing an electromotive force including a slide-wire for variably opposing the electromotive force to the electromotive force produced by the thermocouple, detecting means for detecting the difference between the electromotive forces including a transformer and a periodically operated current varying device, interconnecting means including means for connecting one thermocouple lead to the slide-wire, means for connecting the slide-wire to the current varying device, means for connecting the current varying device to the primary of the transformer and means for connecting the other thermocouple lead to the primary of the transformer whereby a fluctuating electromotive force is produced in the secondary having a phase dependent upon the sense of unbalance of the potentiometer system, a reversible electric motor for operating the slide-wire to rebalance the potentiometer system, an electronic amplifier controlled by the electromotive force of the secondary of the transformer for controlling the reversible electric motor, and means for reducing the effects of stray electrical currents on the potentiometer system.

32. In a self-balancing potentiometer system, the combination of, a thermocouple having a pair of leads for producing an electromotive force, means for producing an electromotive force including a slide-wire for variably opposing the electromotive force to the electromotive force produced by the thermocouple, detecting means for detecting the difference between the electromotive forces including a transformer and a periodically operated current varying device, interconnecting means including means for connecting one thermocouple lead to the slide-wire, means for connecting the slide-wire to the current varying device, means for connecting the current varying device to the primary of the transformer and means for connecting the other thermocouple lead to the primary of the transformer whereby a fluctuating electromotive force is produced in the secondary having a phase dependent upon the sense of unbalance of the potentiometer system, a reversible electric motor for operating the slide-wire to rebalance the potentiometer system, an electronic amplifier controlled by the electromotive force of the secondary of the transformer for controlling the reversible electric motor, and means for reducing the affects of stray electrical currents on the potentiometer system, including a condenser connected across the thermocouple leads.

33. In a self-balancing potentiometer system, the combination of, a thermocouple having a pair of leads for producing an electromotive force, means for producing an electromotive force including a slide-wire for variably opposing the electromotive force to the electromotive force produced by the thermocouple, detecting means for detecting the difference between the electromotive forces including a transformer and a periodically operated current varying device, interconnecting means including means for connecting one thermocouple lead to the slide-wire, means for connecting the slide-wire to the current varying device, means for connecting the current varying device to the primary of the transformer and means for connecting the other thermocouple lead to the primary of the transformer whereby a fluctuating electromotive force is produced in the secondary having a phase dependent upon the sense of unbalance of the potentiometer system, a reversible electric motor for operating the slide-wire to rebalance the potentiometer system, an electronic amplifier controlled by the electromotive force of the secondary of the transformer for controlling the reversible electric motor, and means for reducing the effects of stray electrical currents on the potentiometer system, including means for connecting the thermocouple to ground.

34. In a self-balancing potentiometer system, the combination of, a thermocouple having a pair of leads for producing an electromotive force, means for producing an electromotive force including a slide-wire for variably opposing the electromotive force to the electromotive force produced by the thermocouple, detecting means for detecting the difference between the electromotive forces including a transformer and a periodically operated current varying device, interconnecting means including means for connecting one thermocouple lead to the slide-wire, means for connecting the slide-wire to the current varying device, means for connecting the current varying device to the primary of the transformer and means for connecting the other thermocouple lead to the primary of the transformer whereby a fluctuating electromotive force is produced in the secondary having a phase dependent upon the sense of unbalance of the potentiometer system, a reversible electric motor for operating the slide-wire to rebalance the potentiometer system, an electronic amplifier controlled by the electromotive force of the secondary of the transformer for controlling the reversible electric motor, and damping means for the reversible motor controlled by the electromotive forces in the thermocouple leads.

35. In a potentiometer system, the combination of a thermocouple having thermocouple leads, means for producing an electromotive force including a slide-wire for variably opposing the electromotive force to the electromotive force produced by the thermocouple, detecting means for detecting the difference between the electromotive forces, means for connecting in series the thermocouple leads, the slide-wire and the detecting means, and a grounded lead connected directly and conductively to the thermocouple independently of any circuit through said slide-wire and detecting means for connecting the thermocouple to ground to reduce circulating currents in the thermocouple leads.

36. In combination, self-balancing circuit means including means responsive to a condition for unbalancing the circuit means and means for rebalancing the circuit means, a reversible electric motor for operating said rebalancing means, an electronic amplifier controlled by said self-balancing circuit means for controlling the operation of said reversible electric motor to rebalance the circuit means and including an amplifier section and a motor drive section, and means for placing a small biasing force on the motor drive section of the electronic amplifier to drive the motor in one direction upon failure of the circuit means or the amplifying section of the electronic amplifier.

37. In combination, self-balancing circuit means including means responsive to a condition for unbalancing the circuit means and means for rebalancing the circuit means, a reversible electric motor for operating said rebalancing means, an electronic amplifier controlled by said self-balancing circuit means for controlling the operation of said reversible electric motor to rebalance the circuit means and including an amplifier section having an electronic valve of predetermined power and a motor drive section having electronic valves connected in parallel and requiring for operation over long periods of time an electronic valve of greater power than said predetermined power, said electronic valves being of said predetermined power and being interchangeable so that upon failure of the electronic valve of the amplifier section it may be replaced by one of the electronic valves of the motor drive section, said motor drive section being characterized in that satisfactory operation may be maintained with one only of said parallel connected valves during emergency periods.

38. In combination, a self-balancing circuit means including means responsive to a condition for unbalancing the circuit means and means for rebalancing the circuit means, a reversible electric motor for operating said rebalancing means, an electronic amplifier controlled by said self-balancing circuit means for controlling the operation of said reversible electric motor to rebalance the circuit means and including an amplifier section having a plurality of stages of amplification and a motor drive section, and sensitivity adjusting means associated with the last stage of amplification of the amplifier section of the electronic amplifier to adjust the electrical sensitivity of the self-balancing circuit to the mechanical sensitivity of the reversible motor and rebalancing means.

39. In a self-balancing potentiometer, the combination of, a potentiometer circuit including means for producing an electromotive force, a battery for producing an electromotive force in opposition to the first electromotive force and a slide-wire for variably opposing the second electromotive force to the first electromotive force, an electronic amplifier having an input circuit controlled by the potentiometer circuit, a reversible electric motor controlled by the electronic amplifier for operating the slide-wire, a standard cell for producing a standard electromotive force, a shunt resistance, switch means for opposing the standard electromotive force to the electromotive force produced by the battery and for connecting the shunt resistance across the input circuit of the electronic amplifier to check the battery electromotive force, rotation of the motor indicating a difference in electromotive forces, and resistance means associated with the battery for adjusting the electromotive force produced by the battery.

40. In a self-balancing measuring instrument, the combination of, a high resistance potentiometer circuit including a thermocouple a source of electromotive force, a slide-wire, a transformer, a periodically operated current varying device and connections therebetween, exhibiting means, a reversible electric motor for operating the slide-wire and the exhibiting means, an electronic amplifier controlled by the transformer of the potentiometer circuit for controlling the reversible electric motor, a standard cell, and means including a variable resistance for connecting the standard cell into the high resistance potentiometer circuit to vary the range of operation of the self-balancing measuring instrument.

41. In combination, a circuit network including a slide-wire and electromotive force generating means for producing a fluctuating electromotive force of one phase or of opposite phase, and detecting means connected to said circuit network to respond to the fluctuating electromotive force, said detecting means being characterized by its response to fluctuating electromotive forces which may be extraneously introduced into said circuit network through said slide-wire, said slide-wire being reverse wound so as to be unaffected by electromagnetic fields whereby the tendency for extraneous electromotive forces to be introduced into the slide-wire from extraneous electromagnetic fields is minimized.

42. In combination, means for producing a unidirectional electromotive force of one polarity or of opposite polarity, a transformer having a secondary and a primary, the unidirectional electromotive force being applied to the primary, periodic means for alternately and oppositely increasing and decreasing the application of the unidirectional electromotive force to the primary to produce an alternating electromotive force of the same frequency in the secondary which is of one phase or of opposite phase depending upon the polarity of the unidirectional electromotive force, a reversible electric motor, and a vacuum tube amplifier controlled by the secondary for directly controlling the reversible electric motor.

43. In combination, self-balancing circuit means including means responsive to a condition for unbalancing the circuit means to produce a unidirectional electromotive force of one polarity or of opposite polarity dependent upon the direction of unbalance and means for rebalancing the circuit means to reduce the unidirectional electromotive force, a transformer having a secondary and a primary, the unidirectional electromotive force being applied to the primary, a pair of contacts, a movable contact normally engaging both contacts of said pair, means for periodically operating said movable contact to disengage alternately the movable contact from one and then the other of said pair of contacts, and connections controlled by the pair of contacts and the movable contact for alternately applying the unidirectional electromotive force in one direction and then the other to the primary to produce an alternating electromotive force of the same frequency in the secondary which is of one phase or of opposite phase depending upon the polarity of the unidirectional electromotive force, a reversible electric motor, a vacuum tube amplifier controlled by the secondary for directly controlling the reversible electric motor, and means operated by the reversible electric motor for operating the rebalancing means to rebalance the circuit means.

44. In combination, a rotating field motor comprising a rotor having conductors, a power winding and a control winding, a first circuit passing a fluctuating current through the power winding, a second circuit passing a fluctuating current through the control winding, the fluctuating currents being displaced in phase to cause rotation of the rotor, the inductance of the power winding being a maximum when the speed of rotation of the rotor is a maximum to provide maximum torque at maximum speed, and means included in the first circuit to make the first circuit resonant when the rotor is operating at maximum speed, the arrangement being such that as the speed of rotation of the rotor decreases the inductance of the power winding decreases to make the first circuit less resonant for causing the current flow through the power winding to decrease and for reducing the power loss in the power winding whereby the power winding heats less when the rotor is at standstill or operating at slow speeds than when operating at fast speeds.

45. A self-balancing measuring instrument comprising, control means controlled by a condition being measured and including balancing means, a reversible electric motor controlled by the control means, a cable drive between the reversible electric motor and the balancing means to position the reversible electric motor in a position corresponding to the value of the condition, and an exhibiting device positively gear driven by the reversible electric motor independently of the cable drive for exhibiting the value of the condition being measured.

46. In combination, a circuit network including electromotive force generating means for producing a fluctuating electromotive force of one phase or of opposite phase, a transformer having a secondary and a primary, the primary being connected into the circuit network and the impedance of the primary at the frequency of fluctuation being at least five times higher than the resistance of the circuit network whereby changes in the resistance of the circuit network have practically no effect upon the electromotive force produced in the secondary of the transformer, and means controlled by the secondary of the transformer.

47. In combination, a source of fluctuating potential and current of predetermined frequency, a bridge circuit connected to said source of fluctuating potential and current for producing a fluctuating potential of one phase or of opposite phase depending upon the direction of unbalance of the bridge circuit, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, and means controlled by the fluctuating potential produced by the bridge circuit for applying a fluctuating potential of the same frequency and of one phase or of opposite phase to the control electrodes to cause the fluctuating current to pass through the control winding to cause rotation of the motor rotor in one direction or the opposite direction.

48. In combination, a source of fluctuating potential and current of predetermined frequency, a self balancing bridge circuit connected to said source of fluctuating potential and current and including means for unbalancing the bridge circuit in one direction or the other for producing a fluctuating potential of one phase or of opposite phase dependent upon the direction of unbalance and means for rebalancing the bridge circuit to reduce the fluctuating potential, a rotating field motor comprising a rotor having conductors, a power winding and a control winding, means for passing a fluctuating current from said source through the power winding, means for passing a fluctuating current from said source through the control winding which is displaced in phase from the fluctuating current passing through the power winding comprising a transformer having a primary winding connected to said source and a pair of secondary windings, a pair of electronic valves having control electrodes, a first circuit including one of the secondary windings, one of the electronic valves and the motor control winding and a second circuit including the other secondary winding, the other electronic valve and the motor control winding, means controlled by the fluctuating potential produced by the bridge circuit for applying a fluctuating potential of the same frequency and of one phase or of opposite phase to the control electrodes to cause the fluctuating current to pass through the control winding to cause rotation of the motor rotor in one direction or the opposite direction, and means operated by said rotating field motor for operating said rebalancing means to rebalance the bridge circuit.

49. In combination, means for producing a unidirectional electromotive force, a transformer having a secondary and a primary, a pair of contacts, a movable contact normally engaging both contacts of said pair, means for periodically operating said movable contact to disengage alternately the movable contact from one and then the other of said pair of contacts, and connections controlled by the pair of contacts and the movable contact for alternately applying the unidirectional electromotive force in one direction and then the other to the primary to produce an alternating electromotive force in the secondary of one phase or of opposite phase depending upon the polarity of the unidirectional electromotive force.

50. In combination, means for producing a unidirectional electromotive force of one polarity or of opposite polarity, a transformer having a secondary and a primary, the unidirectional electromotive force being applied to the primary, periodical means operated at a predetermined frequency for alternately and oppositely increasing and decreasing the application of the unidirectional electromotive force to the primary to produce an alternating electromotive force of the same frequency in the secondary which is of one phase or of opposite phase depending upon the polarity of the unidirectional electromotive force, a rotary field motor comprising a rotor having conductors, a power winding and a control winding, means for passing a fluctuating current at said predetermined frequency through the power winding, and control means for passing a fluctuating current of said predetermined frequency through the control winding, said control means being controlled by said transformer secondary for selectively causing the fluctuating current through the control winding to lead or lag the current passing through the power winding to cause rotation of the rotor in one direction or the other depending upon the polarity of the unidirectional electromotive force and for passing a current of different character through the control winding to induce a current in the conductors of the rotating rotor to retard rotation of the rotor.

51. A system having a rotating field motor including a rotor, a power winding and a control winding, said power and control windings each having a ratio of inductive reactance to resistance of at least 6 to 1 at a predetermined frequency, and control means for passing current through the power winding and the control winding so arranged as to pass a fluctuating current of said predetermined frequency through the power winding, to pass a fluctuating current of the same frequency through the control winding out of phase with the current passed through the power winding to cause rotation of the rotor and to pass a current having a fluctuating component of different frequency of progressively increasing magnitude through one of the windings upon gradual decrease in magnitude of said second mentioned fluctuating current to retard rotation of the rotor.

52. In a self balancing potentiometer, the combination of, a potentiometer circuit including means for producing a first electromotive force, adjustable means to produce a second electromotive force in opposition to the first electromotive force and a slide-wire for variably opposing the second electromotive force to the first electromotive force, an electronic amplifier having an input circuit controlled by the potentiometer circuit, a reversible electric motor controlled by the electronic amplifier for operating the slide-wire, a standard cell for producing a standard electromotive force, and adjustable switch means operative in a first position of adjustment to connect said first and second electromotive forces in opposition to the input circuit of said electronic amplifier, said switch means being operative in a second position of adjustment to short the input circuit of said electronic amplifier for checking faulty operation of the electronic amplifier and the presence of extraneous circulating electrical currents in the potentiometer circuit, faulty operation of the electronic amplifier or the presence of extraneous circulating electrical currents in the potentiometer circuit causing rotation of the reversible electrical motor, and said switch means being operative in a third position of adjustment for connecting the standard electromotive force and said second electromotive force in opposition to the input circuit of said electronic amplifier for checking said second electromotive force, rotation of the reversible electrical motor being indicative of a difference in said second and standard electromotive forces and of the need for adjustment of said second electromotive force.

WALTER P. WILLS.

REFERENCES CITED

The following references are of record in the file of this patent:

UNITED STATES PATENTS

| Number | Name | Date |
|---|---|---|
| 508,688 | Ekstrom | Nov. 14, 1893 |
| 522,506 | Burton et al. | July 3, 1894 |
| 1,786,422 | Daley et al. | Dec. 30, 1930 |
| 1,732,715 | Dessauer et al | Oct. 22, 1929 |
| 2,122,370 | Harrison et al. | June 28, 1938 |
| 1,744,592 | Terpening | Jan. 21, 1930 |
| 1,738,117 | Roebel | Dec. 3, 1929 |
| 1,971,313 | Johnson | Aug. 21, 1934 |
| 2,031,050 | Leeds | Feb. 18, 1936 |
| 2,113,164 | Williams, Jr. | Apr. 5, 1938 |
| 2,115,834 | Young | May 3, 1938 |
| 2,124,684 | Behr et al. | July 26, 1938 |
| 1,974,187 | Malpass | Sept. 18, 1934 |
| 2,216,472 | Harrison | Oct. 1, 1940 |
| 2,065,702 | Hubbard | Dec. 29, 1936 |
| 1,742,462 | Eisler | Jan. 7, 1930 |
| 2,176,090 | McAllister et al. | Oct. 17, 1939 |
| 1,804,180 | Nye | May 5, 1931 |
| 1,945,392 | Borden | Jan. 30, 1934 |
| 347,120 | Mather | Aug. 10, 1886 |
| 1,146,592 | Northrup | July 13, 1915 |
| 483,124 | Ahearn | Sept. 27, 1892 |
| 2,173,446 | Heindlhofer | Sept. 19, 1939 |
| 1,898,124 | Harrison | Feb. 21, 1933 |
| 1,910,340 | Johnson | May 23, 1933 |
| 2,065,805 | Harrison | Dec. 29, 1936 |
| 2,272,914 | Keeler | Feb. 10, 1942 |
| 2,277,365 | Michael | Mar. 24, 1942 |
| 2,315,714 | Jones | Apr. 6, 1943 |
| 1,982,053 | Hodgson et al. | Nov. 27, 1934 |
| 2,118,933 | Macadie | May 31, 1938 |
| 2,250,712 | Johnson | July 29, 1941 |
| 2,230,779 | Johnson | Feb. 4, 1941 |
| 2,141,056 | Watkins | Dec. 20, 1938 |
| 2,184,576 | Beverle | Dec. 26, 1939 |
| 2,203,689 | Mcdonald | June 11, 1940 |
| 2,209,369 | Wills | July 30, 1940 |
| 2,245,034 | Harrison | June 10, 1941 |
| 2,263,497 | Harrison | Nov. 18, 1941 |
| 2,300,742 | Harrison et al. | Nov. 3, 1942 |
| 1,189,317 | Von Kramer | July 4, 1916 |
| 1,056,104 | Von Kramer | Mar. 8, 1913 |
| 2,240,676 | Shaver | May 6, 1941 |
| 1,920,150 | Rockwell | July 25, 1933 |
| 2,060,025 | Burt et al. | Nov. 10, 1936 |
| 1,940,386 | Bossart | Dec. 19, 1933 |
| 1,911,356 | Earnes | May 30, 1933 |
| 2,228,163 | Cohen | Jan. 7, 1941 |
| 2,154,065 | Davis et al. | Apr. 11, 1939 |
| 1,667,624 | Corson et al. | Apr. 24, 1928 |
| 2,175,890 | Glowatzki | Oct. 10, 1939 |
| 2,098,650 | Stein | Nov. 9, 1937 |
| 2,166,935 | Adams | July 25, 1939 |
| 2,284,476 | MacKay | May 26, 1942 |
| 1,779,931 | Danziger et al. | Oct. 28, 1930 |
| 2,222,947 | Harrison | Nov. 26, 1940 |
| 2,154,314 | Minneci | Apr. 11, 1939 |
| 2,312,945 | Williams | Mar. 2, 1943 |
| 1,199,724 | Wunsch | Sept. 26, 1916 |
| 2,003,681 | Doyle | June 4, 1935 |

FOREIGN PATENTS

| Number | Country | Date |
|---|---|---|
| 342,354 | Great Britain | Feb. 2, 1931 |